US 7,148,925 B2

(12) United States Patent
Osada et al.

(10) Patent No.: US 7,148,925 B2
(45) Date of Patent: Dec. 12, 2006

(54) SOLID-STATE HONEYCOMB TYPE IMAGE PICKUP APPARATUS USING A COMPLEMENTARY COLOR FILTER AND SIGNAL PROCESSING METHOD THEREFOR

(75) Inventors: Masaru Osada, Asaka (JP); Koji Ichikawa, Asaka (JP); Masafumi Inuiya, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 638 days.

(21) Appl. No.: 09/805,163

(22) Filed: Mar. 14, 2001

(65) Prior Publication Data

US 2001/0024237 A1 Sep. 27, 2001

(30) Foreign Application Priority Data

Mar. 14, 2000 (JP) ............................. 2000-076353

(51) Int. Cl.
*H04N 5/335* (2006.01)
(52) U.S. Cl. ..................... 348/275; 348/272; 348/273; 348/277; 348/312; 348/315; 382/300
(58) Field of Classification Search ........... 348/208.13, 348/222.1, 231.6, 234–238, 252, 255–256, 348/266, 312, 272–280, 315, 286; 382/167, 382/236, 266, 300, 263
See application file for complete search history.

(56) References Cited

U.S. PATENT DOCUMENTS 4,516,154 A * 5/1985 Nishizawa et al. ......... 348/275
6,046,772 A * 4/2000 Howell ........................ 348/273
6,366,694 B1 * 4/2002 Acharya ..................... 382/167
6,721,005 B1 * 4/2004 Higuchi ...................... 348/243
6,847,397 B1 * 1/2005 Osada ........................ 348/273
6,882,364 B1 * 4/2005 Inuiya et al. ................ 348/252

FOREIGN PATENT DOCUMENTS

| JP | A5831688 | 2/1983 |
|---|---|---|
| JP | 5972283 | 4/1984 |
| JP | A8340455 | 12/1996 |

OTHER PUBLICATIONS

Inuiya, Society of Photographic Science and Technology of Japan, pp. 1 & 4, (1998).

* cited by examiner

*Primary Examiner*—Vivek Srivastava
*Assistant Examiner*—Chriss S. Yoder
(74) *Attorney, Agent, or Firm*—Birch, Stewart, Kolasch & Birch, LLP

(57) ABSTRACT

A solid-state image pickup apparatus includes a color filter including complementary color filter segments. When a shutter release bottom is pressed to its half-stroke or full-stroke position, light incident via the filter is picked up in a movie/photometry or a still picture mode, respectively. While signal charges are read out of an image sensor in accordance with the mode, the signal charges are digitized to become pixel data. In the movie/the photometry mode, despite that a plurality of pixel data are mixed together, a set of primary color pixel data are generated as if pixel signals were thinned out by mixture. In the still picture mode, all the pixels are sequentially read out and interpolated to generate primary color pixel data greater in number than photosensitive cells. The primary color data are raised in frequency to enhance the resolution of a picture.

72 Claims, 53 Drawing Sheets

SOLID-STATE HONEYCOMB TYPE IMAGE PICKUP APPARATUS USING A COMPLEMENTARY COLOR FILTER AND SIGNAL PROCESSING METHOD THEREFOR

BACKGROUND OF THE INVENTION

1. Field of the Invention

The present invention relates to a solid-stated image pickup apparatus and a signal processing method therefor advantageously applicable to the processing of image signals output from, e.g., an image pickup apparatus using complementary colors.

2. Description of the Background Art

Today, a digital camera using a solid-state image pickup apparatus is extensively used because of various advantages available therewith. For example, a digital camera outputs a picture with resolution comparable with the resolution of a camera using a silver halide photosensitive type of film. Also, a digital camera allows a picture picked up to be immediately seen on an LCD (Liquid Crystal Display) or monitor mounted on the camera. Further, a digital camera allows image data representative of a picture to be input to a computer.

A current trend in a digital camera art is toward a smaller image sensing device, or smaller pixel size, that enhances the resolution of a picture and reduces the cost of the camera. A decrease in pixel size, however, directly translates into a decrease in the sensitivity of the individual image sensing device. While picture quality may be enhanced if both of resolution and sensitivity are increased, resolution and sensitivity are contrary to each other in the above respect.

In light of the above, nearby pixels may be shifted from each other in order to enhance resolution. Japanese patent laid-open publication No. 340455/1996, for example, discloses an image signal processor including unique data generating means. The data generating means generates pixel data in a lattice pattern on the basis of signal charges read out of a plurality of actual pixels, which adjoin a given pixel and are arranged in a non-lattice pattern. Despite that the image signal processor uses photosensitive cells arranged in a non-lattice pattern, it is capable of outputting pixel data in a lattice pattern that can be adequately input to a computer.

Japanese patent laid-open publication No. 72283/1984 teaches an electronic still camera using a solid-state photosensitive cells, or pixels, that are arranged in a checker pattern and allow video signals to be read out by progressive scanning on a two scanning line basis. The still camera includes a video signal processor including first circuit means and second circuit means. The first circuit means combines video signals on an upper and a lower scanning line by interpolation in the horizontal direction to thereby produce a new single line of video signals. The second circuit means delays the video signals on lower one of the two scanning lines by a single scanning period. The second circuit means then combines the delayed video signals with video signals on upper one of the next two scanning lines by interpolation in the horizontal direction, thereby producing a new single line of video signals.

The first and second circuit means output the respective video signals at the same time. The video signal processor can therefore output signals belonging to an odd-numbered field and an even-numbered field, which are particular to 2:1 interlace scanning, at the same time by a single vertical scanning. This implements a high quality still shot even when the horizontal and vertical directions are replaced with each other, i.e., without regard to the position of a frame with respect to vertical and horizontal directions.

Other various schemes have been proposed to reduce the pixel size, which is spatially sampled, and enhance sensitivity at the same time. For example, Masafumi Inuiya presents references of 1998 and a study thereof in "Image Pickup Characteristics in Megapixels DS Camera", the Society of Photographic Science and Technology of Japan, Digital Camera Group. Inuiya discusses, e.g., the influence of the pixel size on the image pickup characteristics in relation to sensitivity and S/N (Signal-to-Noise) ratio and an image pickup system using a single color filter. A solid-state image pickup apparatus adopts either one of a primary color pickup system using an red (R), green (G) and blue (B) color filter and a complementary color pickup system using a plurality of complementary colors. Inuiya reports that the complementary color pickup system is superior to the primary color pickup system with respect to the efficient use of incident light.

As for the complementary color pickup system, Japanese patent laid-open publication No. 31688/1983 proposes a solid-state color image pickup apparatus directed toward high resolution. In the apparatus taught in this document, photosensitive cells adjoining each other in the vertical direction are shifted from each other by half a pitch in the horizontal direction. Three color filter segments each are provided with a particular spectral characteristic such that the sum of the outputs of three adjoining photosensitive cells substantially corresponds to a luminance signal. The apparatus is capable of reducing moiré and increasing resolution. More specifically, the apparatus uses a color filter, white (W), yellow (Ye) and cyan (Cy) filter segments arranged in a delta shape on complementary color system and produces a luminance signal from three adjoining pixels (two horizontal lines).

The technologies taught in the above-described laid-open publication Nos. 72283/1984 and 31688/1983 each use a mixed two-line reading system or simultaneous two-line independent reading system belonging to a family of color multiplexing systems. This reading system feeds signal charges derived from incident light to signal lines and then reads out two signal lines by mixing them together. The above technologies both assume a movie and a MOS (Metal Oxide Semiconductor) image sensor.

It is known that progressive scanning (or all pixel readout) conventional with a CCD (Charge Coupled Device) image sensor is not applicable to a MOS image sensor. Therefore, a picture available with a MOS image sensor is lower in resolution, particularly vertical resolution in the case of a movie, than a picture implemented by progressive scanning. Even the image signal processor proposed in the previously mentioned laid-open publication No. 340455/1996 cannot fully meet the demand for high vertical resolution.

SUMMARY OF THE INVENTION

It is an object of the present invention to provide a solid-state image pickup apparatus capable of efficiently using light incident thereto and enhancing the resolution of a picture, and a signal processing method therefor.

In accordance with the present invention, a solid-state image pickup apparatus separates incident light into colors at positions corresponding to apertures formed in a screening member, which screens the incident light. The resulting color-separated light are converted to electric signals and then processed to thereby produce broadband signals. The image pickup section includes a color filter made up of color filter segments for separating light incident via the apertures into a plurality of colors each having a particular spectral characteristic. The color filter segments include those having complementary color spectral characteristics. An image sensing section includes photosensitive cells for converting the light transmitted through the color filter segments to electric signals. Nearby photosensitive cells are shifted from each other in at least one of the vertical and horizontal directions in a bidimensional array. Electrodes are arranged in such a manner as to skirt round the apertures for producing signals from the photosensitive cells. Transfer registers each sequentially transfer the signals input via the electrodes in the vertical direction or the horizontal direction. An operation commanding circuit outputs a timing and any one of a plurality of modes for reading the signals out of the image pickup section. A digitizing circuit converts the signals read out of the image pickup section to digital data. The digital data are arranged in a plane that contains the photosensitive cells and virtual pixels derived from the shifted arrangement of the photosensitive cells. In a first mode, a signal processing circuit interpolates pixel data in the positions of the virtual pixels or the positions of the photosensitive cells and generates three primary color data on the basis of a plurality of pixel data, which are produced by mixing pixel data. In a second mode, the signal processing circuit interpolates three primary color image data in the positions of the virtual pixels on the basis of all pixel data sequentially read out of the photosensitive cells, generates three primary color pixel data at the positions of the photosensitive cells on the basis of the pixel data given to the virtual pixels, and broadens the frequency band of the thee primary color image data.

Also, in accordance with the present invention, a signal processing method is applicable to a solid image pickup apparatus, which includes photosensitive cells arranged bidimensionally while being shifted from adjoining ones in the horizontal and vertical directions with respect to a pixel and color filter segments, which include complementary colors, arranged bidimensionally. The method reads out signal charges generated by the photosensitive cells in response to light incident via the color filter segments, converts the signal charges to pixel signals, and processes the pixel signals. The method begins with a mode selecting step of selecting, when reading the signal charges out of the photosensitive cells, either one of a first mode in which the signal charges are read out of a plurality of lines and mixed to thereby produce the pixel signals and a second mode in which all of the signal charges are sequentially read out to thereby produce the pixel signals. A shooting step outputs image signals representative of a scene picked up in accordance with drive signals in the first or the second mode selected. A digitizing step digitizes the image signal to corresponding digital data. A data storing step stores the digital data as pixel data. A primary color generating step reads out the pixel data stored, corrects the pixel data, and executes particular processing with the pixel data corrected in accordance with each of the first and second modes. A signal processing step generates, based on the resulting three primary color pixel data, luminance data and chrominance data and processes the luminance data and chrominance data for enhancing quality. The primary color generating step includes a first primary color generating step of interlace-scanning, in the first mode, the signal charges derived from the color filter segments, which include the complementary colors, to thereby read out the signal charges belonging to the same field, mixing the signal charges, and generating the primary color pixel data on the basis of the resulting mixed pixel data. A second primary color generating step sequentially reads out, in the second mode, the signal charges derived from the color filter segments, which include the complementary colors, to thereby generate primary color pixel data on the basis of a plurality of pixel data read out, generates the primary color image data greater in number than the photosensitive cells, and raises the frequency band of the primary color pixel data.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

First, the principle of the solid-state image pickup apparatus in accordance with the present invention will be briefly described. Color filter segments including complementary colors separate light incident thereto and representative of a scene. An image pickup section has photosensitive cells bidimensionally arranged and shifted from each other. An operation command section drives the image pickup section in either one of a first and a second preselected mode so as to read out signal charges generated in the photosensitive cells. This successfully promotes the efficient use of incident light, compared to the separation of primary colors. A digitizing section converts the signal charges to image data.

In the first mode, a signal processing section mixes the pixel data in the same manner as if signals were thinned out, or reduced, despite that the pixels are arranged in a pattern different from the conventional shifted pattern. Consequently, a single set of primary color pixel data can be accurately generated even if a plurality of pixel data derived from the color filter segments are mixed together. In the second mode, the signal processing section generates primary color pixel data greater in number than the photosensitive cells and then raises the frequencies of the pixel data. This further enhances the resolution of image signals.

Figure 1:
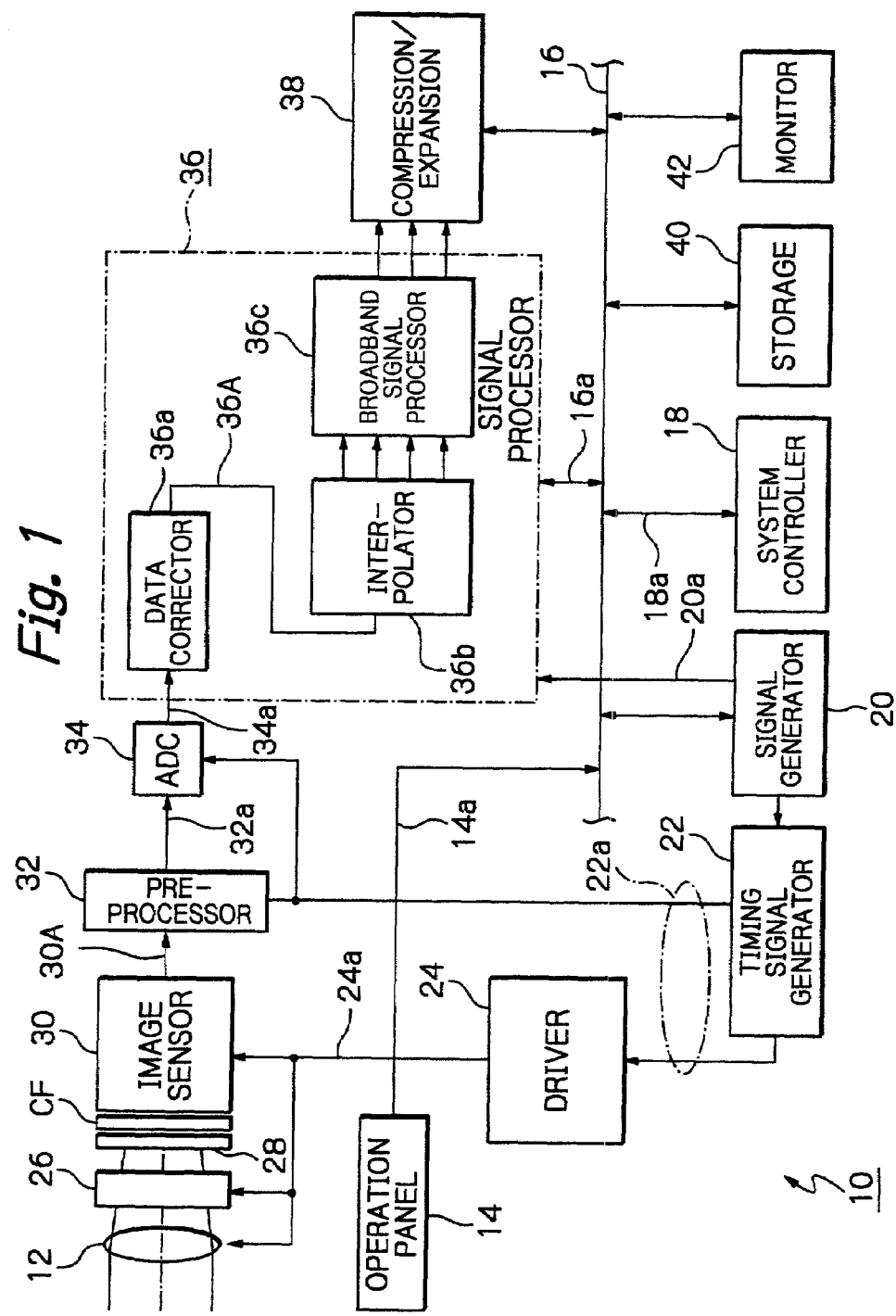
FIG. 1 is a schematic block diagram showing a solid-state image pickup apparatus embodying the present invention.

Referring to FIG. 1, a preferred embodiment of the image pickup apparatus in accordance with the present invention is shown and implemented as a digital still camera by way of example. In FIG. 1, part of the digital still camera not relevant to the understanding of the present invention is not shown. Signals are designated by reference numerals attached to signal lines on which they appear.

As shown, the camera, generally 10, includes an optical lens system 12, an operation panel 14, a system controller 18, a signal generator 20, a timing signal generator 22, and a driver 24. The camera 10 further includes an iris control mechanism 26, an optical low-pass filter 28, a color filter CF, an image sensor 30, a preprocessing 32, an ADC (Analog-to-Digital Converter) 34, a signal processing section 36, a compression/expansion 38, a storage 40, and a monitor 42.

The lens system 12 is representative of, e.g., a plurality of optical lenses, although not shown specifically. The lens system 12 additionally includes a zoom mechanism and an AF (Automatic Focus) control mechanism not shown. The zoom mechanism adjusts the position of the lens system 12 in accordance with a signal 14a output from the operation panel 14, thereby adjusting a view angle. The AF control mechanism controls focus in accordance with a distance between the camera 10 and a subject to be picked up. More specifically, the signal 14a is delivered from the operation panel 14 to the system controller 18 via a system bus 16. A drive signal 24a is fed to the lens system 12 via the signal generator 20, timing signal generator 22 and driver 24 in order to operate the above mechanisms.

The operation panel 14 includes a shutter release bottom, not shown, and a cursor moving function that allows the operator of the camera 10 to select items being displayed on, e.g., the monitor 42. The shutter release bottom provides a pickup timing when operated. In addition, the shutter release bottom delivers the signal 14a indicative of the previously mentioned first mode or the second mode to the system controller 18 via the system bus 16. The first mode and second mode each are set up when the shutter release bottom is pressed to a particular depth stepwise.

The system controller 18 includes a CPU (Central Processing Unit) by way of example and a ROM (Read Only Memory), although not shown specifically. The ROM stores a program describing the operation procedure of the camera 10. By using the information 14a received from the operation panel 14 and the information stored in the ROM, the system controller 18 generates control signals 18a for controlling the operations of the various sections of the camera 10. Specifically, the system controller 18 feeds the control signals 18a to the signal generator 20, timing signal generator 22, preprocessor 32 and ADC 34 although not all of signal lines are shown. Further, the system controller 18 feeds the control signals 18a to the signal processing section 36, compression/expansion 36, storage 40 and monitor 42 via the system bus 16.

The signal generator 20 includes an oscillator for generating a system clock 20a under the control of the system controller 18. The system clock 20a is fed to the timing signal generator 22 and signal processing section 36. Further, the system clock 20a is delivered to the system controller 18 via the system bus 16, defining the operation timing of the system controller 18.

The timing signal generator 22 includes a circuit for generating timing signals 22a in accordance with the system clock 20a and control signals 18a. The timing signals 22a are fed to the various sections of the camera 10 including the driver 24, as illustrated. The driver 24 delivers drive signals 24a to the zoom adjusting mechanism and AF control mechanism of the lens system 12 as well as to the iris control mechanism 26 and image sensor 30.

The iris control mechanism 26 adjusts, in the event of a shot, the sectional area of an incident light beam, i.e., the opening of an iris diaphragm, so that an optimal light beam is incident to the image sensor 30. At this instant, the system controller 18 calculates a lens opening and an exposure time for automatic exposure (AE) on the basis of signal charges output from the image sensor or photoelectric transducer 30. The system controller 18 feeds the control signals 18a representative of the lens opening and exposure time to the timing signal generator 22. In response, the timing signal generator 22 delivers a signal 22a to the driver 24, causing the driver 24 to output the drive signals 24a that correspond to the signal 22a.

The image sensor 30 includes CCDs (Charge Coupled Devices), MOS devices or similar solid-state photosensitive cells, not shown, arranged to define a plane (sensor array) perpendicular to the optical axis of the lens system 12. The optical low-pass filter 28 and color filter CF are positioned in front of the photosensitive cells in the direction of light incidence. The low-pass filer 28 limits the spatial frequency of an optical image to below the Nyquist frequency device by device. The color filter CF separates the colors of the optical image. In the illustrative embodiment, the color filter CF is implemented by a single color filter. Various specific configurations of the color filter CF will be described in detail later.

In the image sensor 30, signal charges generated by photoelectric transduction are output to vertical transfer paths by field shift in accordance with the drive signals 24a. This is effected at a preselected timing, e.g., when an electronic shutter is in an OFF state during a signal reading period. The signal charges are then shifted to a horizontal transfer path by line shift. An output circuit, not shown, is connected to the horizontal transfer path for transforming the signal charges to an analog voltage signal 30A by charge-to-voltage (Q/V) conversion. The analog voltage signal 30A is input to the preprocessor 32. When the photosensitive cells are implemented by CCDs, the image sensor 30 selectively uses a field storage, mixed two-line read type of color multiplexing system or an all pixel reading system in accordance with a signal charge reading mode. Such signal reading systems will be described more specifically later.

The preprocessor 32 includes a CDS (Correlated Double Sampling) section, not shown, made up of a clamp circuit and a sample and hold circuit. The clamp circuit clamps various kinds of noise basically ascribable to, e.g., the CCDs in accordance with the timing signal 22a output from the timing signal generator 22. The sample and hold circuit samples and holds the signal 30A in accordance with the timing signal 22a. The CDS section feeds the resulting noise-free analog signal 32a to the ADC 34.

The ADC 34 quantizes the signal levels of the input analog signal 32a by using a preselected level in accordance with a conversion clock or similar timing signal 22a, thereby outputting a digital signal 34a. The digital signal 34a is input to the signal processing section 36.

The signal processing section 36 includes a data corrector 36a, an interpolator 36b, and a broadband signal processor 36. The data corrector 36a includes a gamma correcting circuit for the correction of colors and an AWB (Automatic White Balance) circuit for the automatic adjustment of white balance. The gamma correction has a ROM storing a lookup table that lists a plurality of data sets, i.e., digital signals to be input and corrected data to be output in one-to-one correspondence. The data corrector 36a corrects the input signal 34a in accordance with the timing signal 22a output from the timing signal generator 22.

Figure 2:
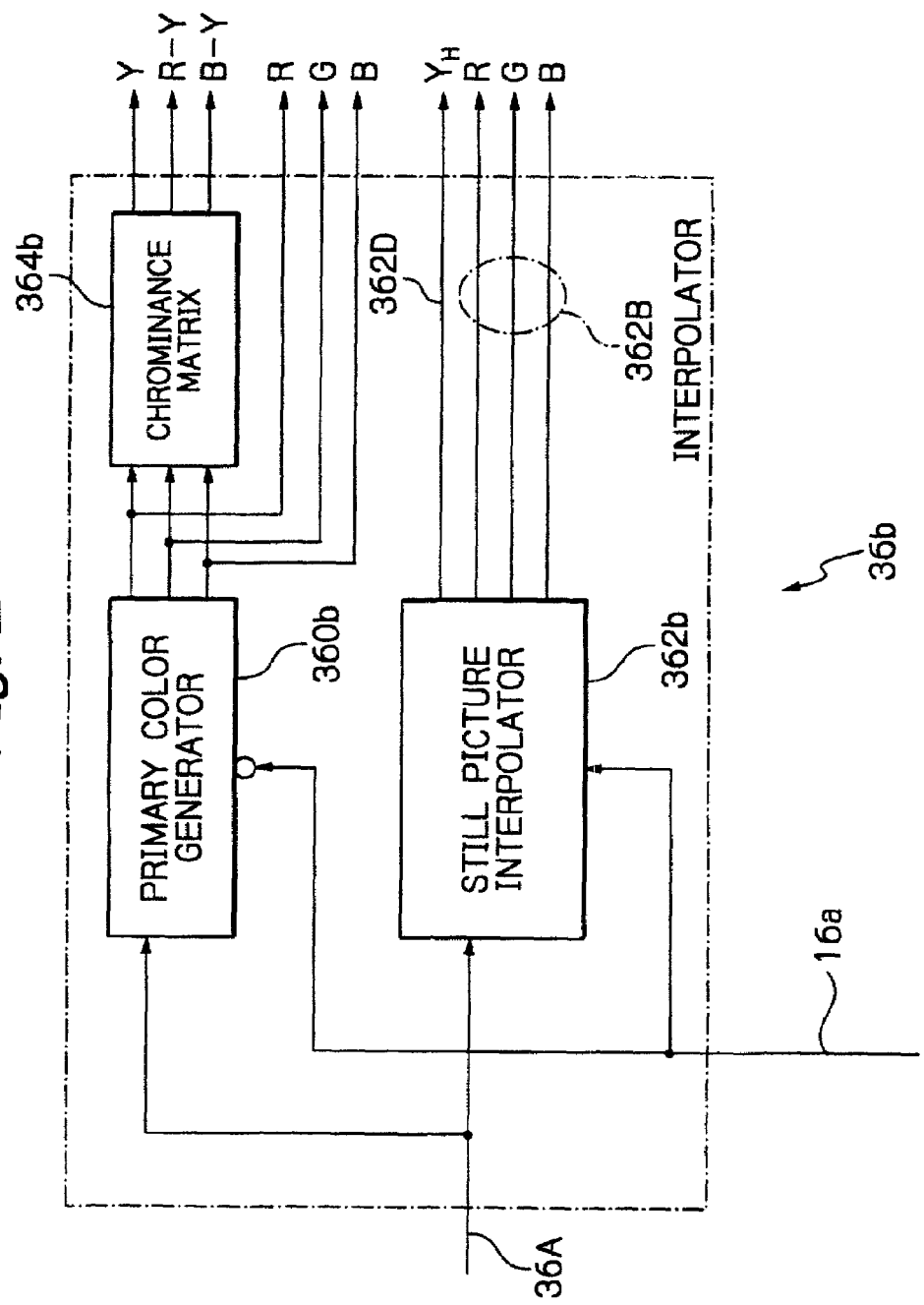
FIG. 2 is a schematic block diagram showing a specific configuration of an interpolating section included in the illustrative embodiment.

In the illustrative embodiment, the interpolator 36b generates pixel data of three primary colors R, G and B by using the image data, which are output from the image sensor 30 and include complementary colors. Also, the interpolator 36b interpolates the R, G and B pixel data in positions where the photosensitive cells photosensitive cells and/or virtual pixels are located. As shown in FIG. 2 specifically, the interpolator 36b includes a primary color generator 360b that operates when the operator presses the shutter release bottom of the operation panel 14 to a half-stroke position. A still picture interpolation 362b operates when the operator presses the shutter release bottom to a full-stroke position. The half-stroke position and full-stroke position correspond to the first mode and second mode, respectively. A chrominance matrix 364b generates luminance data Y and chrominance data (R-Y) and (B-Y) on the basis of the R, G and B pixel data output from the primary color generator 360b.

It is to be noted that the chrominance matrix 364b is not necessary if the monitor 42, FIG. 1, has an RGB display capability. The system controller 18 feeds the control signals 18a to the signal processing section 36 via a system bus branch 16a so as to cause either one of the primary color generator 360b and still picture interpolator 362b to operate. The control signals 18a may be implemented by a positive signal and a negative signal by way of example.

Figure 3:
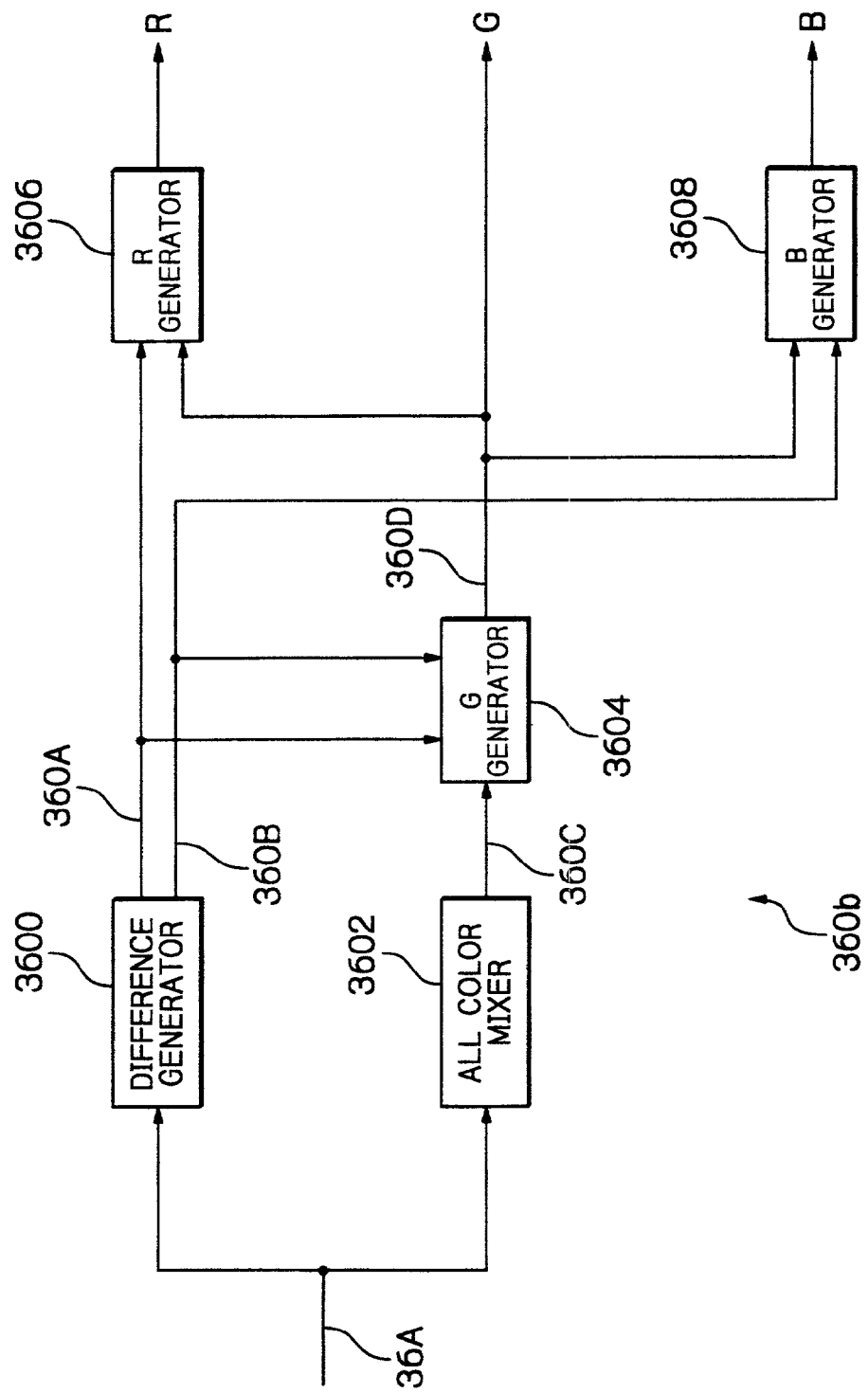
FIG. 3 is a schematic block diagram showing a specific configuration of a primary color generating section included in the interpolating section of FIG. 2.

More specifically, the primary color generator 360b produces R, G and B pixel data from the pixel data, which include complementary colors, by the field storage, mixed two-line read type of color multiplexing system. As shown in FIG. 3 specifically, the primary color generator 360b includes a difference generator 3600, an all color mixer 3602, a G generator 3604, an R generator 3606, and a B generator 3608.

The difference generator 3600 receives from the data corrector 36a, FIG. 1, pixel data 36A derived from the signal charges that are mixed in color on a two-line basis by interlace scanning in each of the first and second fields. The difference generator 3600 generates two different pixel difference data 360A and 360B by using, among the color-mixed pixel data, the pixel data that belong to different fields, but spatially adjoin each other.

The all color mixer 3602 mixes all colors applied to color filter segments that lie in a preselected region. In the illustrative embodiment, the all color mixer 3602 adds yellow (Ye), cyan (Cy), magenta (Mg) and G. For the addition, use may be made of, among the color-mixed pixel data, the pixel data that belong to different fields, but spatially adjoin each other. The all color mixer 3602 delivers the result of color mixture 360C to the G generator 3604.

The G generator 3604 subtracts the two differences 360A and 360B output from the difference generator 3600 from the result 360C of color mixture. The G generator 3604 then divides the resulting difference by 5, which is a specific preselected value, to thereby generate G pixel data 360D. The G pixel data 360D is directly output and is fed to the R generator 3606 and B generator 3608 at the same time.

The R generator 3606 adds the G pixel data 360D to the output 360A of the difference generator 3600 for thereby generating R pixel data. The B generator 3608 adds the G pixel data 360D to the other output 360B of the difference generator 3600 for thereby generating B pixel data.

The still picture interpolator 362b, FIG. 2, interpolates the three primary colors R, G and B in void positions where the photosensitive cells are absent due to pixel shift, i.e., virtual pixels. For this purpose, the interpolator 362b uses pixel data, which include complementary colors, surrounding each virtual pixel. The interpolator 362b then executes interpolation with pixels where R, G and B are absent by using the above interpolated R, G and B, thereby outputting pixel data. The system controller 18 causes the primary color generator 360b and still picture interpolator 362b to selectively operate, as stated earlier. Preferably, the primary color generator 360b and still picture interpolator 362b each should be provided with a particular operation enable status.

Figure 4:
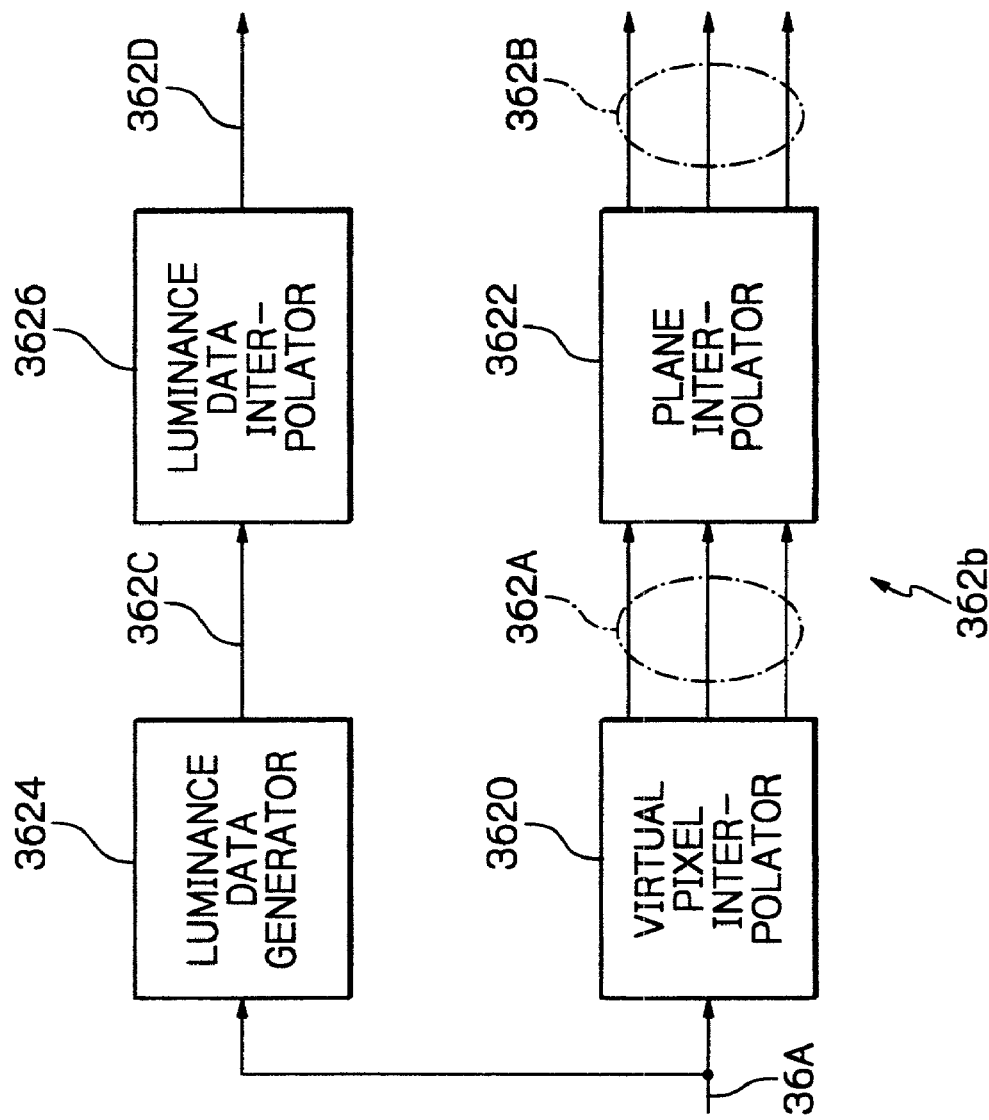
FIG. 4 is a schematic block diagram showing a specific configuration of a still picture interpolating section also included in the interpolating section.

As shown in FIG. 4, the still picture interpolator 362b includes a virtual pixel interpolator 3620, a plane interpolator 3622, a luminance data generator 3624, and a luminance data interpolator 3626. The virtual pixel interpolator 3620 uses four-color image data around a virtual pixel for generating R, G and B in a matrix. The resulting R, G and B pixel data 362A are input to the plane interpolator 3622.

Figure 6:
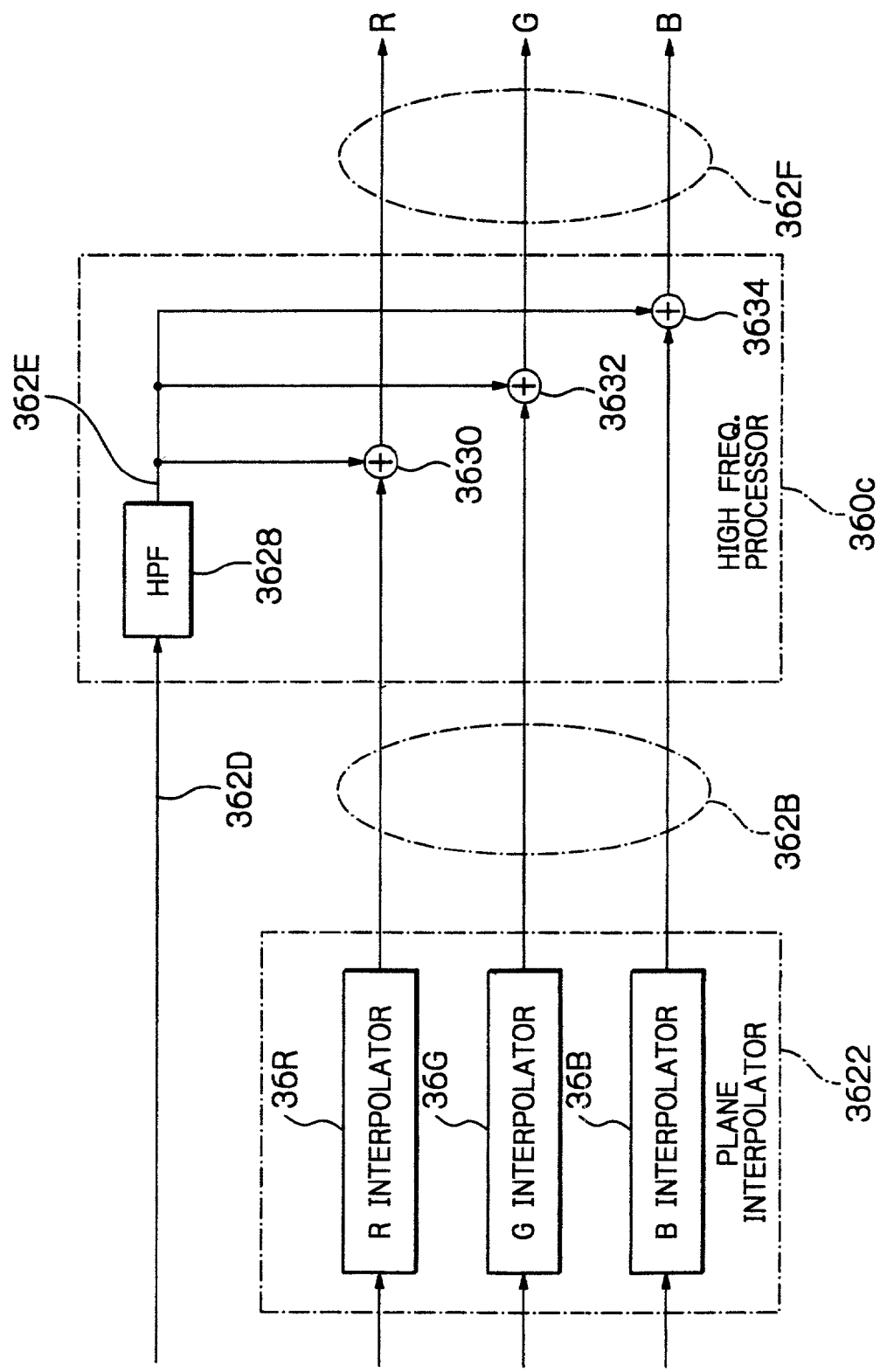
FIG. 6 is a schematic block diagram showing a specific configuration of a plane interpolating section shown in FIG. 4 and a high frequency processing section shown in FIG. 5 together with the connection of the two sections.

In the illustrative embodiment, the color filter CF includes complementary color filer segments. It follows that pixel data of primary colors R, G and B are absent at some positions despite the presence of photosensitive cells. The plane interpolator 3622 interpolates R, G and B pixel data in such positions. As shown in FIG. 6 specifically, the plane interpolator 3622 includes an R interpolator 36R, a G interpolator 36G, and a B interpolator 36B.

The plane interpolator 3622 performs calculations for color-by-color interpolation by using a mean value of two or four pixels in accordance with a correlation in the oblique, horizontal and/or vertical direction. The plane interpolator 3622 therefore delivers pixel data 362B greater in number than the actual photosensitive cells to the broadband signal processor 36, FIG. 1.

The luminance data generator 3624 generates luminance data $Y_H$ for virtual pixels on the basis of four-color pixel data available with the color filter segments. Each luminance data $Y_H$ is the sum of pixel data of four colors. The luminance data $Y_H$ are fed to the luminance data interpolation 3626 as luminance data 362C for virtual pixels.

Specifically, by using the pixel data 36A, the luminance data generator 3624 calculates luminance data $Y_H$ for each pixel where an photosensitive cell is present. More specifically, the generator 3624 uses a mean value of two or four pixels in accordance with a correlation in the oblique, horizontal and/or vertical direction. By executing interpolation with the calculated luminance data $Y_H$, the generator 3624 feeds the luminance data $Y_H$ to the broadband signal processor 36 as luminance data 362D, which are greater in number than the actual photosensitive cells.

Alternatively, to generate the plane luminance data $Y_H$ by interpolation, use may be made of a low-pass filter whose frequency band extends to a high frequency range.

Figure 5:
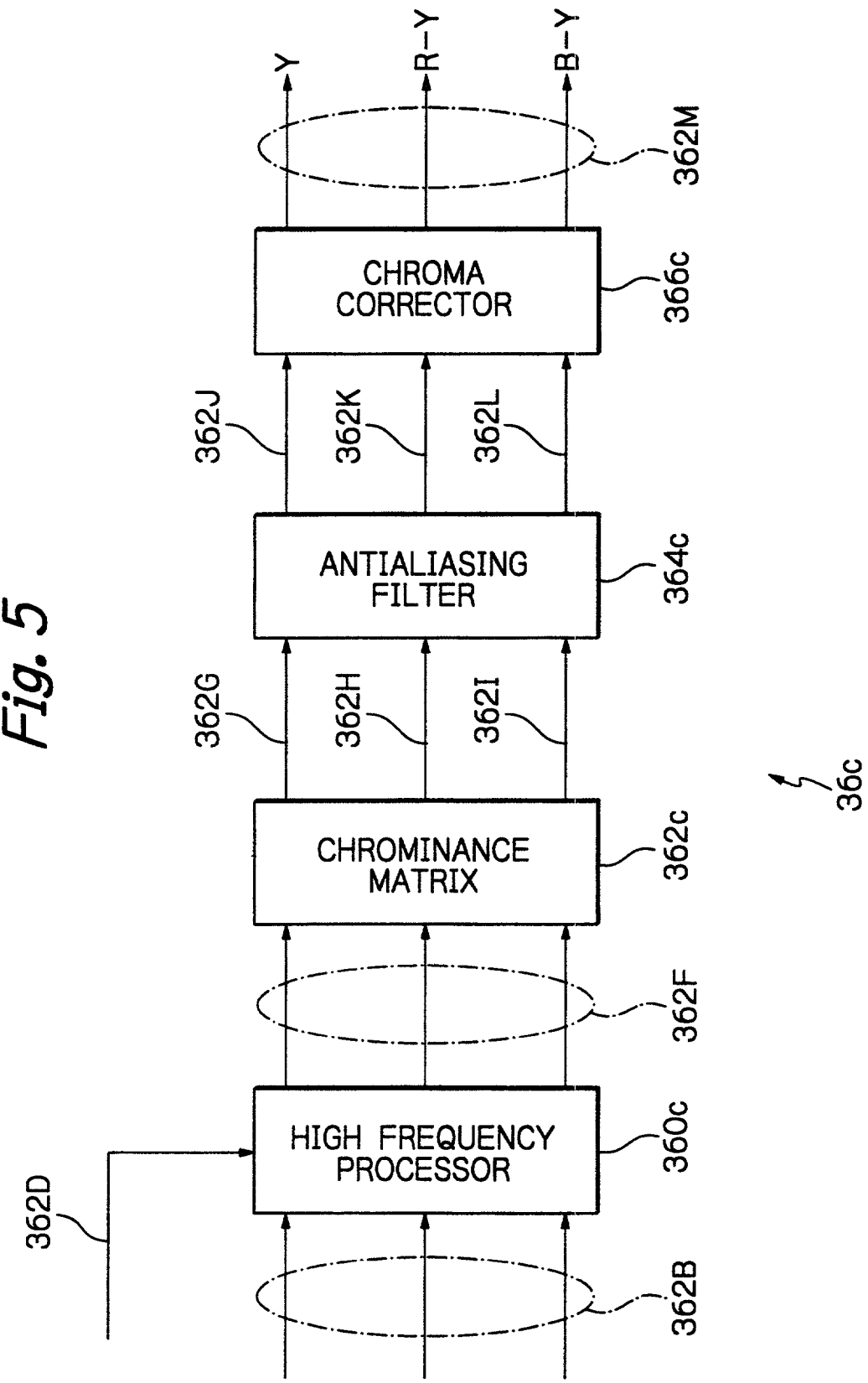
FIG. 5 is a schematic block diagram showing a specific configuration of a broadband signal processing section included in the illustrative embodiment.

FIG. 5 shows a specific configuration of the broadband signal processor 36. As shown, the broadband signal processor 36c includes a high frequency processor 360c, a chrominance matrix 362c, an antialiasing filter 364c, and a chroma corrector 366c. The high frequency processor 360c adds a high frequency component to each of R, G and B pixel data 362B. FIG. 6 shows a specific configuration of the high frequency processor 360c. As shown, the high frequency processor 360c includes an HPF (High-Pass Filter) 3628 and adders 3630, 3632 and 3634. The HPF 3628 is a digital filter that passes only the high frequency components of the plane luminance data $Y_H$ input thereto.

Luminance data 362E generated by the HPF 3628 and containing high frequency components are fed to one input of each of the adders 3630 through 3634. The plane pixel data R, G and B (362B) are respectively fed to the other input of each of the adders 3630 through 3634. As a result, the adders 3632 through 3634 produce plane pixel data R, G and B containing high frequency components (362F) and deliver them to the chrominance matrix 362c.

Referring again to FIG. 5, the chrominance matrix 362c generates luminance data Y and chrominance data (R-Y) and (B-Y) which are extended in frequency band, in accordance with the plane pixel data R, G and B (362F). Specifically, the chrominance matrix 362c outputs the three kinds of pixel data by multiplying each of the pixel data R, G and B by a preselected particular coefficient. For this purpose, conventional color-by-color coefficients are used. The chrominance matrix 362c feeds the resulting data 362G, 362H and 362I to the antialiasing filter 364c.

The antialiasing filter 364c prevents aliasing distortion from occurring in the input data 362G, 362H and 362I with respect to frequency. The antialiasing filter 364c includes three LPFs (Low-Pass Filters), not shown, respectively covering the frequency bands of the luminance data Y and chrominance data (R-Y) and (B-Y), which respectively correspond to the data 362G, 362H and 362I. The LPFs have such a frequency characteristic that the signal level falls slowly enough to obviate distortion. Data 362J, 362K and 362L representative of the luminance data Y and chrominance data (R-Y) and (B-Y), respectively, are fed from the antialiasing filter 364c to the chroma corrector 366c.

The chroma corrector is implemented by, e.g., a transversal filter and makes up for the fall of response of the input data 362J, which is representative of the luminance data Y, in the high frequency range. This enhances the contour of a picture when it is displayed. Further, the chroma correction 366c adjusts the gain of the data 362K and 362L representative of the chrominance data (R-Y) and (B-Y) respectively. By so increasing the levels of the color signals, the chroma corrector 366c increases the resolution and chroma of a picture in the event of display. The chroma corrector 366c delivers the corrected luminance data Y and chrominance data (R-Y) and (B-Y) to the compression/expansion 38, FIG. 1, as output signals 362M.

Referring again to FIG. 1, the compression/expansion 38 includes a compression circuit and an expansion circuit, although not shown specifically. The compression circuit compresses image data in accordance with, e.g., JPEG (Joint Photographic Experts Group) standards using orthogonal transform. The expansion circuit expands the compressed image data. In a record mode, the compression/expansion 38 feeds compressed data to the storage 40 via the system bus 16 under the control of the system controller 18. In addition, the compression/expansion 38 may simply pass the data output from the chrominance matrix 364b therethrough and deliver them to the monitor 42 via the system bus 16 under the control of the system controller 18. In a reproduction mode, the compression/expansion 38 expands data read out of the storage 40 and fed thereto via the system bus 16. The expanded data are also fed to the monitor 42 and displayed thereby.

The storage 40 includes a recording section for recording image data in a recording medium and a reproducing section for reading image data out of the medium, although not shown specifically. The recording medium may be implemented as, e.g., Smart Media (trade name) or similar semiconductor memory, a magnetic disk or an optical disk. When use is made of a magnetic disk or an optical disk, the storage 40 additionally includes a modulating section for modulating image data and a head for writing the modulated image data. The monitor 42 displays the luminance data and chrominance data or the R, G and B data received via the system bus 16 under the control of the system bus 16, while taking account of a screen size and adjusting the timing.

The camera 10 having the above-described configuration broadens the frequency band of the color image signal including complementary colors. To better understand the operation of the camera 10, a relation between the color arrangement of the color filter CF and the image sensor 30 will be described hereinafter.

Figure 7:
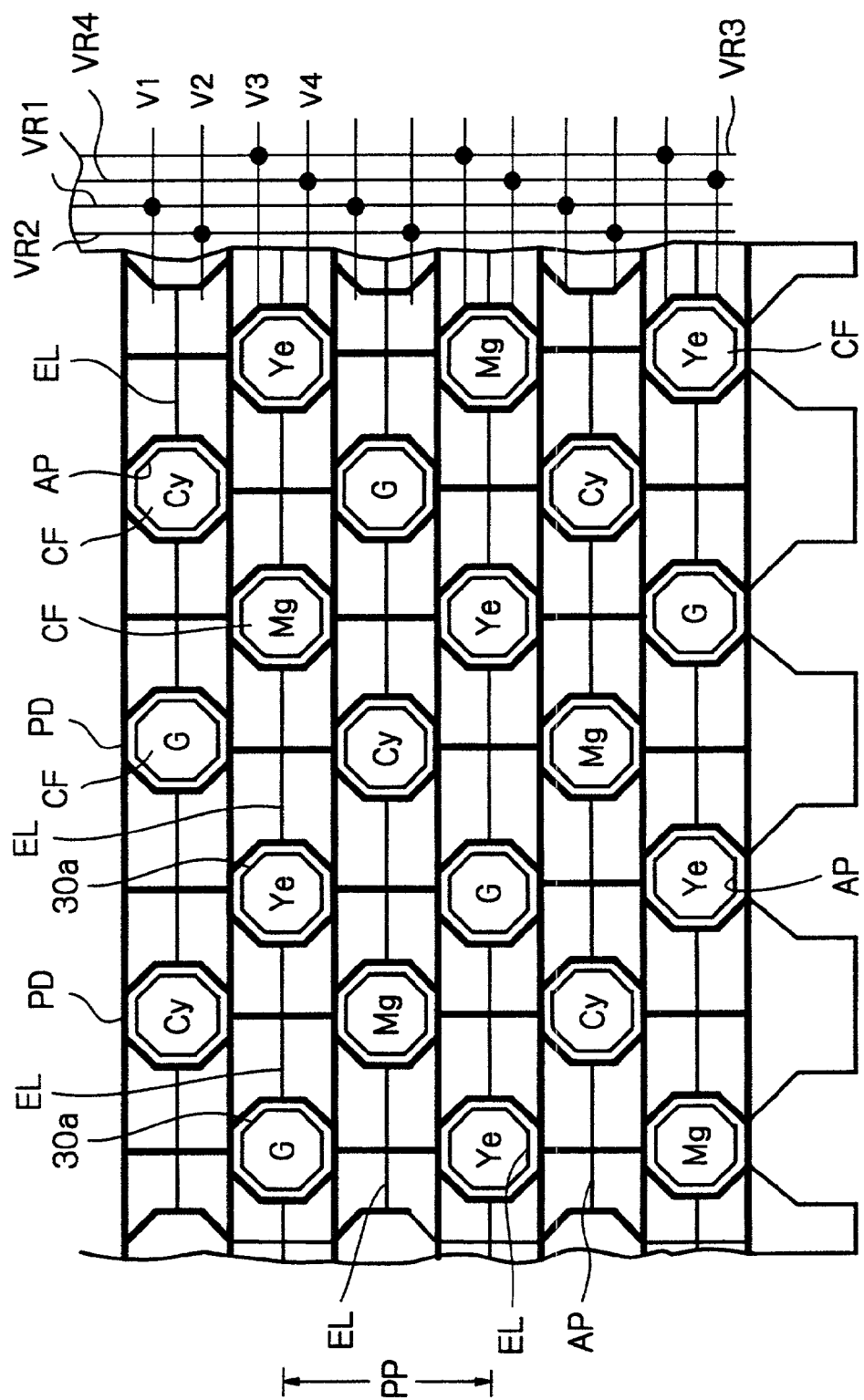
FIG. 7 is a view showing a relation between color filter segments, apertures formed in photosensitive cells and transfer paths included in the image pickup section of the illustrative embodiment, as seen from the light input side.

As shown in FIG. 7, the image sensor 30 includes photodiodes or photosensitive cells PD for transforming light incident thereto to corresponding electric signals. The photodiodes PD are bidimensionally arranged in photosensitive portions (cells) 30a such that the photodiodes PD adjoining the photodiodes PD that photoelectrically transform incident light are shifted from the latter in both of the vertical and horizontal directions. Signal charges generated by the photodiodes PD are applied to electrodes EL that extend in such a manner as to go around apertures AP formed in the front of the photosensitive portions 30a. Vertical transfer registers VR1 through VR4 sequentially transfer the signal charges fed thereto via the electrodes EL in the vertical direction of the photosensitive portions 30a.

The vertical transfer registers VR1 through VR4 transfer the above signal charges in accordance with vertical transfer drive signals V1 through V4, respectively. More specifically, the registers VR1 through VR4 are arranged in a four electrode structure for a single photosensitive portion. Regions horizontally adjoining a single photosensitive portion are arranged in a two electrode structure, implementing the previously stated shift of the pixels. In the illustrative embodiment, the apertures AP have an octagonal honeycomb configuration. While the apertures AP are generally implemented as a tetragonal lattice, they may be provided with any other suitable configuration so long as they enhance sensitivity and allow the registers VR1 through VR4 to have the same width for efficient transfer. For example, the apertures AP may even be rhombic, e.g., a tetragonal lattice rotated by 45° or a hexagon.

As shown in FIG. 7, the color filter CF has filer segments, also labeled CF, each covering the respective aperture AP. Each photodiode PD is positioned beneath the respective color filter segment CF. Assume that the photodiodes PD are arranged at a pixel pitch or distance PP in both of the horizontal and vertical directions. Then, the apertures AP are bidimensionally arranged in rows and columns that are shifted by the pixel pitch PP each, as illustrated. When the apertures AP each are polygonal, e.g., octagonal, they may be densely arranged at a small pitch. As for the octagonal apertures AP shown in FIG. 7, dense arrangement is achievable if the apertures AP are shifted by one half of the pixel pitch PP in both of the horizontal and vertical directions. In this manner, dense arrangement depends on the shape of the apertures AP.

Generally, the image sensor 30 has either one of a tetragonal lattice configuration and a honeycomb configuration. The honeycomb configuration is equivalent to the tetragonal lattice configuration rotated by 45° and having the pixel pitch PP of N μm. While nearby pixels of the tetragonal lattice configuration are spaced by a distance of |PP|=N μm, nearby pixels of the honeycomb configuration are spaced by a distance of $N \times (2)^{-1/2}$ that is shorter than the distance |PP|. Therefore, in the honeycomb configuration, pixels are arranged more densely than in the tetragonal lattice configuration and implements, in principle, $(2)^{1/2}$ times higher resolution in both of the horizontal and vertical directions. When the honeycomb configuration is rearranged into the tetragonal lattice configuration matching with the output format, the signal processing section 36 interpolates virtual pixels on the basis of real pixels adjoining them. It will be seen that when pixels of colors and luminance not obtained are interpolated and rearranged while the above interpolation is under way, the resulting resolution is higher than when the photodiodes PD are simply arranged in the tetragonal lattice configuration.

Figure 8:
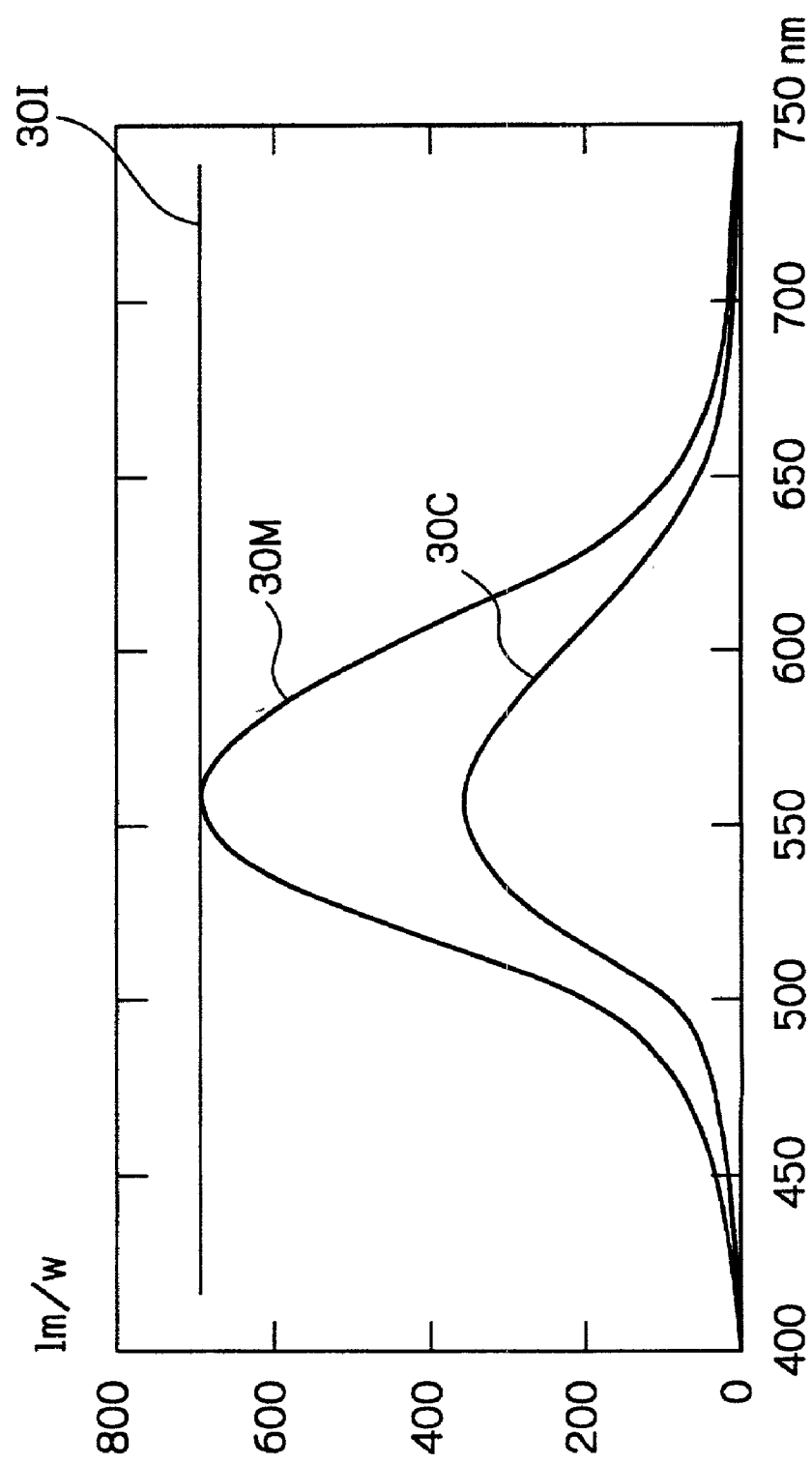
FIG. 8 is a graph showing a relation between the spectral energy of light incident to the image sensor, relative spectral sensitivity, and wavelength-dependent spectral energy measured.
Figure 9A:
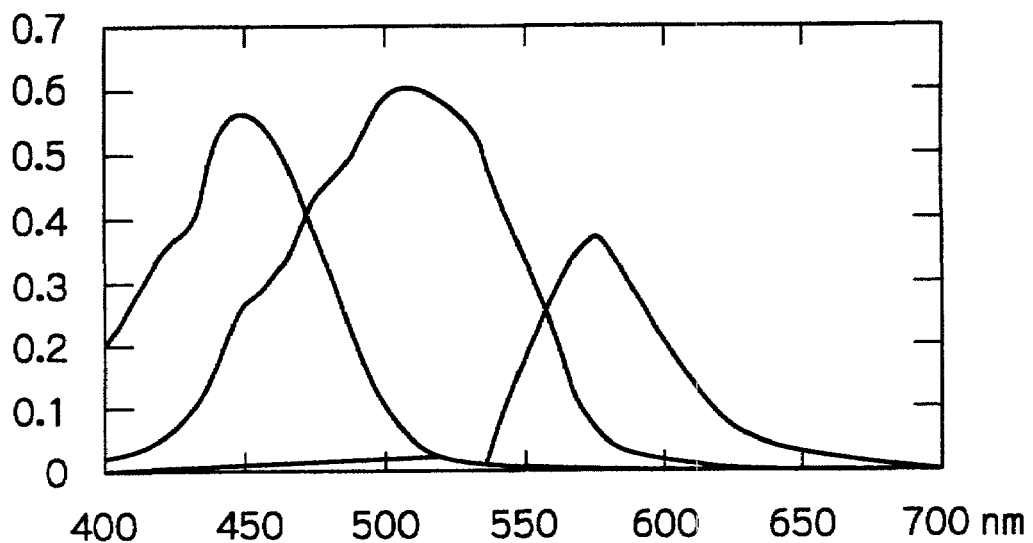
FIG. 9A is a graph showing a relation between wavelength and relative sensitivity derived from incident light picked up in primary colors.

In the illustrative embodiment, the color filter CF uses complementary colors, as stated earlier. Why complementary colors are used will be briefly described hereinafter with reference to FIGS. 8 through 10. Today, there is an increasing demand for the effective use of incident light in order to guarantee sensitivity despite the current trend toward a smaller chip size. FIG. 8 shows incident light 30I whose spectral energy remains constant without regard to wavelength, a spectral luminous efficiency curve 30C varying along with wavelength, and a photometric spectral curve 30M dependent on wavelength and produced by multiplying spectral luminous efficiency by an amplifier gain 30K. FIG. 9A shows relative spectral sensitivity available with primary color filter segments R, G and B while FIG. 9B shows relative spectral sensitivity available with complementary color filter segments Mg, Ye, G and Cy.

Figure 9B:
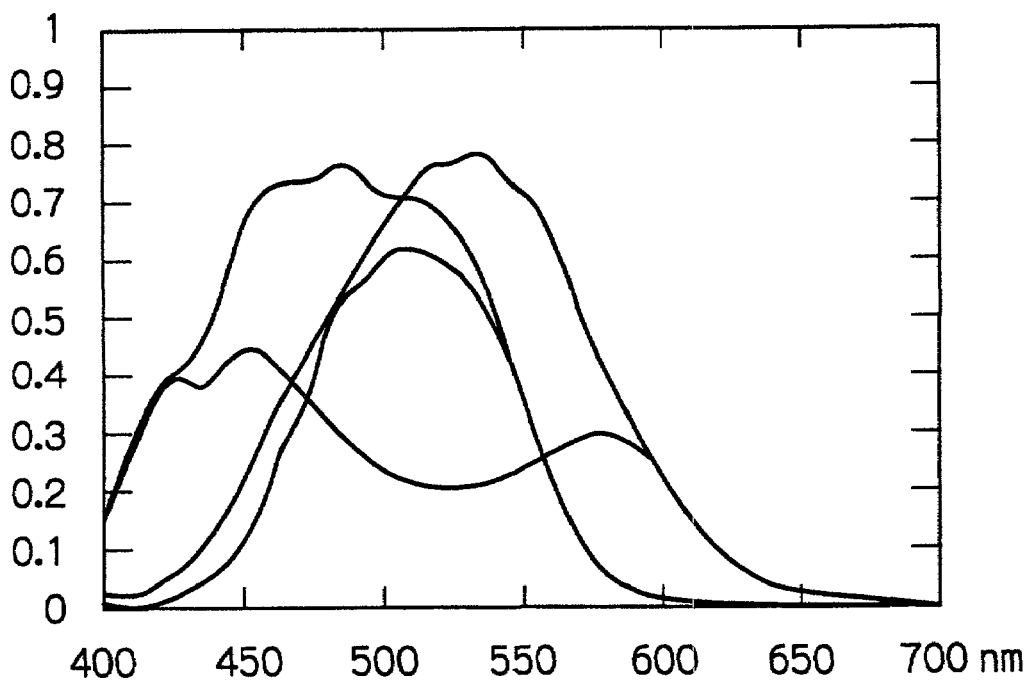
FIG. 9B is a graph similar to FIG. 9A, showing the relation derived from incident light picked up in complementary colors.
Figure 10A:
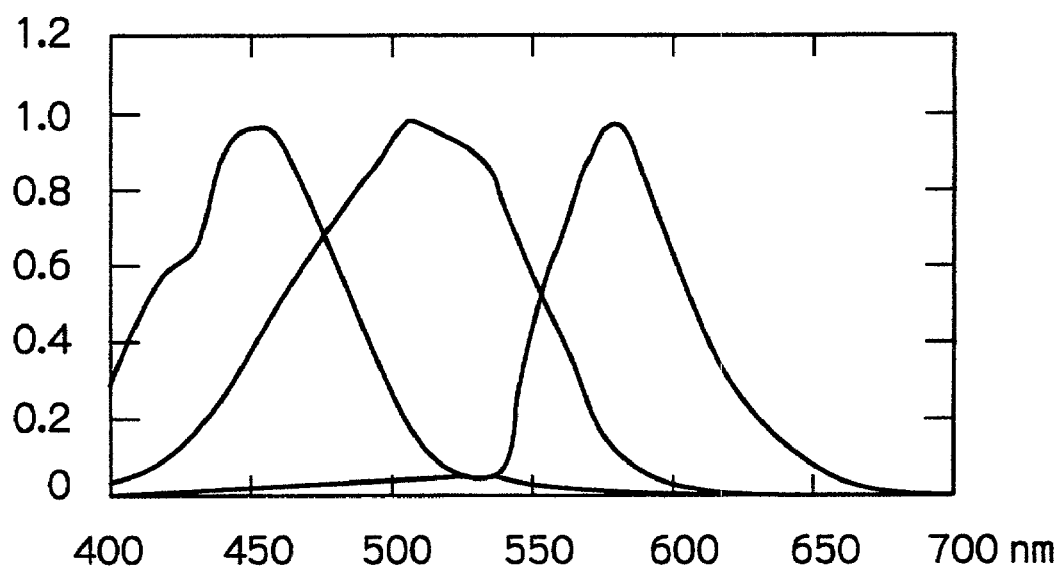
FIG. 10A is a graph showing a relation between wavelength normalized by the maximum sensitivity and relative sensitivity, determined when incident light was picked up in primary colors.
Figure 10B:
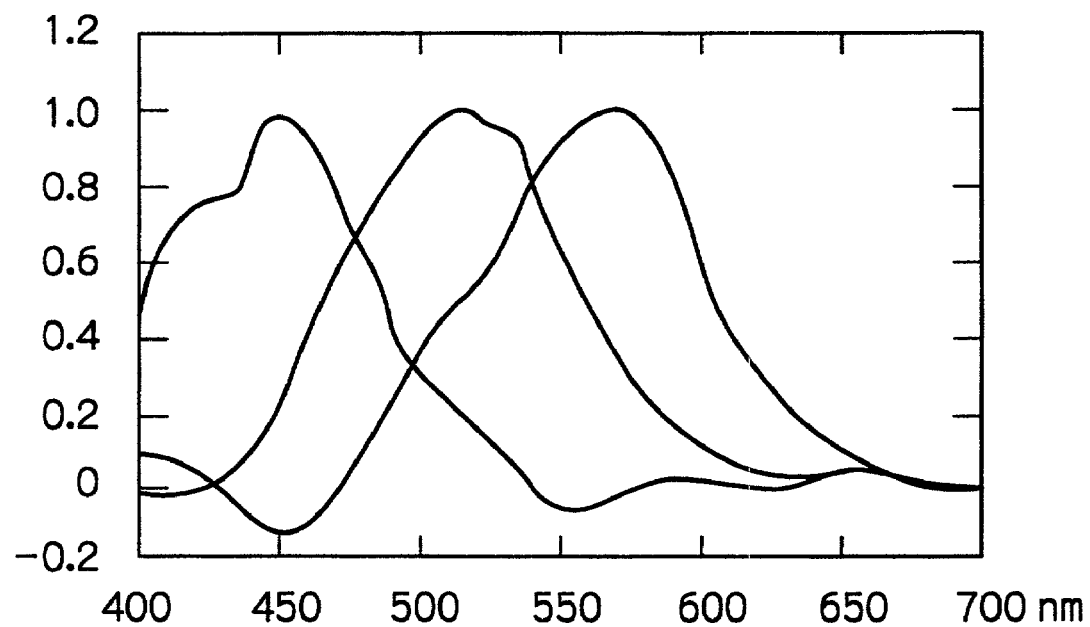
FIG. 10B is a graph similar to FIG. 10A, showing the relation determined when incident light was picked up in complementary colors.

FIGS. 10A and 10B respectively correspond to FIGS. 9A and 9B, and each shows R, G and B curves normalized by the maximum sensitivity. As shown, higher relative sensitivity is achievable with complementary color filters (FIG. 10A) than with primary color filters (FIG. 9A). Also, the normalized RGB curves derived from complementary color filters (FIG. 10B) define greater areas than the RGB normalized curves derived from primary color filters (FIG. 9B). It will therefore be seen that complementary color filters contribute even to the effective conversion of incident light to signal charges, i.e., the effective use of incident light.

Specific patterns applicable to the color filter CF, which have complementary colors arranged in the honeycomb configuration, will be described hereinafter. For the filter segments of each color filter CF, four of Cy, Mg, Ye, W and G, including colors for subtraction mixture, are selected.

Figure 11:
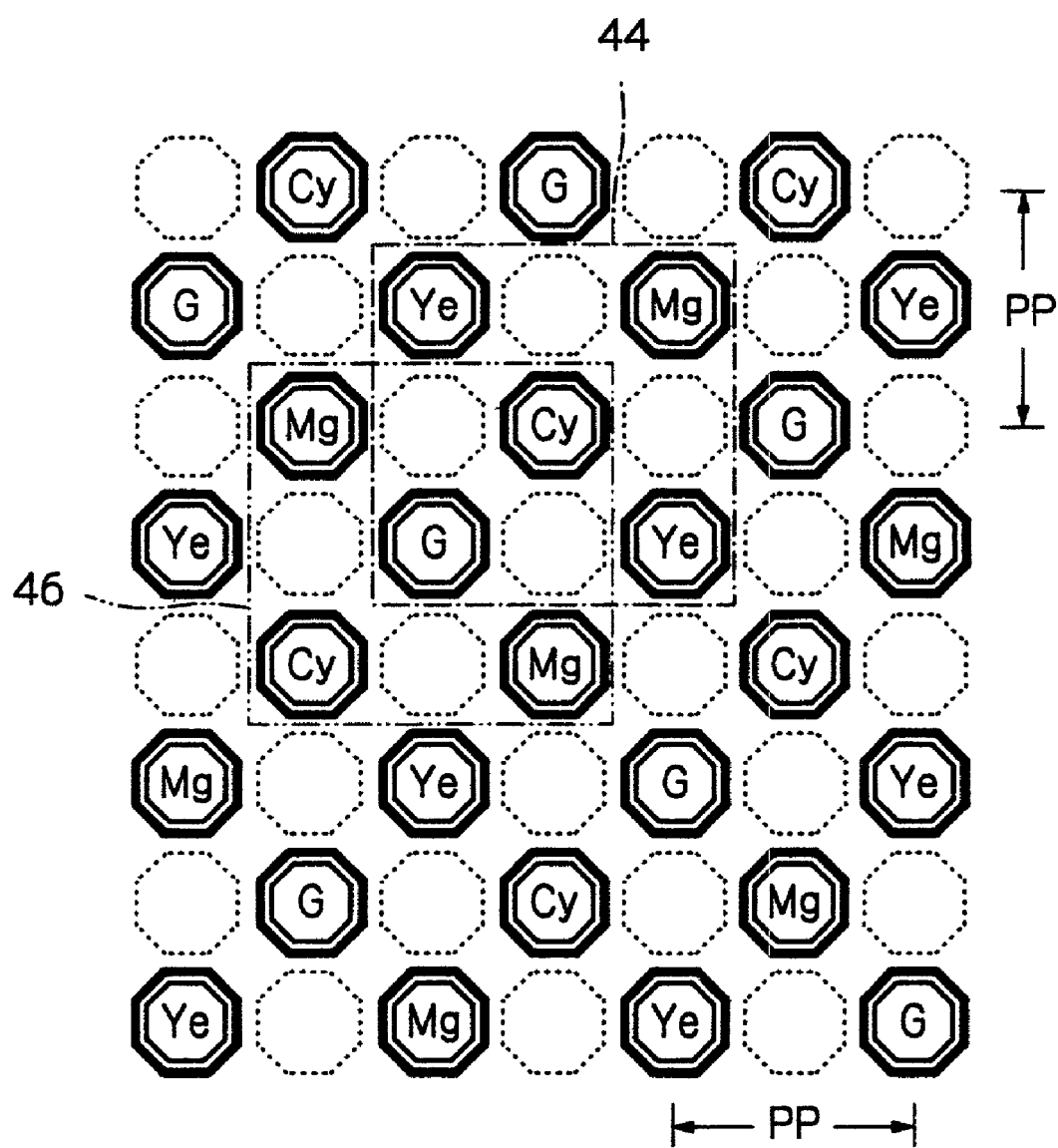
FIG. 11 is a view showing an overlapping tetragonal YeMg_G full-checker, tetragonal MgCy full-checker pattern applicable to a color filter included in the image pickup section of the illustrative embodiment.

FIG. 11 shows a specific color filter pattern using the colors Cy, Mg, Ye and G. As shown, a tetragonal lattice 44 has, e.g., the color Ye positioned at two diagonally opposite corners and has colors Mg and G different from Ye and from each other positioned at the other diagonally opposite corners. Cy is positioned at the center of the lattice 44. A tetragonal lattice 46 is formed by shifting the tetragonal lattice 44 by half a pitch in the horizontal and vertical directions. The lattice 46 has the color Cy positioned at two diagonally opposite corners and has Mg, which is different from Ye, Cy and G forming a triangle in the direction of shift, positioned at the other diagonally opposite corners. In this configuration, Cy and Mg each form a checker pattern. The lattices 44 and 46 partly overlap each other. Let this filter pattern be referred to as an overlapping, tetragonal YeMg_G full-checker and tetragonal MgCy full-checker pattern.

Stated another way, the pattern shown in FIG. 11 is the repetition of a tetragonal lattice rotated by 45° having each side defined by three pixels. For example, a first color Ye is assigned to the vertex of the tetragon while a second color Mg and a third color Cy are assigned to a tetragonal lattice within the tetragon, forming a full-checker pattern. A fourth color G is assigned to the center of the tetragon. The tetragon is shifted such that its vertex coincides with the vertex of the next tetragon. A procedure for generating R, G and B pixel data with the above pattern will be described in detail later.

The pattern of color filter segments shown in FIG. 11 is only illustrative and may be replaced with any other suitable pattern. For example, three or four of the colors Cy, Mg, Ye, W and G may be assigned to the color filter segments. In such a case, the filter segments will be arranged at half a pitch in accordance with the shifted arrangement of the photosensitive cells.

Figure 12A:
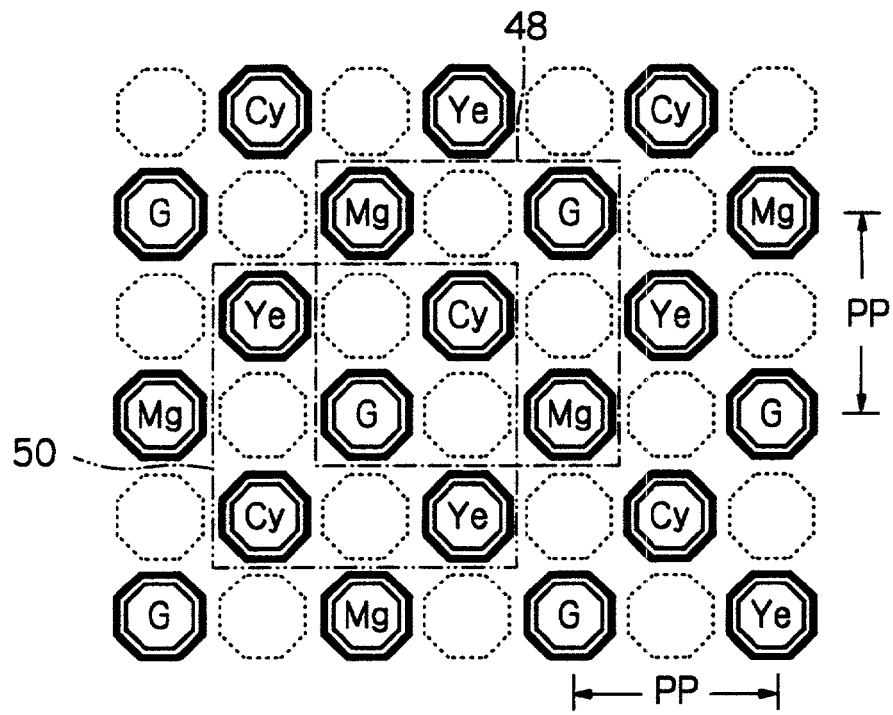
FIG. 12A is a view showing an overlapping tetragonal MgG full-checker, tetragonal YeCy full-checker pattern also applicable to the color filter.

FIG. 12A shows a specific pattern using filter segments of four different colors. As shown, Mg is positioned at two diagonally opposite corners of a tetragonal lattice 48. G, which is a color different from Mg, is positioned at the other two diagonally opposite corners of the lattice 48. The four corners therefore form a MgG full-checker pattern. Cy, which is one of the other two colors, is positioned at the center of the lattice 48. A tetragonal lattice 50 is formed by shifting the lattice 48 by half a pitch in the vertical and horizontal directions. Cy is positioned at two diagonally opposite corners of the lattice 50 while Ye is positioned at the other two diagonally opposite corners, forming a full-checker pattern. The lattices 48 and 50 partly overlap each other. In this sense, the pattern shown in FIG. 12A is an overlapping, tetragonal MgG full-checker and tetragonal YeCy full-checker pattern.

The pattern shown in FIG. 12A may also be translated into the repetition of a tetragonal lattice rotated by 45° having three pixels at each side. For example, a first color Mg is assigned to the vertex of the tetragon while a second color Ye different from the first color Mg is assigned to the vertex of a tetragon adjoining the above tetragon. In each tetragon, two colors Ye, Cy different from the first colors Mg form a full-checker pattern. A fourth color G is assigned to the center of the tetragon. Four pixels present in the overlapping portion of the two tetragons are different in color from each other.

Figure 12B:
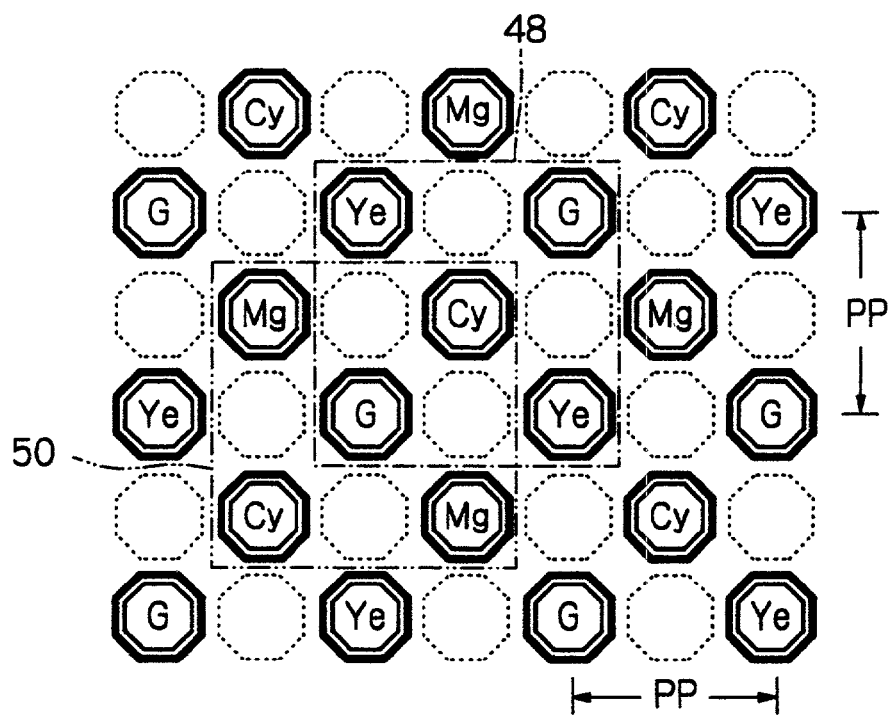
FIG. 12B is a view showing an overlapping tetragonal YeG full-checker, tetragonal MgCy full-checker pattern also applicable to the color filter.
Figure 13:
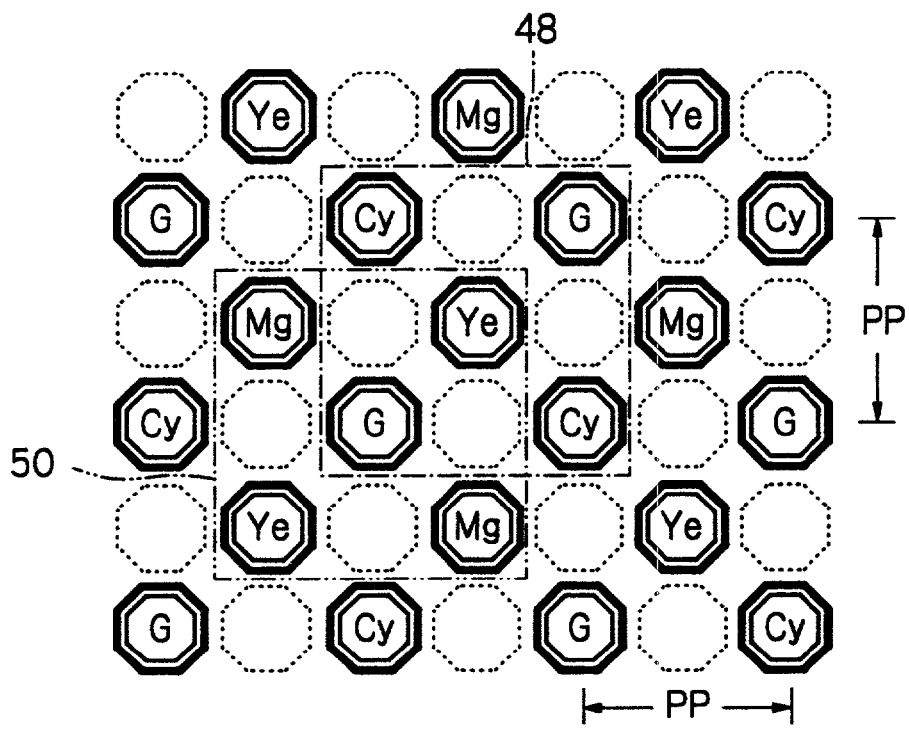
FIG. 13 is a view showing an overlapping tetragonal CyG full-checker, tetragonal MgYe full-checker pattern also applicable to the color filter.

FIG. 12B shows another specific pattern based on the same rule as the pattern of FIG. 12A, but different from the latter in that Mg and Ye are replaced with each other. Such a pattern is an overlapping, tetragonal YeG full-checker and tetragonal MgCy full-checker pattern. FIG. 13 shows an overlapping, tetragonal CyG full-checker and tetragonal MgYe full-checker pattern. This pattern is identical with the pattern of FIG. 12B except that Ye is replaced with Cy. In this manner, the patterns shown in FIGS. 12A, 12B and 13 each use Cy, Ye, Mg and G.

Figure 14:
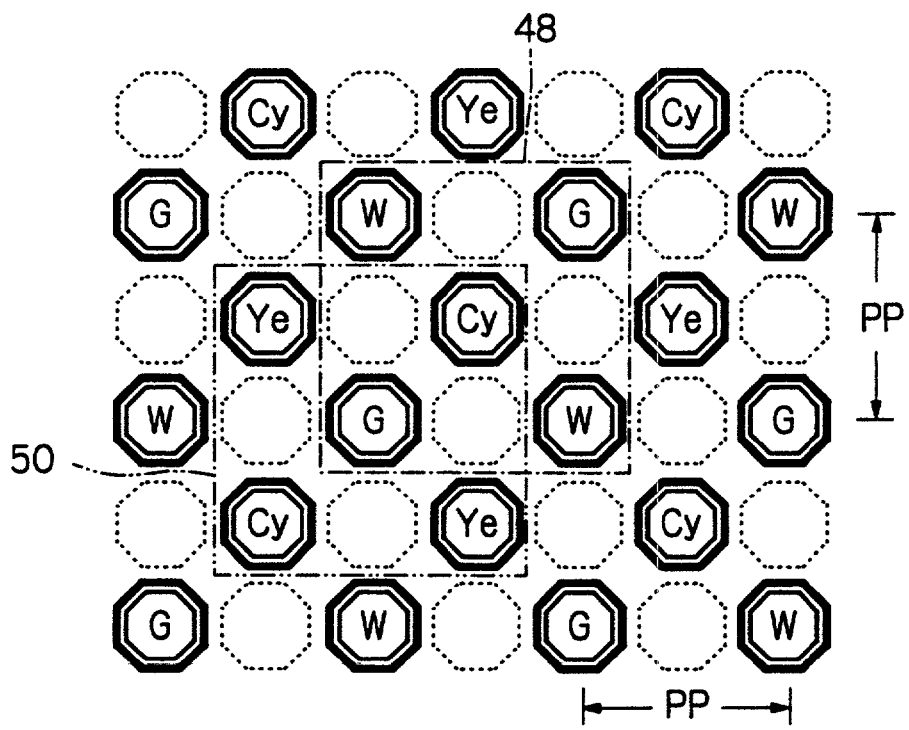
FIG. 14 is a view showing an overlapping tetragonal WG full-checker, tetragonal YeCy full-checker pattern also applicable to the color filer.
Figure 15A:
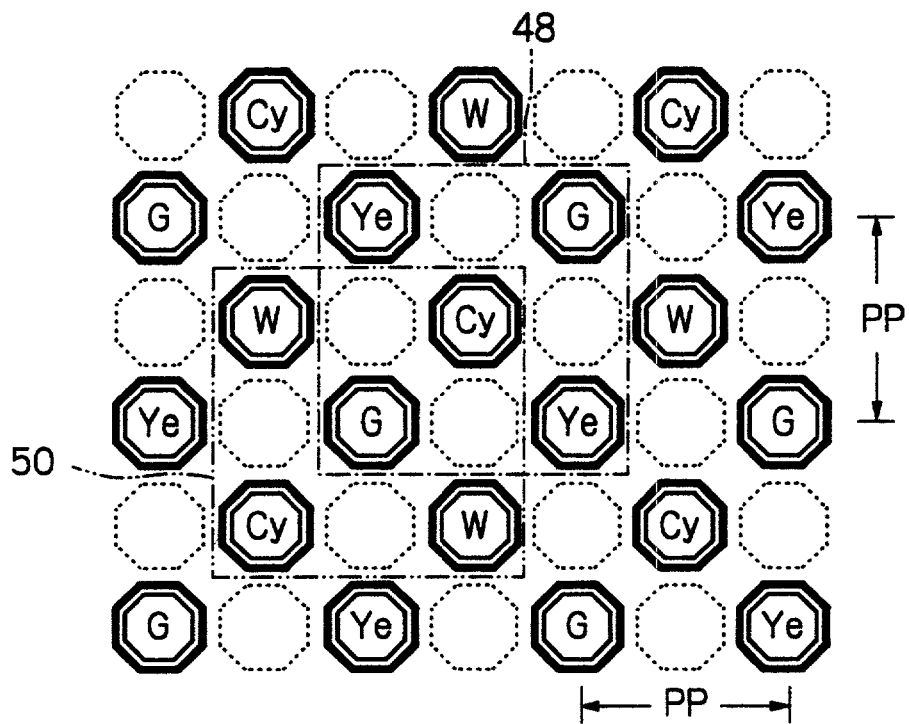
FIG. 15A is a view showing an overlapping tetragonal YeG full-checker, tetragonal WCy full-checker pattern also applicable to the color filter.
Figure 15B:
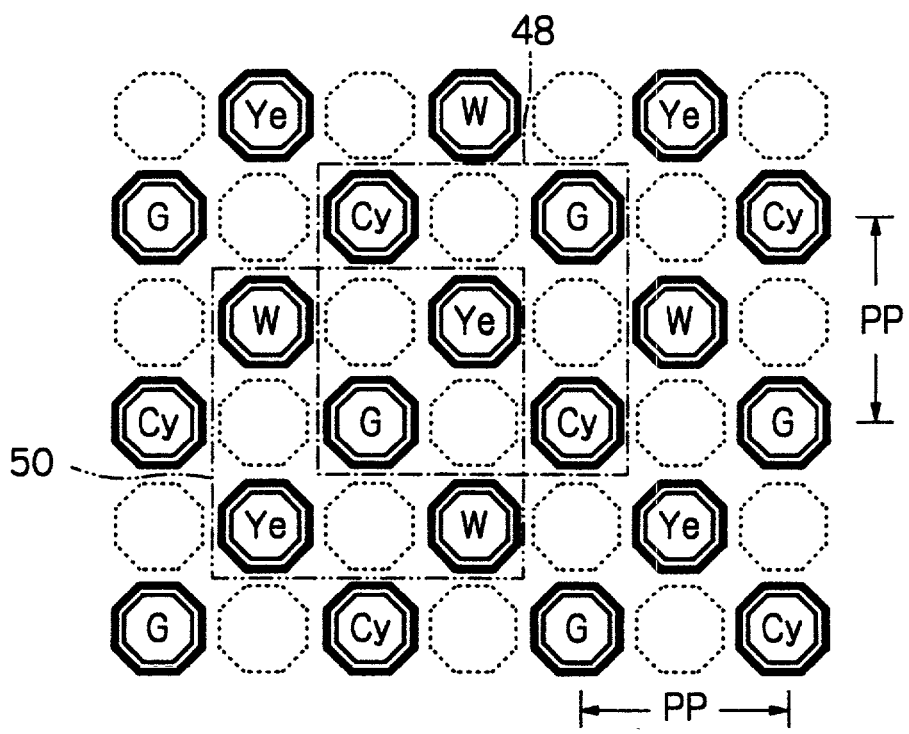
FIG. 15B is a view showing an overlapping tetragonal CyG full-checker, tetragonal WYe full-checker pattern also applicable to the color filter.
Figure 16A:
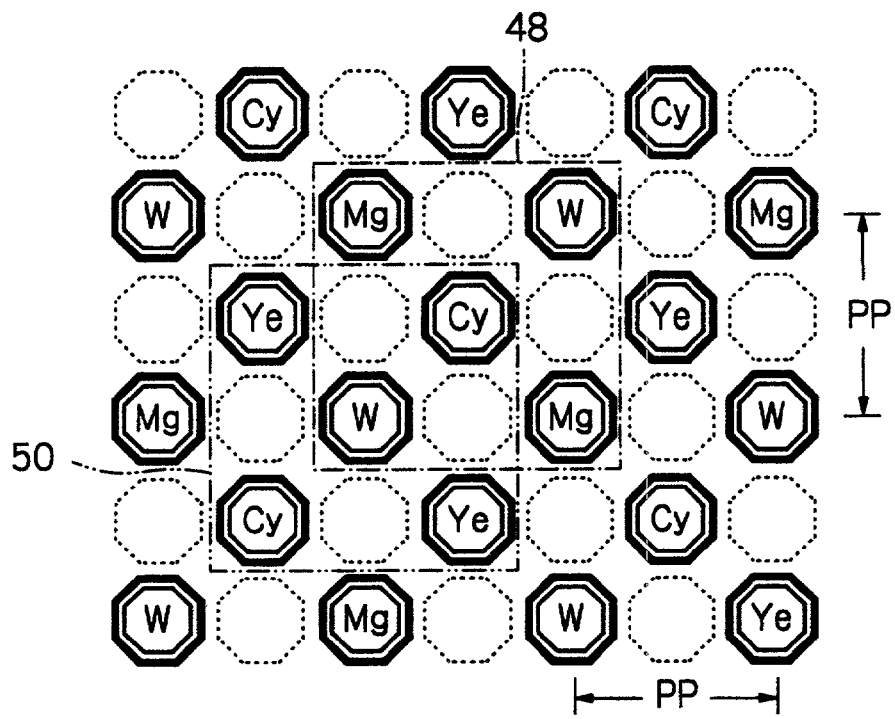
FIG. 16A is a view showing an overlapping tetragonal MgW full-checker, tetragonal YeCy full-checker pattern also applicable to the color filter.
Figure 16B:
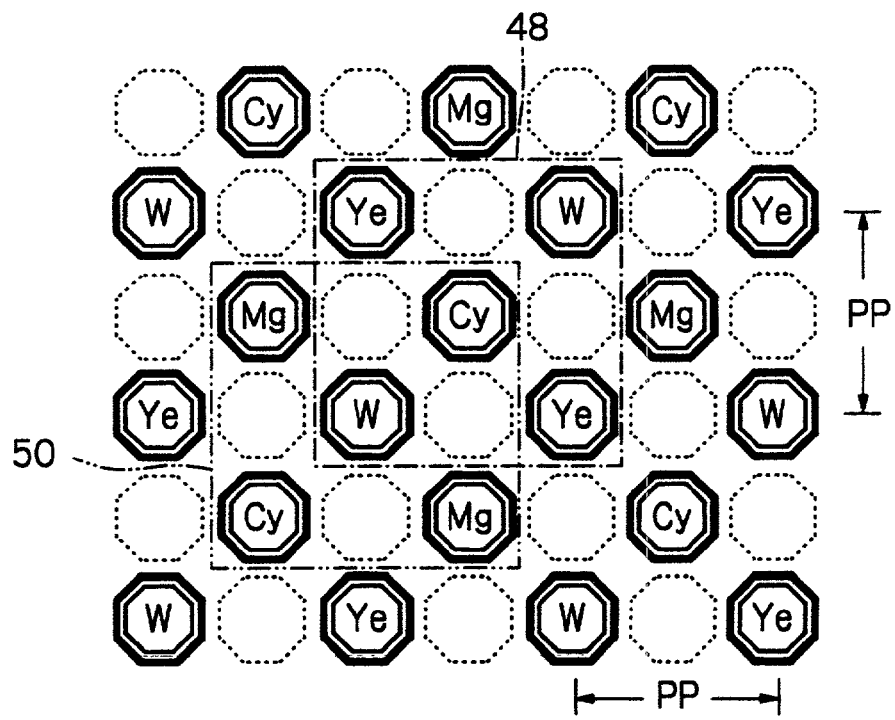
FIG. 16B is a view showing an overlapping tetragonal YeW full-checker, tetragonal MgCy full-checker pattern also applicable to the color filter.
Figure 17:
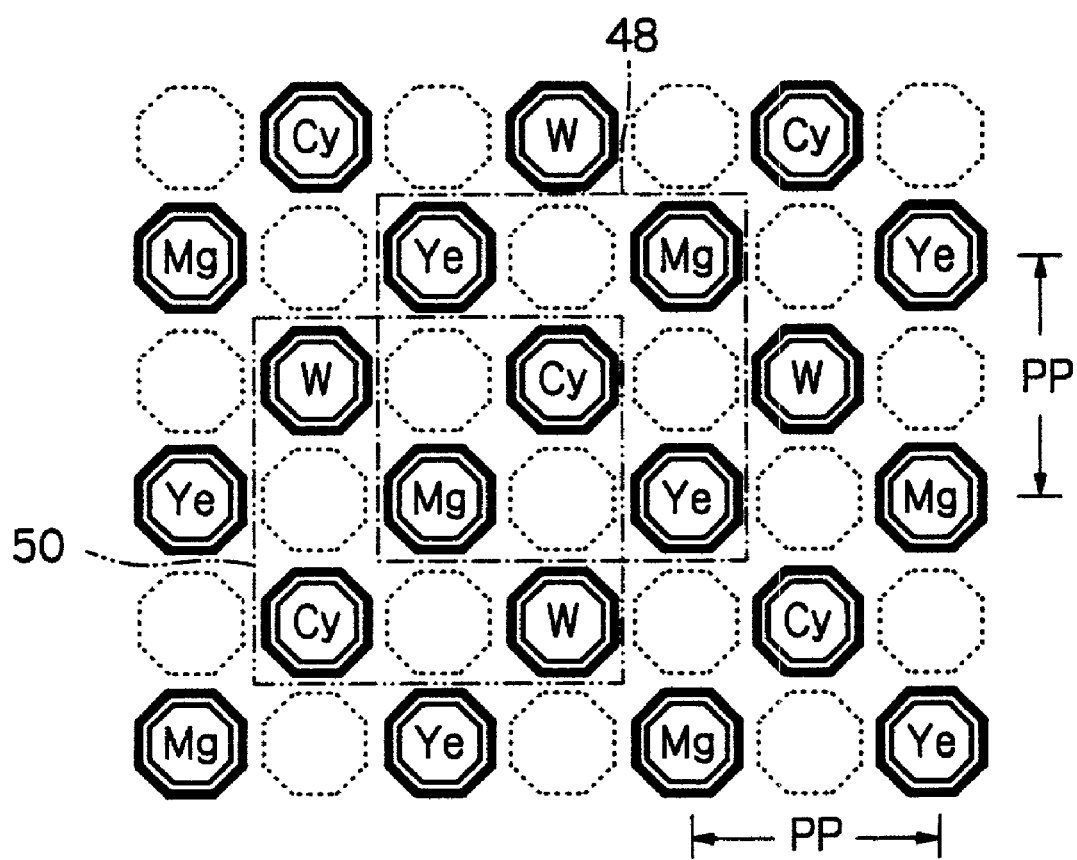
FIG. 17 is a view showing an overlapping tetragonal YeMg full-checker, tetragonal WCy full-checker pattern also applicable to the color filter.

FIGS. 14, 15A and 15B each show a particular pattern in which four colors Cy, Ye, G and W are arranged in accordance with the above-described rule. Specifically, FIG. 14 shows an overlapping, tetragonal WG full-checker and tetragonal YeCy full-checker pattern. FIG. 15A shows an overlapping, tetragonal YeG full-checker and tetragonal WCy full-checker pattern while FIG. 15B shows an overlapping, tetragonal CyG full-checker and tetragonal WYe full-checker pattern. Applying the same rule to Cy, Ye, Mg and W, FIGS. 16A and 16B respectively show an overlapping, tetragonal MgW full-checker and tetragonal YeCy full-checker pattern and an overlapping, tetragonal YeW full-checker and tetragonal MgCy full-checker pattern. Further, FIG. 17 shows an overlapping, tetragonal YeMg full-checker and tetragonal WCy full-checker pattern.

Another full-checker pattern applicable to the color filter CF including complementary colors is as follows. In the tetragonal lattice 48, a first color is assigned to two diagonally opposite corners while a second and a third color are respectively assigned to the other two diagonally opposite corners. A fourth color is assigned to the center of the lattice 48. In the tetragonal lattice 50 shifted from the lattice 48 by half a pitch in the horizontal and vertical directions, the one color assigned to the other two corners of the lattice 48 is also assigned to two diagonally opposite corners. The color assigned to the center of the lattice 48 is also assigned to the other two diagonally opposite corners of the lattice 50.

Figure 18A:
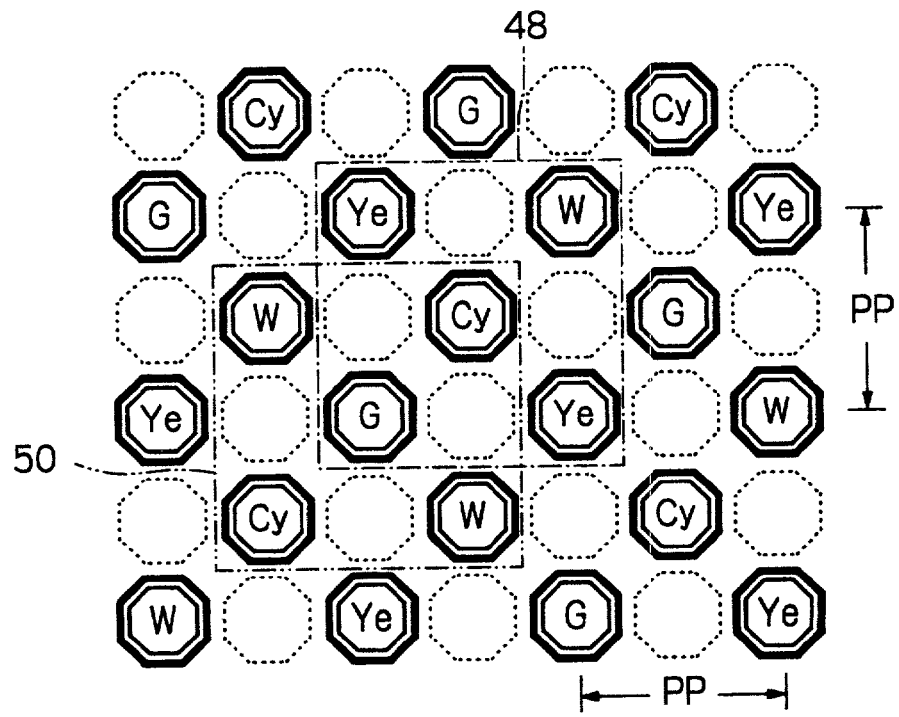
FIG. 18A is a view showing an overlapping tetragonal YeWG, tetragonal WCy full-checker pattern also applicable to the color filter.
Figure 18B:
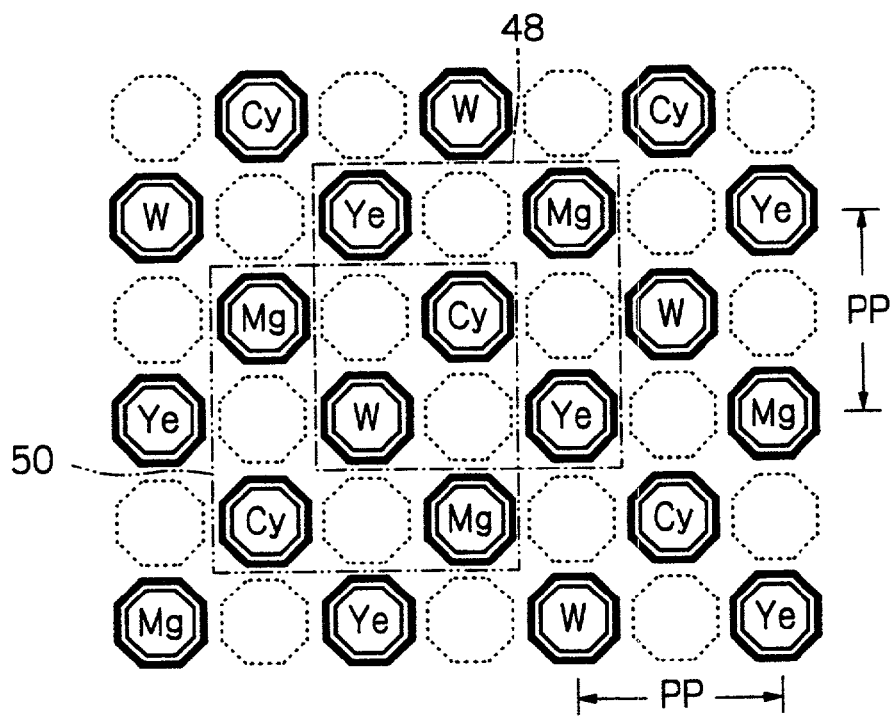
FIG. 18B is a view showing an overlapping tetragonal YeMgW, tetragonal MgCy full-checker pattern also applicable to the color filter.

Specifically, assuming that Cy, Ye, W and G are used, FIG. 18A shows an overlapping tetragonal YeWG and tetragonal WCy full-checker pattern. Assuming that Cy, Ye, Mg and W are used, FIG. 18B shows an overlapping, tetragonal YeMgW and tetragonal MgCy full-checker pattern.

Figure 19A:
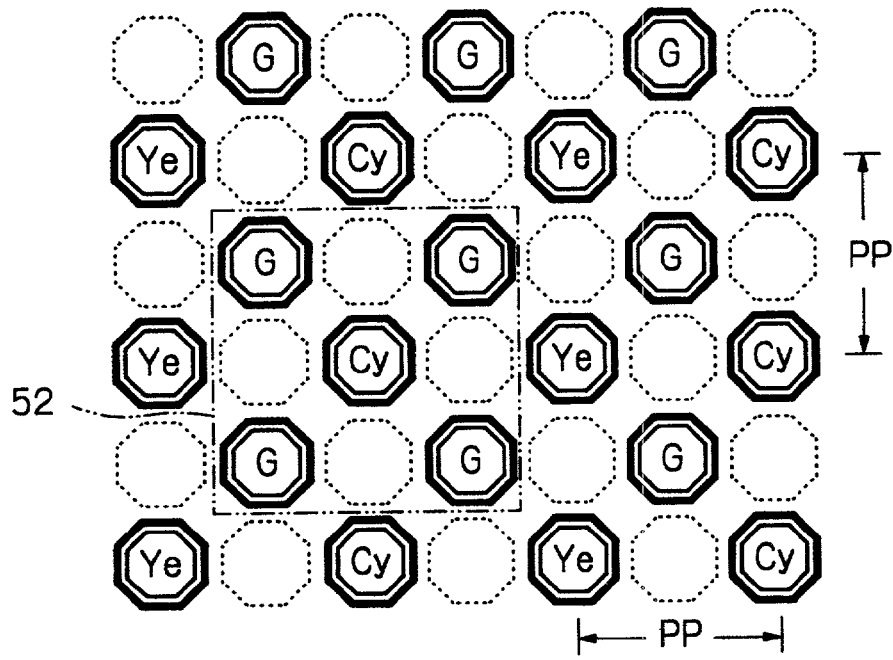
FIG. 19A is a view showing a G tetragonal, CyYe stripe pattern also applicable to the color filter.
Figure 19B:
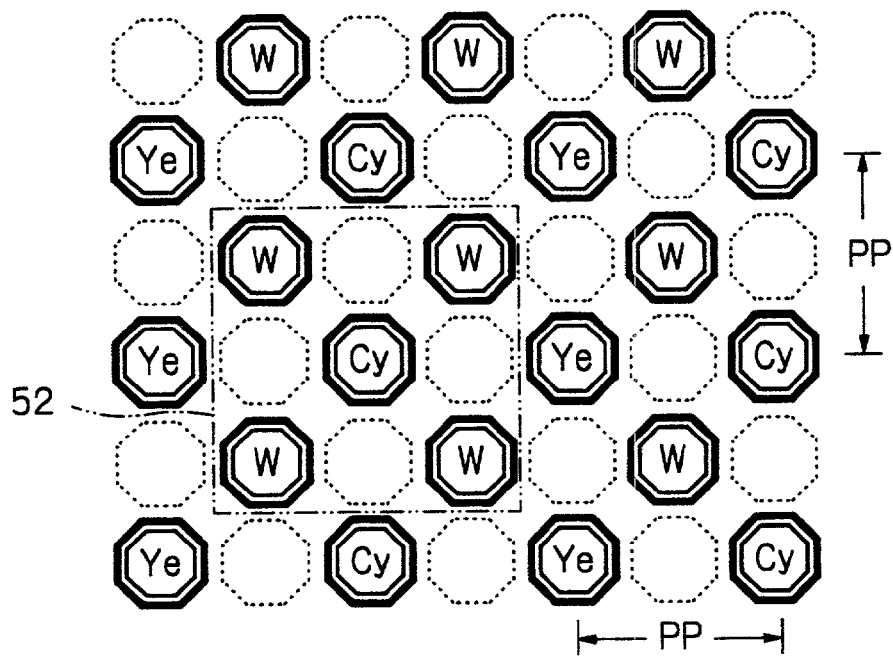
FIG. 19B is a view showing a W tetragonal, CyYe stripe pattern also applicable to the color filter.
Figure 20:
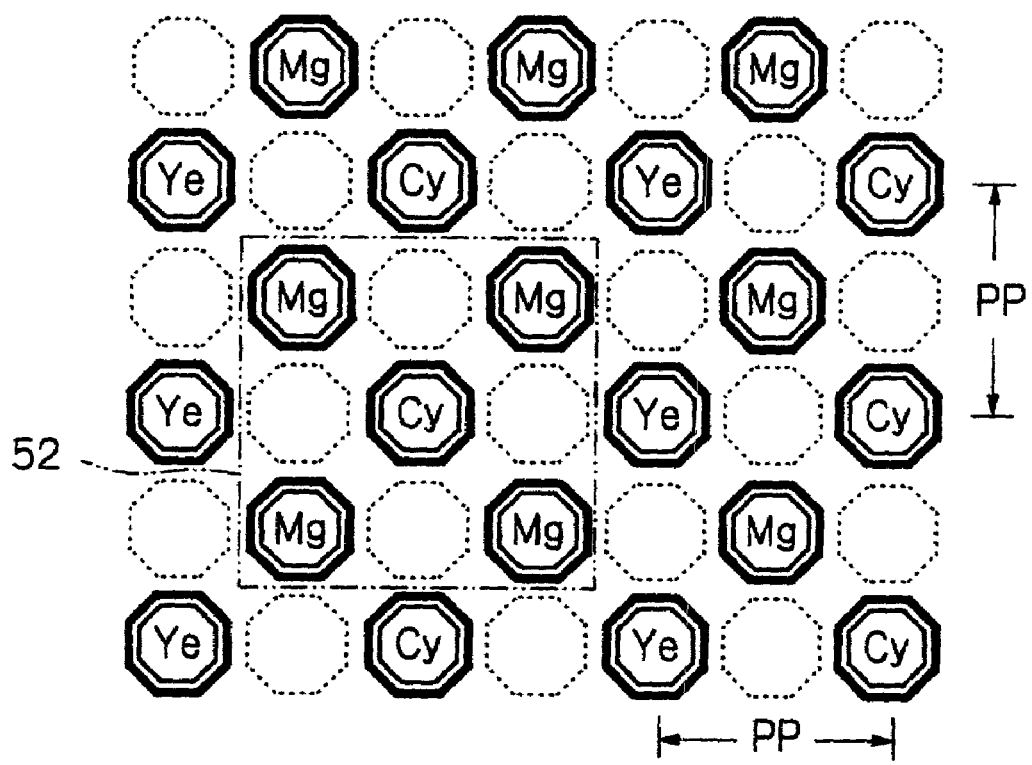
FIG. 20 is a view showing an Mg tetragonal, CyYe stripe pattern also applicable to the color filter.

Only three of the colors Cy, Mg, Ye, W and G may be arranged in a pattern, as will be described hereinafter. In this case, filter segments of one color are arranged in a tetragonal lattice 52 (see FIGS. 19A, 19B and 20). Two kinds of stripes each including a particular color different from the above color alternate with each other in the horizontal direction at one half of the previously mentioned pitch. The adjoining photosensitive cells are, of course, shifted from each other. Specifically, FIG. 19A shows a honeycomb or pixel-shifted vertical stripe pattern using three colors, i.e., a G tetragonal, CyYe stripe pattern. FIG. 19B shows a pattern identical with the pattern of FIG. 19A except that W is substituted for G. FIG. 20 shows a pattern also identical with the pattern of FIG. 19A except that Mg is substituted for G.

Figure 21A:
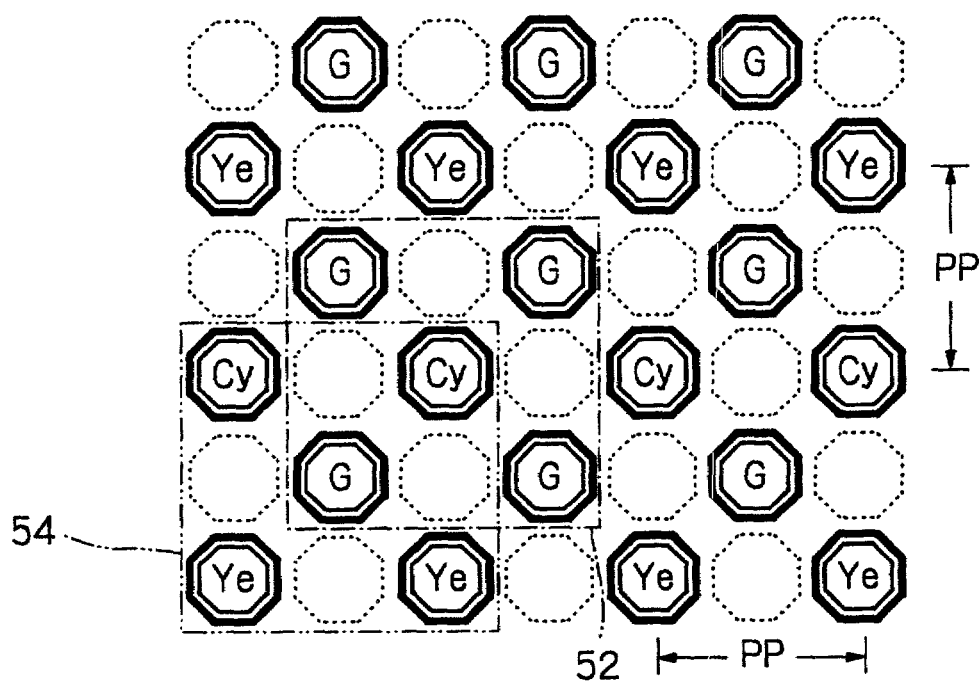
FIG. 21A is a view showing a G tetragonal, CyYe checker pattern also applicable to the color filter.
Figure 21B:
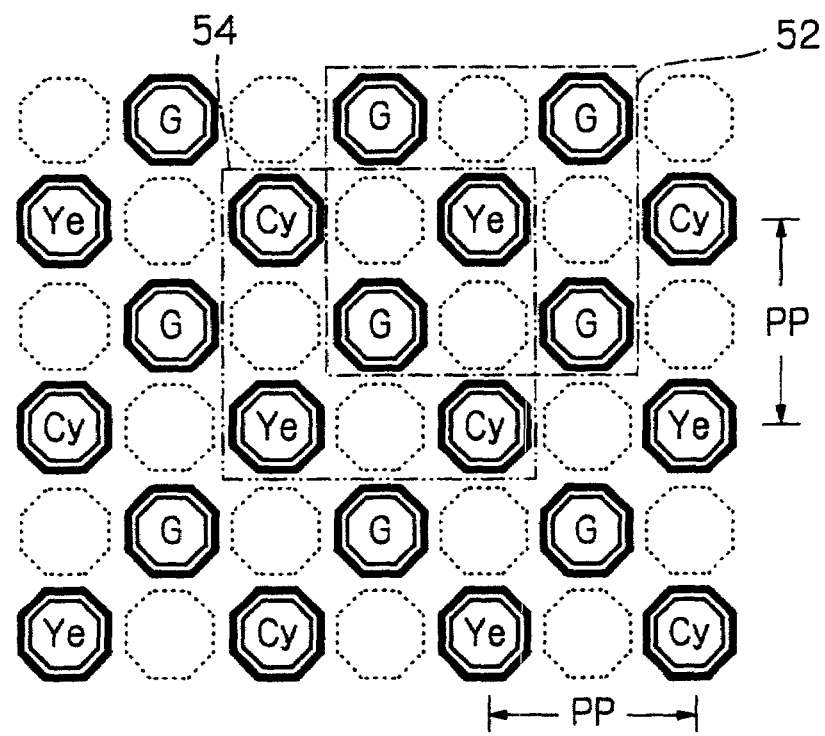
FIG. 21B is a view showing a G tetragonal, CyYe full-checker pattern also applicable to the color filter.
Figure 22A:
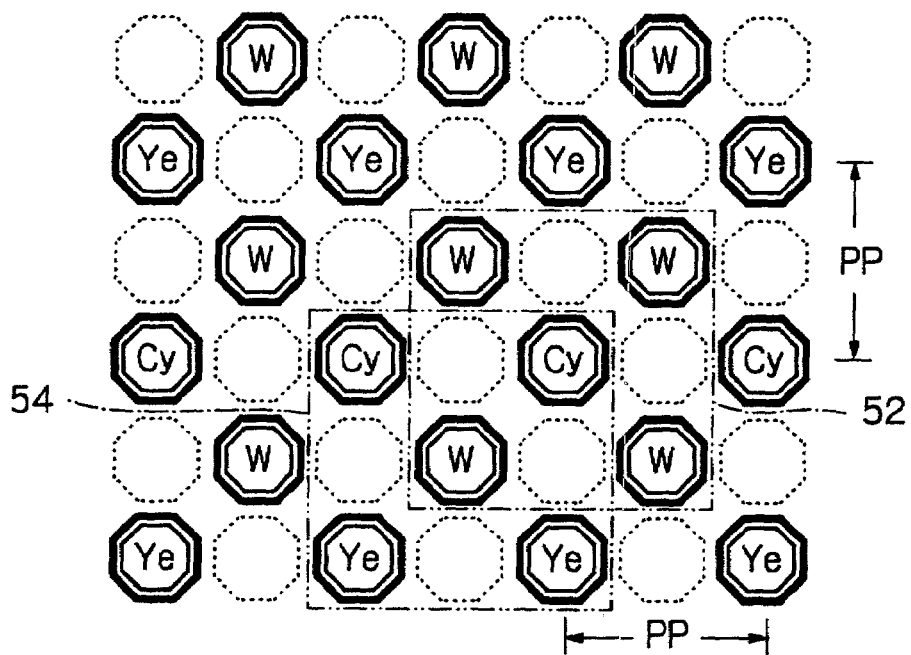
FIG. 22A is a view showing a W tetragonal, CyYe checker pattern also applicable to the color filter.
Figure 22B:
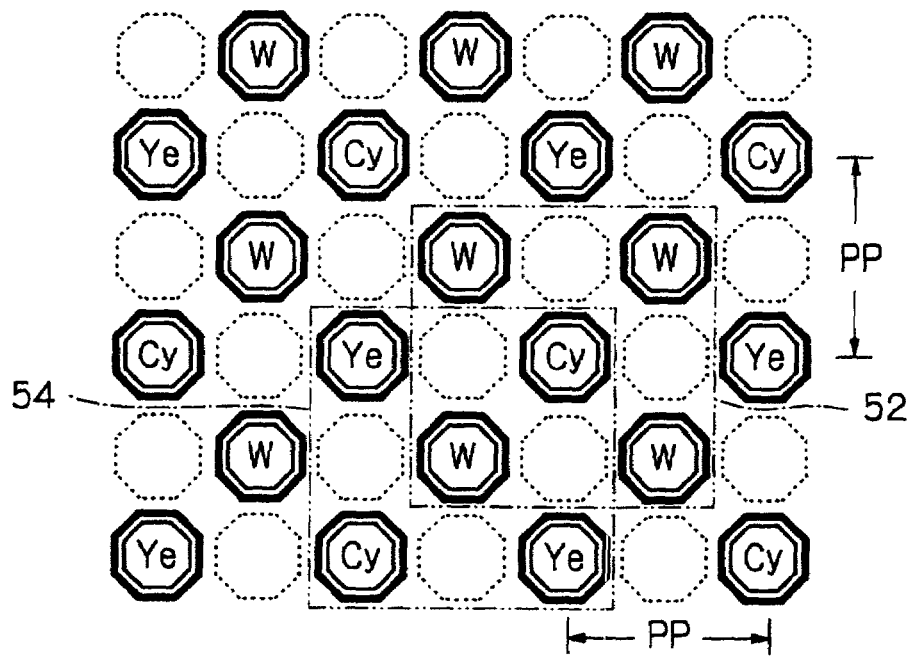
FIG. 22B is a view showing a W tetragonal, CyYe full-checker pattern also applicable to the color filter.
Figure 23A:
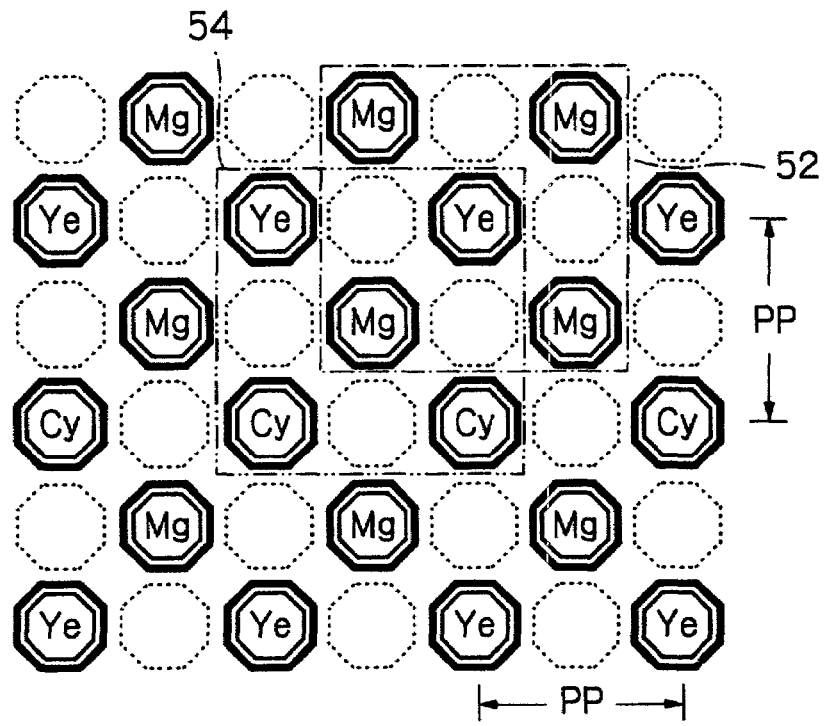
FIG. 23A is a view showing an Mg tetragonal, CyYe checker pattern also applicable to the color filter.
Figure 23B:
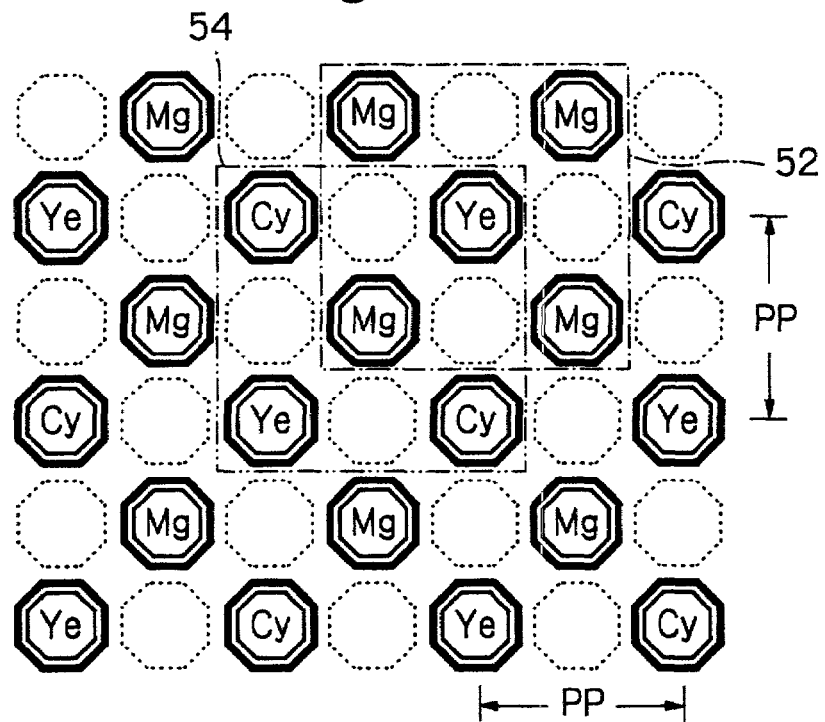
FIG. 23B is a view showing a Mg tetragonal, CyYe full-checker pattern also applicable to the color filter.
Figure 24A:
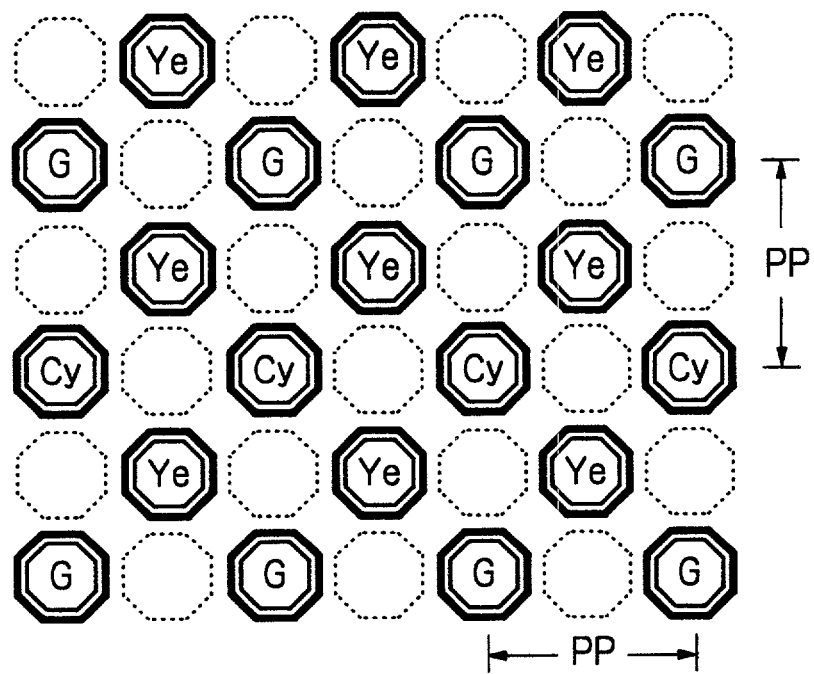
FIG. 24A is a view showing a Ye tetragonal, GCy checker pattern also applicable to the color filter.
Figure 24B:
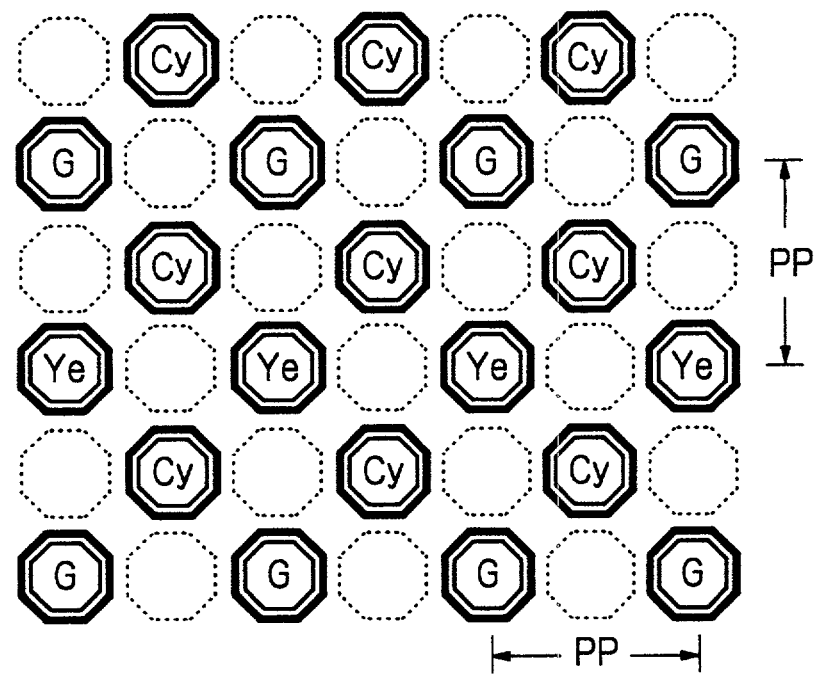
FIG. 24B is a view showing a Cy tetragonal, GYe checker pattern also applicable to the color filter.
Figure 25A:
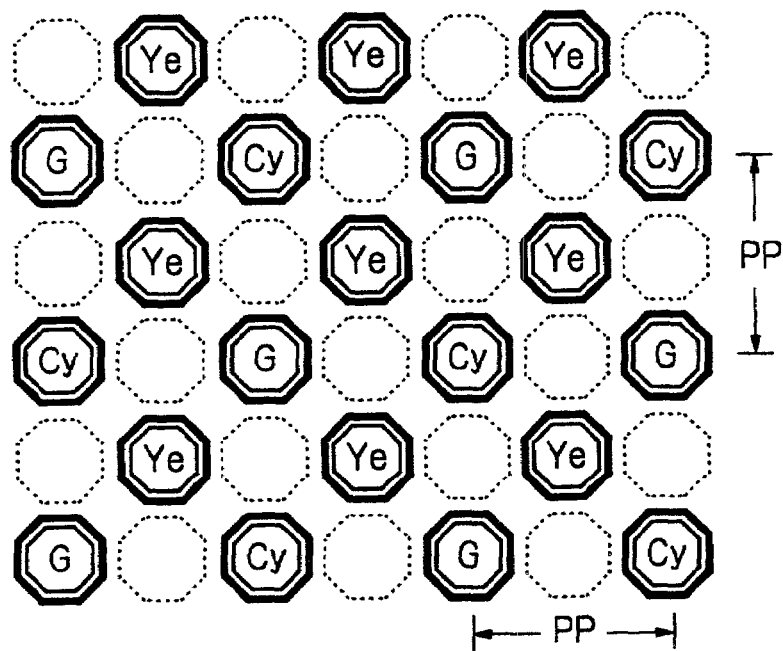
FIG. 25A is a view showing a Ye tetragonal, Gcy full-checker pattern also applicable to the color filter.
Figure 25B:
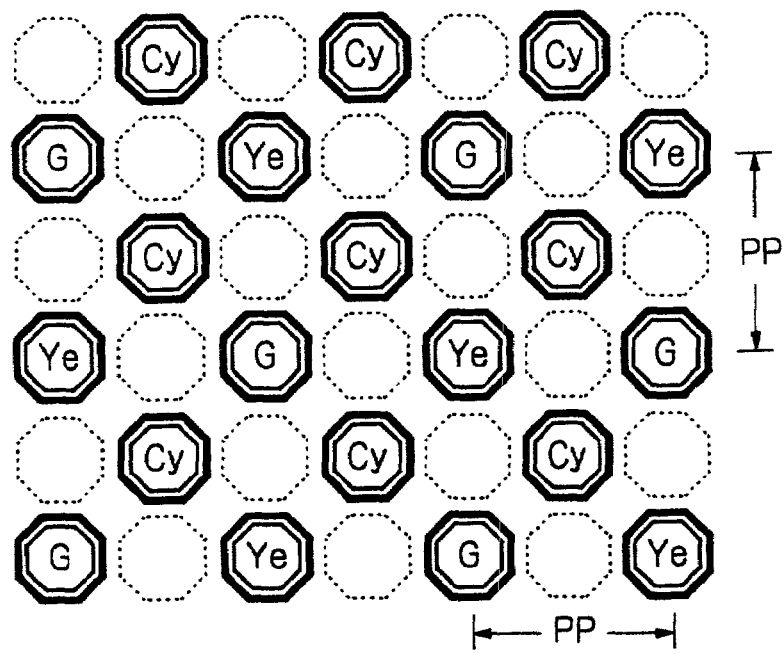
FIG. 25B is a view showing a Cy tetragonal, GYe full-checker pattern also applicable to the color filter.
Figure 26A:
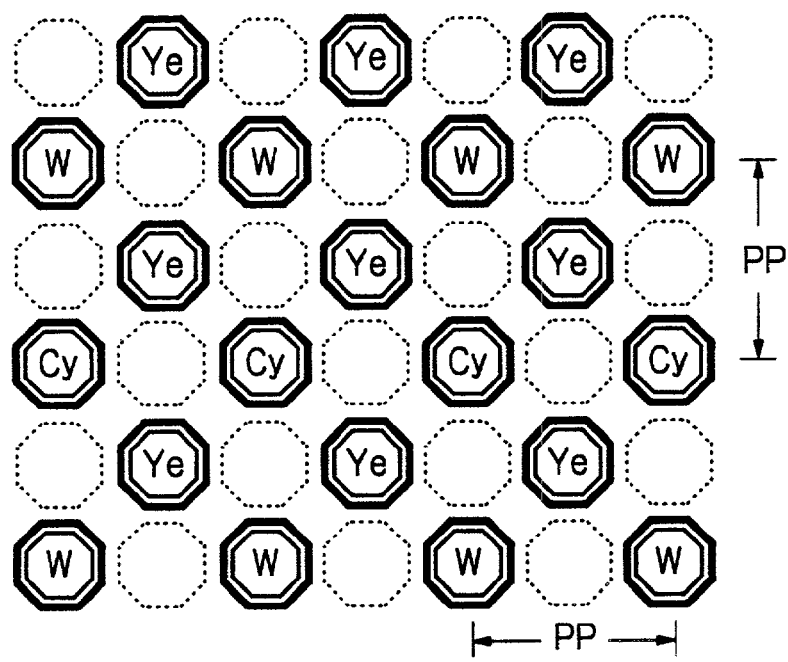
FIG. 26A is a view showing a Ye tetragonal, WCy checker pattern also applicable to the color filter.
Figure 26B:
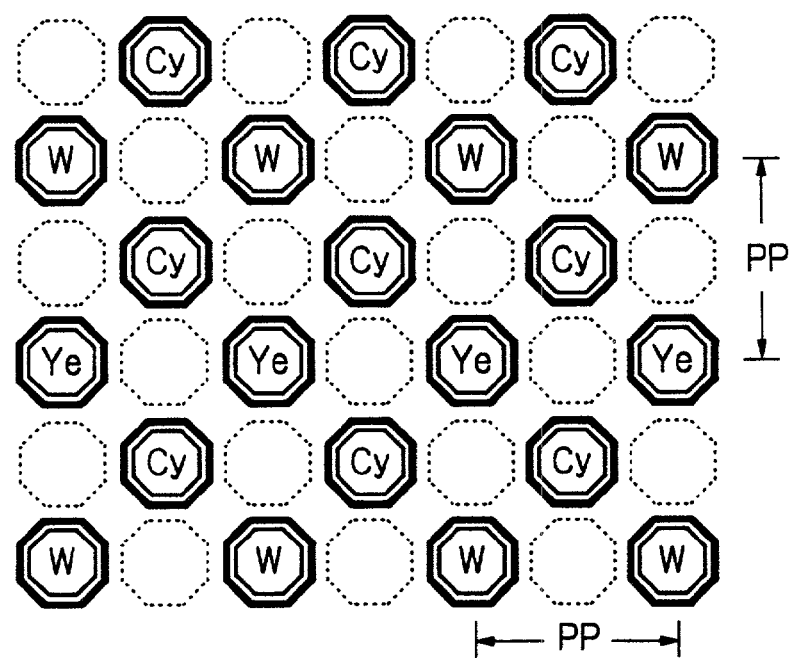
FIG. 26B is a view showing a Cy tetragonal, WYe checker pattern also applicable to the color filter.
Figure 27A:
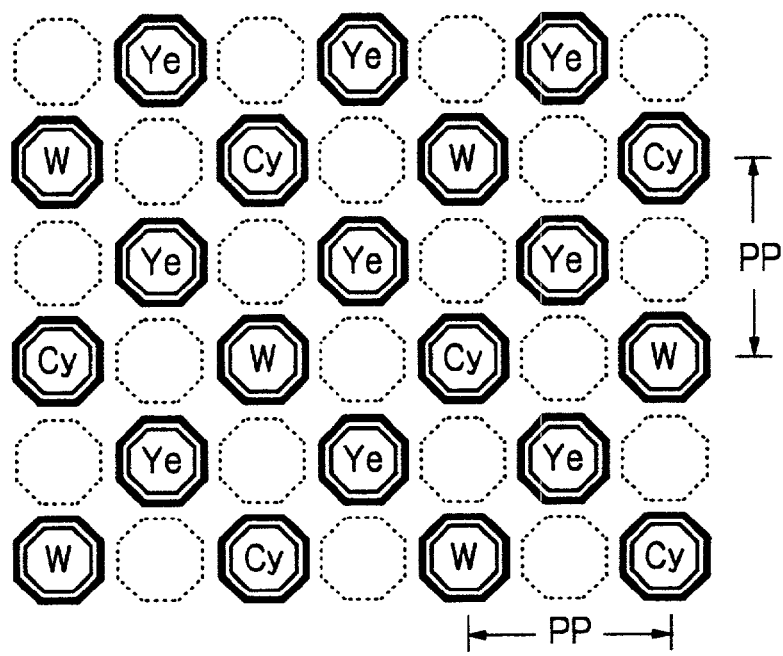
FIG. 27A is a view showing a Ye tetragonal, WCy full-checker pattern also applicable to the color filter.
Figure 27B:
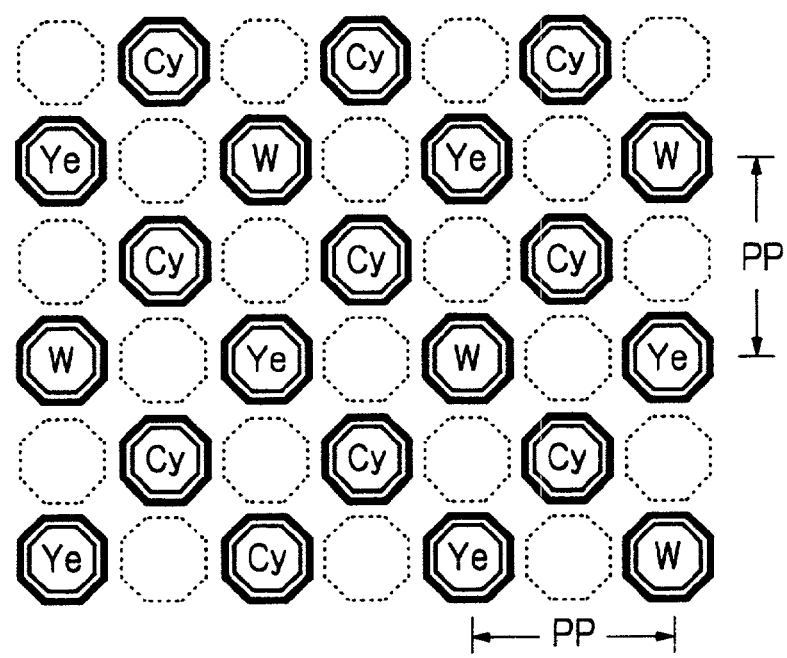
FIG. 27B is a view showing a Cy tetragonal, WYe full-checker pattern also applicable to the color filter.
Figure 28A:
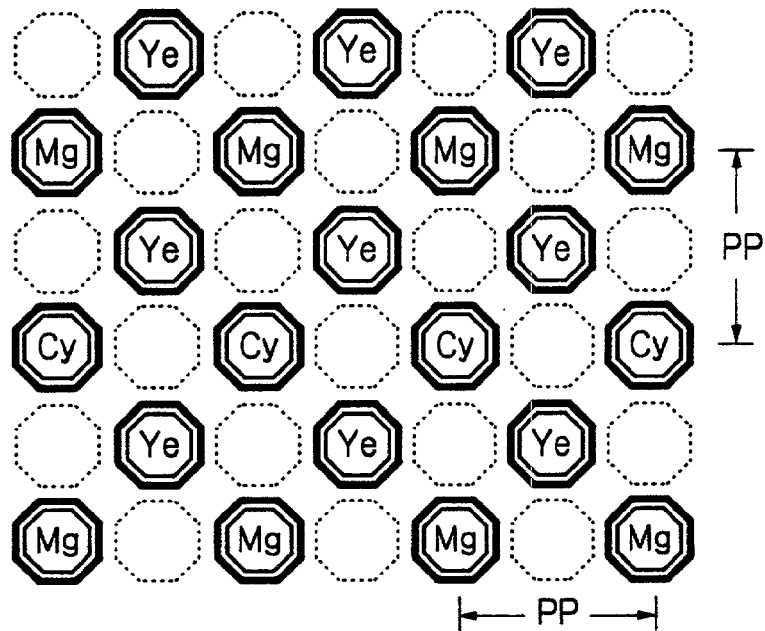
FIG. 28A is a view showing a Ye tetragonal, MgCy checker pattern also applicable to the color filter.
Figure 28B:
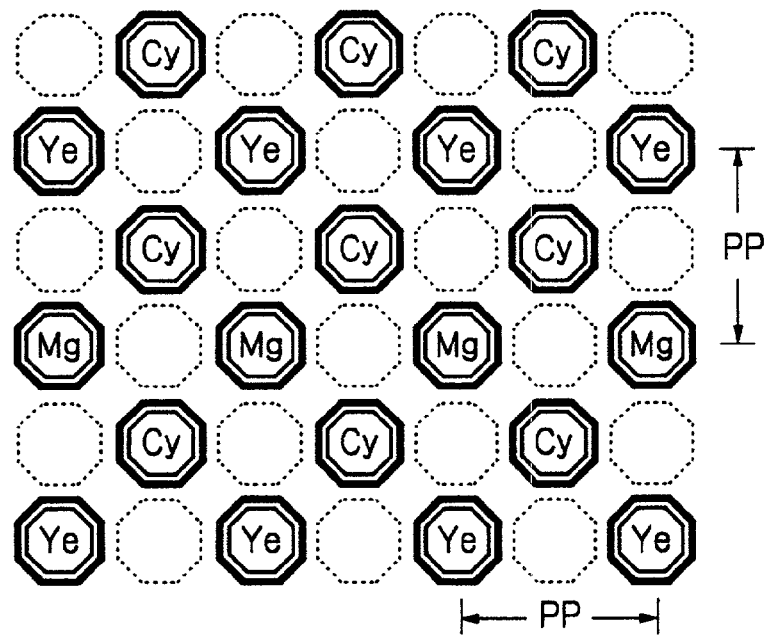
FIG. 28B is a view showing a Cy tetragonal, MgYe checker pattern also applicable to the color filter.

Furthermore, three of the colors Cy, Mg, Ye, W and G may be arranged in the pixel-shifted pattern in accordance with the following rule. One of the three colors is arranged in a tetragonal lattice 52. The other two colors are arranged in a tetragonal lattice 54 in a checker or a full-checker pattern, which is shifted from the lattice 52 by half a pitch. Specifically, FIGS. 21A and 21B respectively show a G tetragonal, CyYe checker pattern and a G tetragonal, CyYe full-checker pattern. FIGS. 22A and 22B respectively show a W tetragonal, CyYe checker pattern and a W tetragonal, CyYe full-checker pattern, in which W is substituted for G. Further, FIGS. 23A and 23B respectively show a Mg tetragonal, CyYe checker pattern and a Mg tetragonal, CyYe full-checker pattern, in which Mg is substituted for G.

Figure 29A:
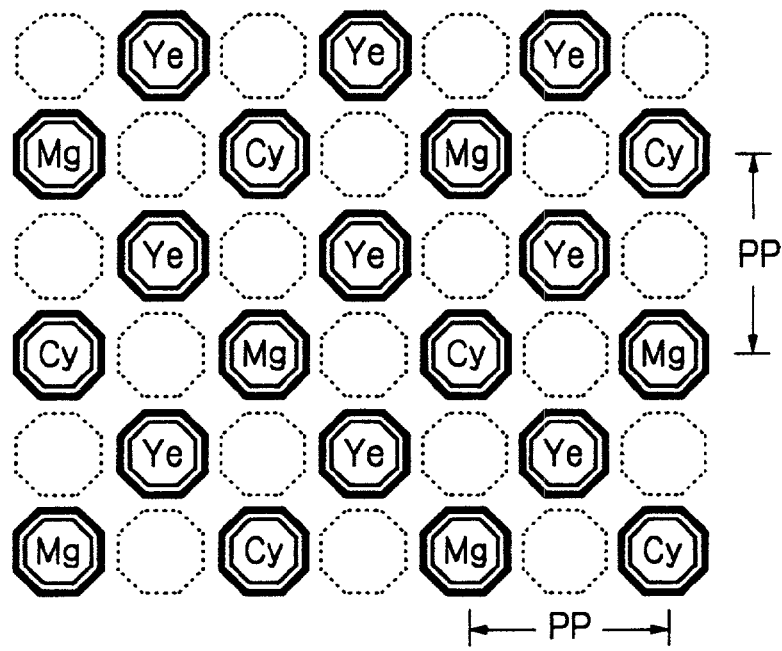
FIG. 29A is a view showing a Ye tetragonal, CyMg full-checker pattern also applicable to the color filter.
Figure 29B:
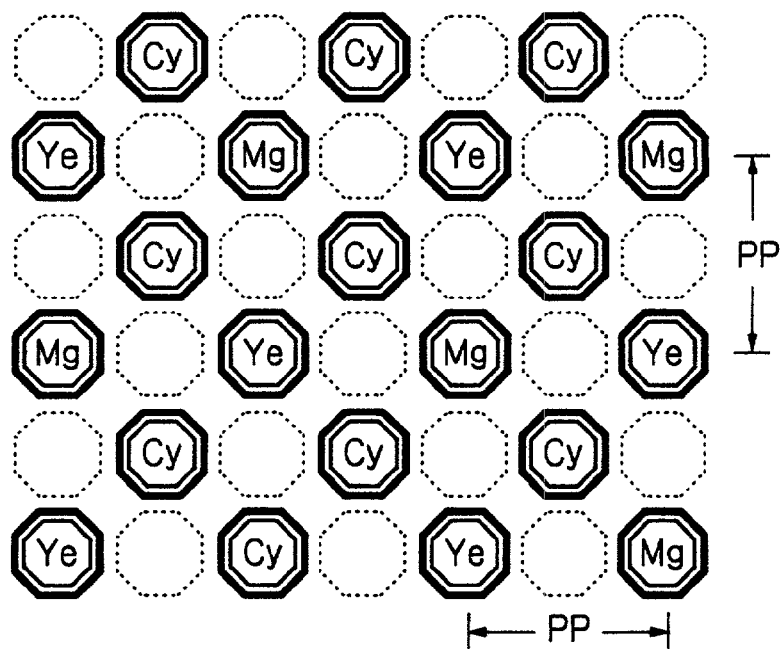
FIG. 29B is a view showing a Cy tetragonal, MgYe full-checker pattern also applicable to the color filter.

If desired, Cy or Ye may be arranged in a tetragonal lattice in place of G, W or Mg. Such alternative patterns are shown in FIGS. 24A through 29B and given the following names:
Ye tetragonal, GCy checker pattern (FIG. 24A)
Cy tetragonal, GYe checker pattern (FIG. 24B)
Ye tetragonal, GCy full-checker pattern (FIG. 25A)
Cy tetragonal, GYe full-checker pattern (FIG. 25B)
Ye tetragonal, WCy checker pattern (FIG. 26A)
Cy tetragonal, WYe checker pattern (FIG. 26B)
Ye tetragonal, WCy full-checker pattern (FIG. 27A)
Cy tetragonal WYe full-checker pattern (FIG. 27B)
Ye tetragonal, MgCy checker pattern (FIG. 28A)
Cy tetragonal MgYe checker pattern (FIG. 28B)
Ye tetragonal CyMg full-checker pattern (FIG. 29A)
Cy tetragonal MgYe full-checker pattern (FIG. 29B)

The pattern in which Ye or Cy is arranged in a tetragonal lattice, as stated above, is similarly applicable to any one of the vertical stripe patterns shown in FIGS. 19A, 19B and 20.

Figure 30A:
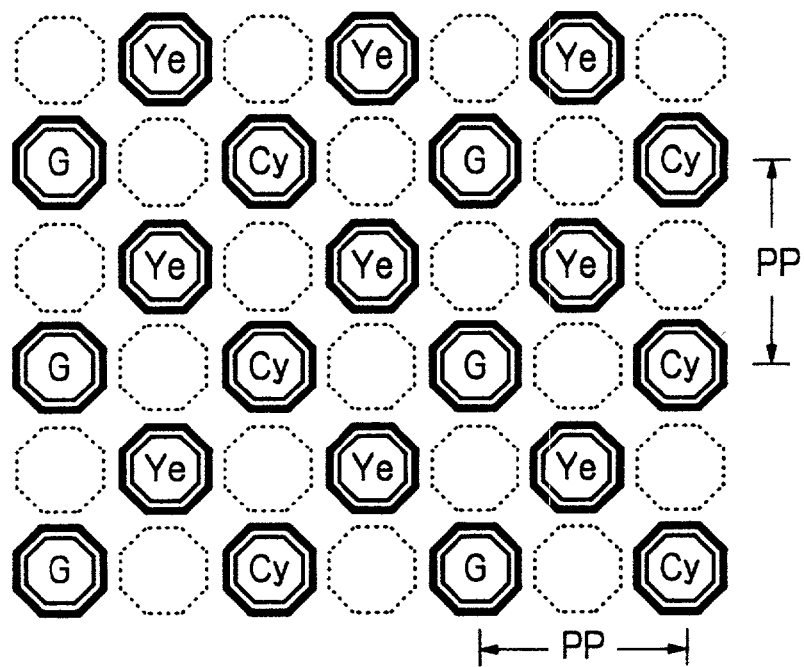
FIG. 30A is a view showing a Ye tetragonal, CyG stripe pattern also applicable to the color filter.
Figure 30B:
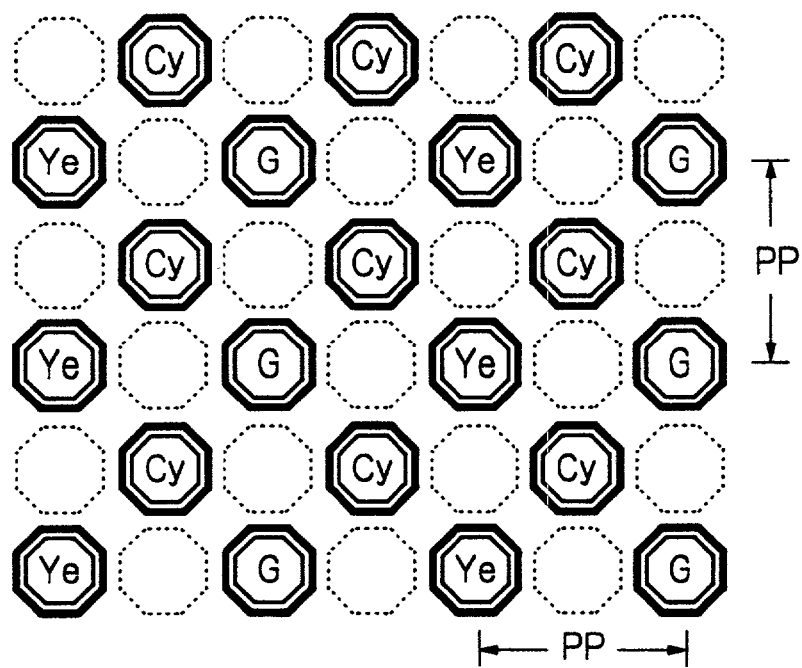
FIG. 30B is a view showing a Cy tetragonal, GYe stripe pattern also applicable to the color filter.
Figure 31A:
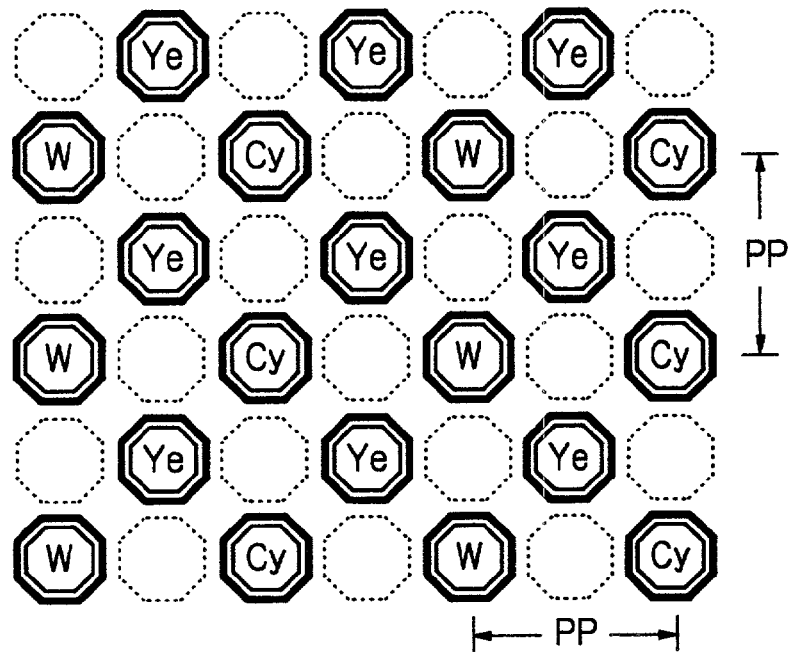
FIG. 31A is a view showing a Ye tetragonal, CyW stripe pattern also applicable to the color filter.
Figure 31B:
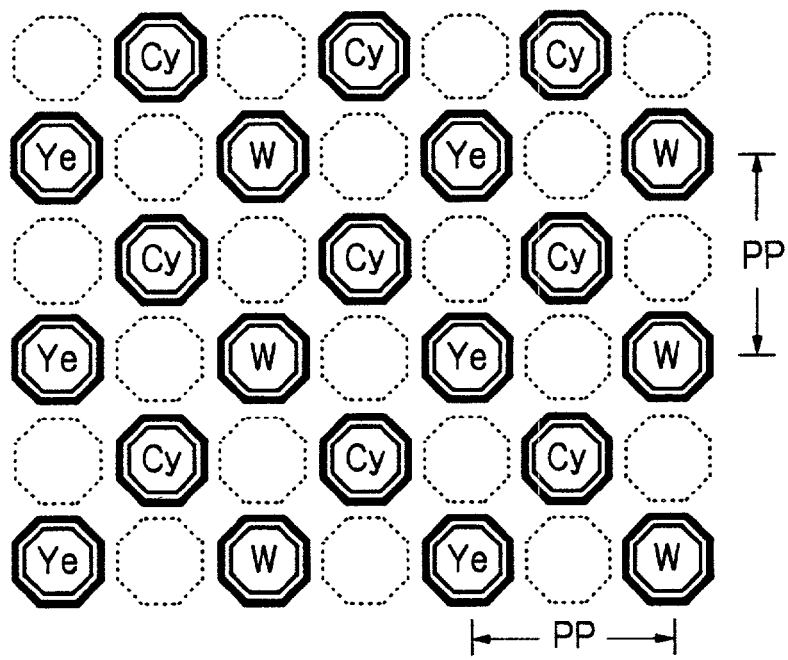
FIG. 31B is a view showing a Cy tetragonal, WYe stripe pattern also applicable to the color filter.
Figure 32A:
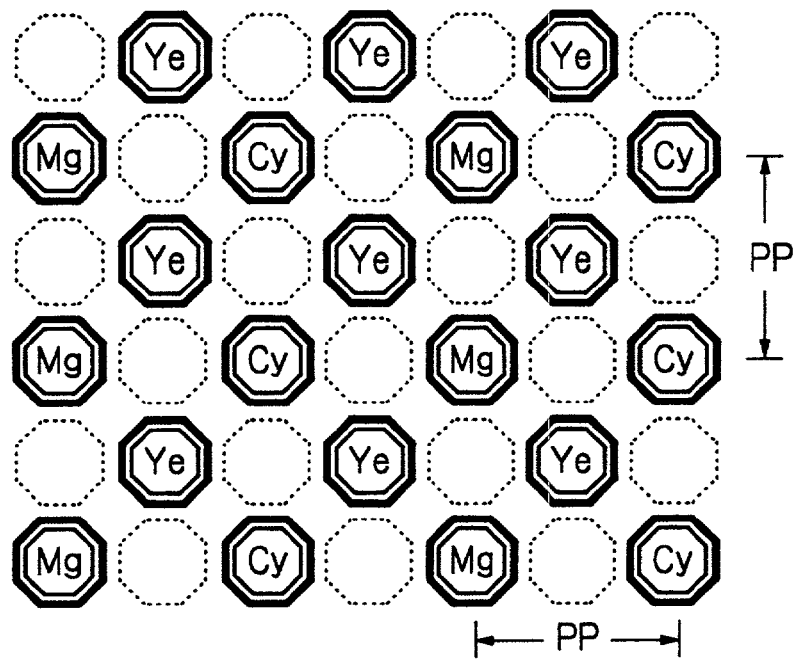
FIG. 32A is a view showing a Ye tetragonal, CyMg stripe pattern also applicable to the color filter.
Figure 32B:
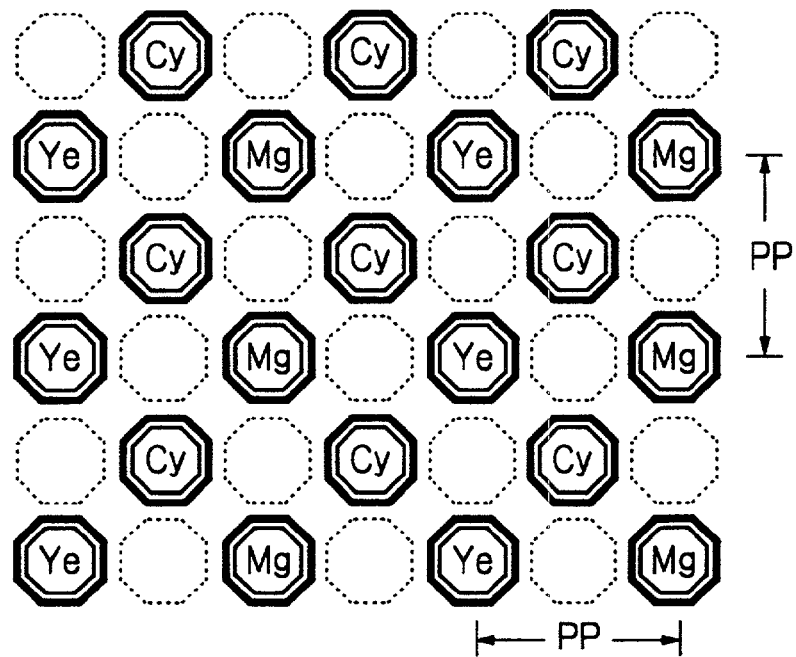
FIG. 32B is a view showing a Cy tetragonal, MgYe stripe pattern also applicable to the color filter.

FIGS. 30A and 30B show a Ye tetragonal, CyG stripe pattern and a Cy tetragonal, GYe stripe pattern. FIGS. 31A and 31B respectively show a Ye tetragonal, CyW stripe pattern and a Cy tetragonal WYe stripe pattern, in which W, Cy and Ye are used. FIGS. 32A and 32B respectively show a Ye tetragonal, CyMg stripe pattern and a Cy tetragonal, MgYe stripe pattern, in which Ye or Cy are arranged in a tetragonal lattice.

Figure 33:
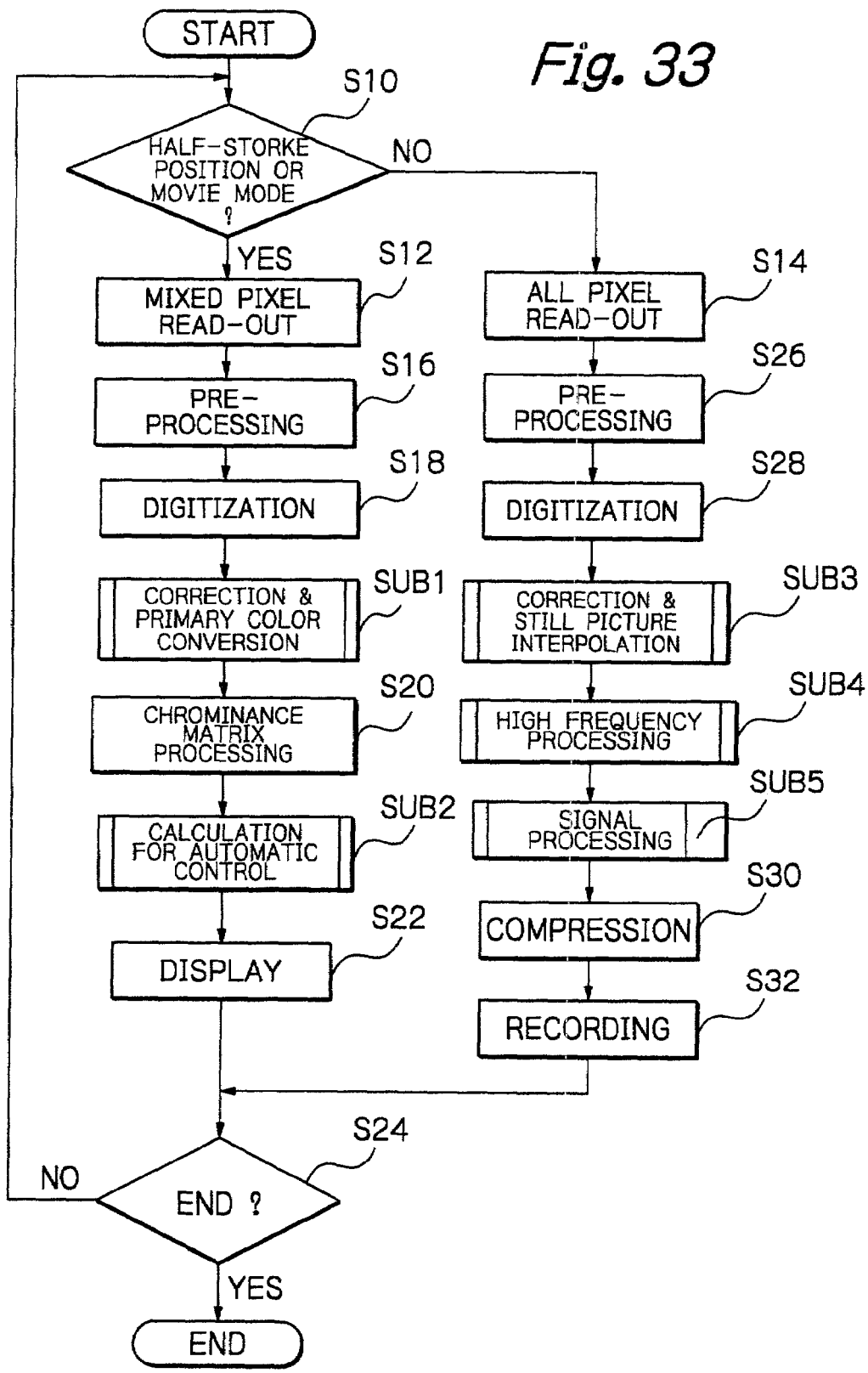
FIG. 33 is a flowchart demonstrating a specific operation of the illustrative embodiment.

Reference will be made to FIG. 33 for describing a specific operation of the camera 10. When the operator turns on a power switch, not shown, provided on the camera 10, the system controller 18 executes various kinds of initial setting. Generally, the camera 10 sets up a movie mode for displaying a scene being picked up on the monitor 42 or displays it when the operator presses the shutter release bottom to the half-stroke position.

As shown in FIG. 33, the system controller 18 determines whether or not the movie mode is set up or whether or not the operator has pressed the shutter release bottom to its half-stroke position (step S10). If the answer of the step S10 is positive (YES), the system controller 18 causes pixels to be read out of the image sensor 30 in mixture (step S12). If the answer of the step S10 is negative (NO), meaning that the operator has pressed the shutter release bottom to its full-stroke position, the system controller 18 causes all the pixels to be read out of the image sensor 30 (step S14).

The color filter CF having filter segments arranged in the overlapping, tetragonal YeMg_G full-checker and tetragonal MgCy full-checker pattern, as shown in FIG. 11, is applied to the image sensor 30. In the step S12, signal charges are read out of the image sensor 30, i.e., the photodiodes PD in accordance with the drive signals by the previously mentioned field storage, mixed two-line read type of color multiplexing system. After the step S12, the preprocessor 32 executes preprocessing with the resulting signal 30A (step S16). For example, the preprocessor 32 executes CDS processing in order to remove noise components from the signal 30A.

The ADC 34 converts the noise-free signal 32a to the digital signal or pixel data 34a (step S18). This is followed by digital signal processing. When the image sensor 30 is implemented by a CCD image, a non-destructive buffer memory should preferably be used, although not shown in FIG. 1. In such a case, the system controller 18 delivers the control signals 18a, which include a write enable signal, a read enable signal and an address signal, to the buffer memory via the system bus 16 and system bus branch 16a.

In response, the buffer memory feeds color-by-color image data to the signal processing section 36.

In a subroutine SUB1 following the step S18, the pixel data 34a may be subjected to, e.g., white balance adjustment and gamma correction. The primary color generation 360b transforms the complementary color image data 36A lying in a preselected region to primary color image data R, G and B. The image data R, G and B are fed to the chrominance matrix 36b. At the same time, the image data R, G and B are delivered to the system controller 18 via an exposure control circuit, not shown, included in the signal processing 36 or the system bus 16.

The chrominance matrix 36b produces luminance data Y and two kinds of chrominance data (B-Y) and (R-Y) from the input primary color data R, G and B (step S20). The luminance data Y and chrominance data (B-Y) and (R-Y) are fed to the monitor 42 via the system bus branch 16a and system bus 16.

The signal processing section 36 or the system controller 18 uses the primary color data R. G and B produced in the subroutine SUB 1 to perform calculations for the automatic, adequate control over exposure (SUB2). Control signals 18a corresponding to the results of calculations are delivered to the various sections of the camera 10, operating the exposure control mechanism 26 and AF control mechanism.

The monitor 42 displays a movie based on the image data being sequentially received from the chrominance matrix 364b (step S22). In this condition, the system controller 18 determines whether or not the operator has turned off the power switch in order to stop the operation of the camera 10 (step S24). The procedure returns to the step S10 if the answer of the step S24 is NO or ends if it is YES.

On the other hand, assume that the operator has pressed the shutter release bottom to the full-stroke position (NO, step S10). Then, drive signals matching with the second mode are fed to the image sensor 30, so that all the pixels are read out of the image sensor 30 (step S14). The signal 30A so read out is sequentially subjected to preprocessing (step S26) and digitization (step S28). The steps S26 and S28 are identical with the steps S16 and S18, respectively, and will not be described specifically in order to avoid redundancy.

The complementary color image data 34a generated in the step S28 are fed to the signal processing section 36. The signal processing section 36 executes various kinds of correction and still picture interpolation with the image data 34a (subroutine SUB3). Still picture interpolation is assigned to the still picture interpolator 362b, as stated earlier, and will be described in detail later.

The primary color pixel data R, G and B produced by interpolation in the subroutine SUB3 are processed such that their frequency band is broadened (subroutine SUB4). Various methods are available for broadening the above frequency band.

Subsequently, the pixel data R, G and B broadened in frequency band are transformed to luminance data Y and chrominance data (R-Y) and (B-Y) (or $C_r$ and $C_b$). Further, the luminance data Y and chrominance data (R-Y) and (B-Y) are processed in order to be displayed with enhanced quality (subroutine SUB5).

The luminance data Y and chrominance data (R-Y and (B-Y) processed in the subroutine SUB5 are routed through the compression/expansion 38 and system bus 16 to the storage 40 or the monitor 42 (step S30). At this instant, the system controller 18 may control the compression/expansion 38 in a particular manner in each of a display mode and a record mode. For example, the system controller 18 may cause the compression/expansion 38 to simply pass the above processed data therethrough in a display mode or cause it to expand recorded data and deliver the expanded data to the monitor 42 in a reproduction mode.

Further, in a record mode, the compression/expansion 38 compresses the data by using, e.g., the JPEG scheme (step S30) in order to reduce the amount of information. The compressed data are fed to the storage 40 and recorded in a recording medium loaded therein (step S32). The recording medium may be either one of a semiconductor memory and an optical, magnetic or magnetoptical recording medium. At this instant, the picture may thinned out, or reduced, before compression and displayed on the monitor 42. This allows the operator to see even the quality of the picture shot at the pickup timing. Of course, the picture not compressed may be sent to an outside, high definition monitor so as to be displayed with higher quality than conventional interpolated pictures. The step S32 is followed by the previously stated step S24.

Figure 34:
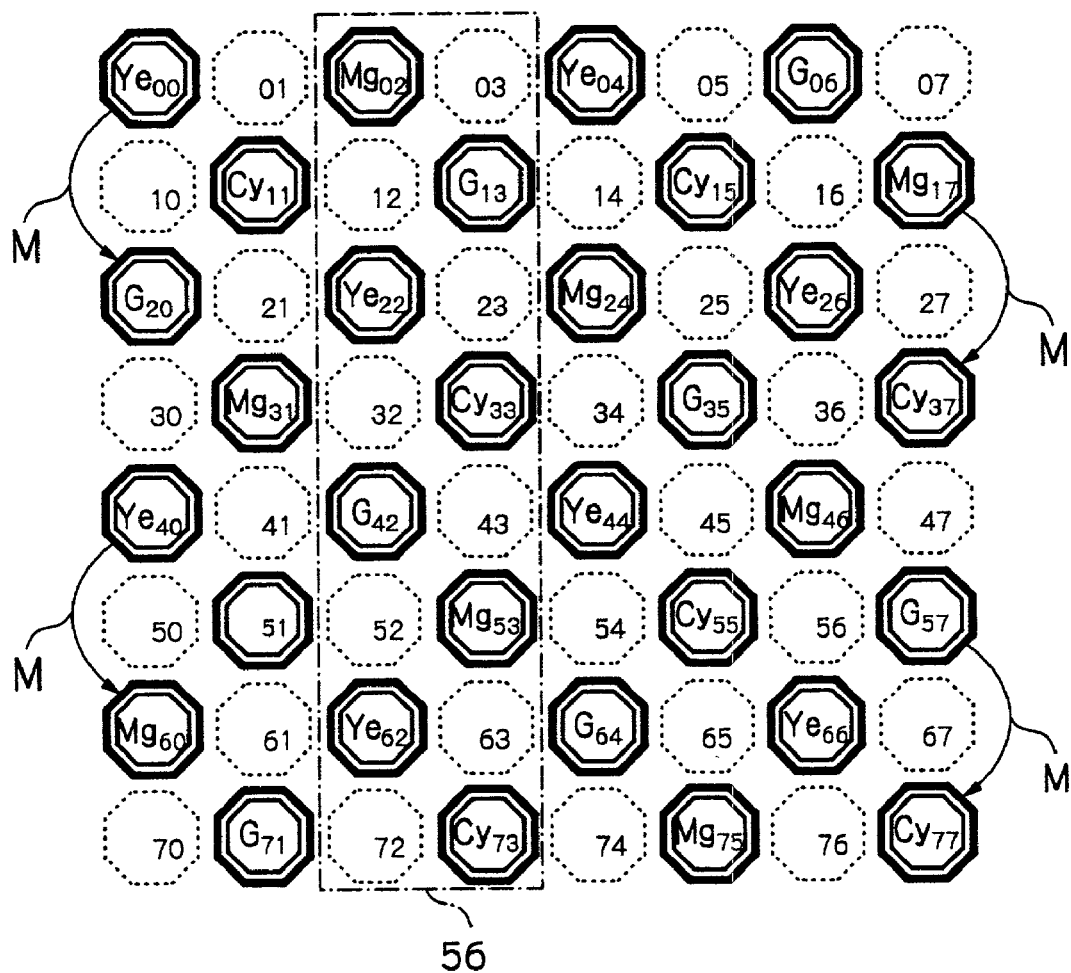
FIG. 34 is a view showing a positional relation between photosensitive cells mixed together when pixels are read out of the image pickup section in mixture.

The various kinds of processing unique to the illustrative embodiment will be described more specifically hereinafter. The half-stroke position of the shutter release bottom and the movie display are dealt with as a single mode. Before the subroutine SUB1, two lines of pixel data belonging to the same field are mixed by interlace scanning. FIG. 34 shows arrows M indicative of a relation between two lines to be mixed. Complementary color pixel data are transformed to primary color pixel data in each unit region 56 shown in FIG. 34. The unit region 56 has two pixels in the horizontal direction and eight lines in the vertical direction. The complementary colors Mg, Cy and Ye and the primary colors R, G and B to be generated have the following relations:

$$R+B=Mg \qquad \text{Eq. (1)}$$

$$G+B=Cy \qquad \text{Eq. (2)}$$

$$R+G=Ye \qquad \text{Eq. (3)}$$

In the illustrative embodiment, the color of the individual pixel data is represented by a letter or letters while the position of the same in a matrix is represented by numerals attached thereto. Further, phantom lines are representative of positions where the photosensitive cells are absent, i.e., virtual photosensitive cells or virtual pixels. As FIGS. 34 and 35 indicate, mixed pixels h, i, j and k lying in the unit region 56 are expressed as:

$$Mg+Cy=h \qquad \text{Eq. (2a)}$$

$$Ye+G=i \qquad \text{Eq. (2b)}$$

$$Ye+Mg=j \qquad \text{Eq. (2c)}$$

$$Cy+G=k \qquad \text{Eq. (2d)}$$

Figure 35:
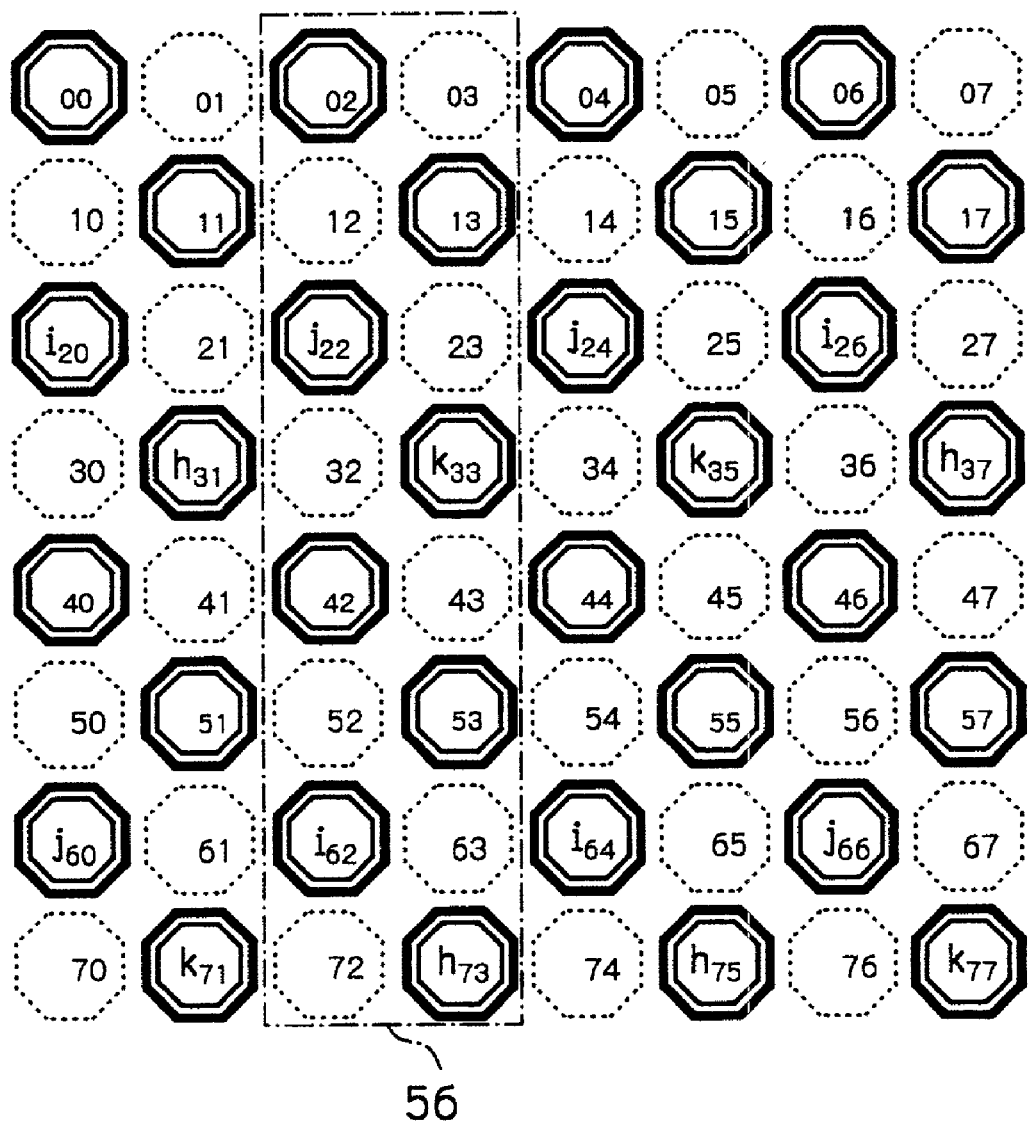
FIG. 35 is a view showing parameters representative of the result of mixture shown in FIG. 34 together with their positions.

In FIG. 35, mixed pixels $j_{22}$, $k_{33}$, $i_{62}$ and $h_{73}$ exist in the unit region 56. In this mode, the mixed pixels are input to the signal processing section 36.

Figure 36:
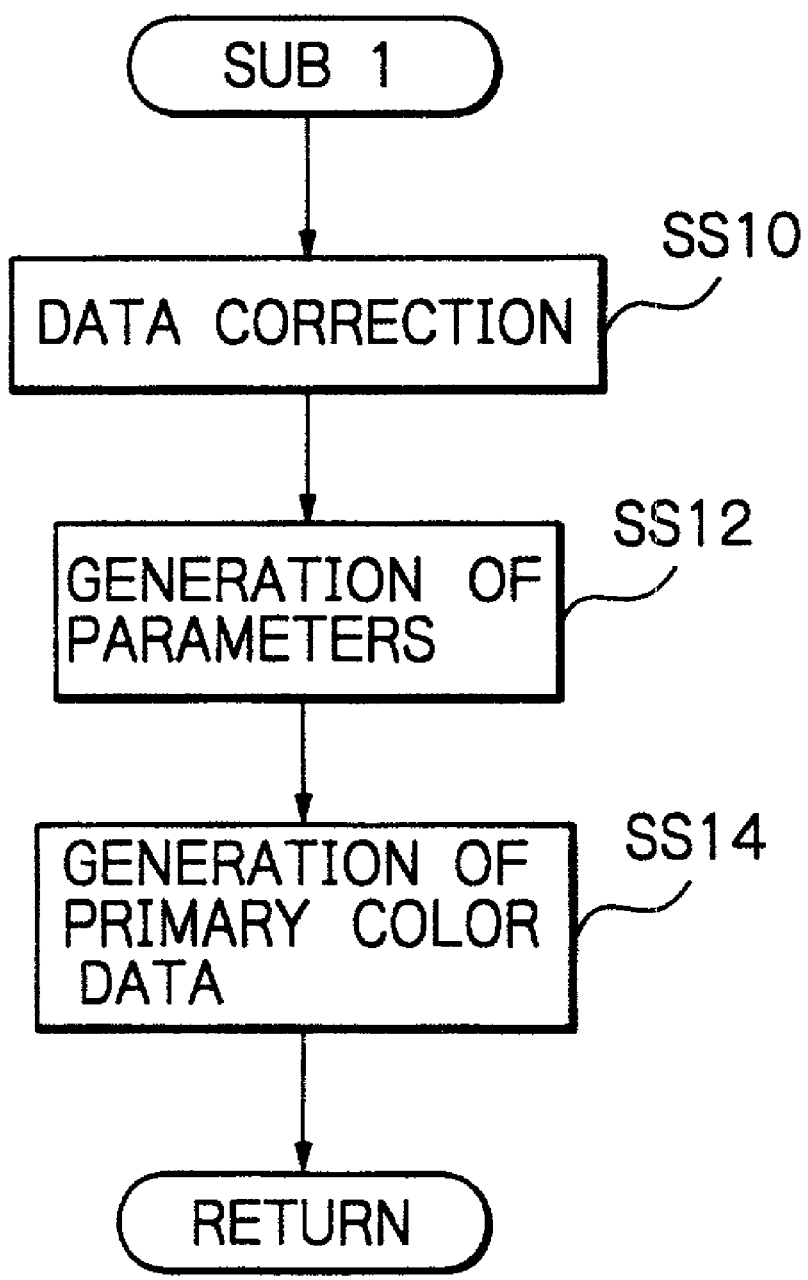
FIG. 36 is a flowchart showing a subroutine SUB1 included in the flowchart of FIG. 33 in detail.

FIG. 36 shows the subroutine SUB1 in detail. As shown, the mixed pixels are subjected to correction (substep SS10). Particularly, gain correction is executed such that the mixed pixels allow adequate image data to be produced when transformed to primary color pixel data. The mixed image data 36A subjected to gain correction are input to the primary color generator 360b and still picture interpolator 362b included in the interpolator 36b. At this instant, the system controller 18 enables either one of the control signals 18a input to the primary color generator 360b and still picture interpolator 362b via the system bus branch 16a. For example, to select the primary color generator 360b (active-low), the system controller 18 provides the control signal 18a input to the generator 360b with a low level. The primary color generator 360b calculates various parameters (substep SS12).

Specifically, in the primary color generator 360b, the difference generator 3600 produces differences between the mixed pixel data by using the following specific equations:

$$m = h - I (= \{Mg+Cy\} - \{Ye+G\}) = 2B - G \quad \text{Eq. (3a)}$$

$$n = j - k (= \{Ye+Mg\} = \{Cy+G\}) = 2R - G \quad \text{Eq. (3b)}$$

When new parameters m and n are generated in consideration of the positions of the parameters h, i, j and k shown in FIG. 35, the positions for generation may be determined in consideration of the direction of subtraction (e.g. $n_{23} = j_{22} - k_{33}$ and $m_{72} = h_{72} - i_{62}$).

The all color mixer 3602 also included in the primary color generation 360b produces the sum S of the mixed pixel data:

$$S = h + i = j + k = Mg + Cy + Ye + G = 2R + 3G + 2B \quad \text{Eq. (4)}$$

Figure 37:
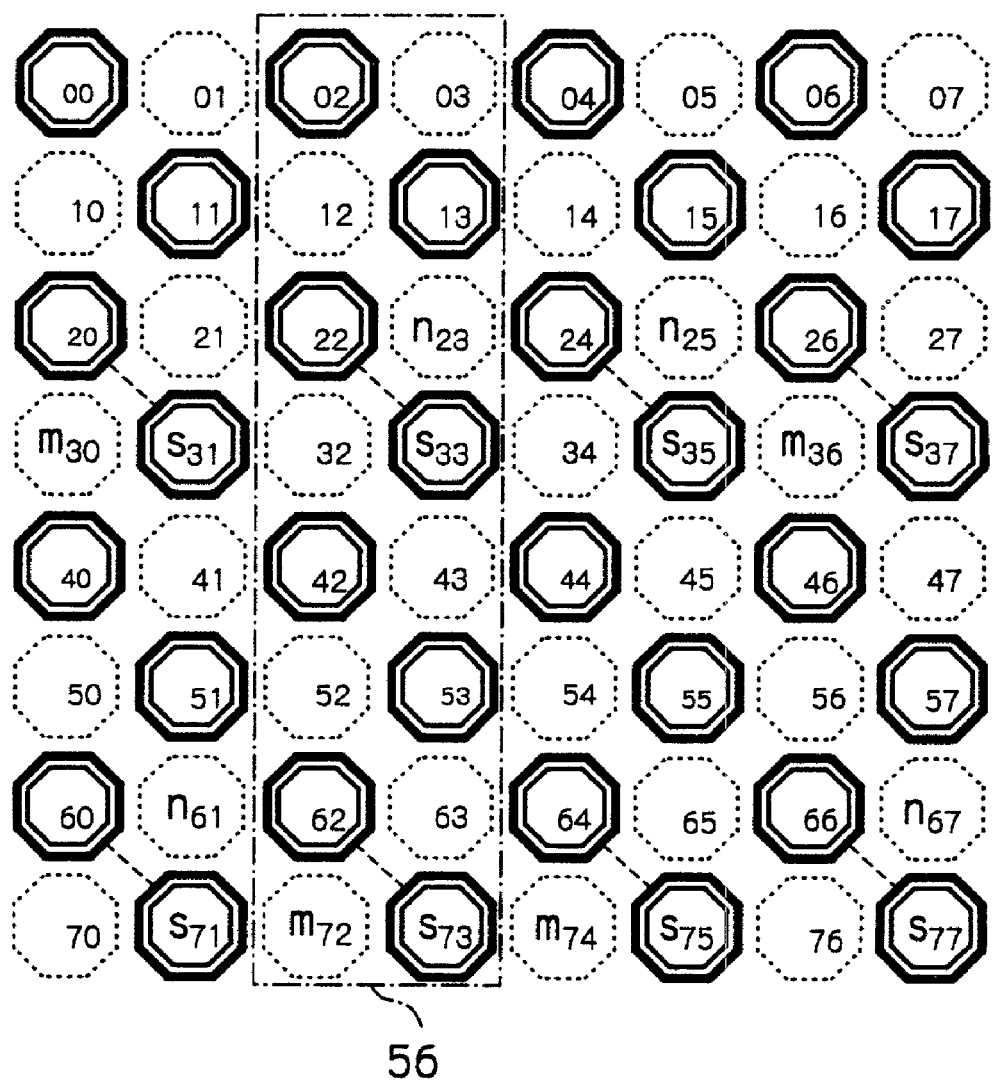
FIG. 37 is a view showing parameters produced in the subroutine SUB1 together with their positions.

As shown in FIG. 37, the sum S is assigned to the lowest line positions $S_{33}$ and $S_{73}$ of the mixed four pixels, which belong to different fields, but spatially adjoin each other. In FIG. 37, phantom lines connecting the pixels are representative of the positions of the data subtracted and added and correspondence therebetween.

Subsequently, primary color pixel data R, G and B are calculated on the basis of the parameters produced in the substep SS12 (substep SS14). Specifically, the two differences derived from the Eqs. (3a) and 3(b) and the sum S are input to the G generator 3604, FIG. 3. Generally, the G pixel data lying in the unit region 56 is produced by:

$$G = (S - m - n)/5 \quad \text{Eq. (5)}$$

The G pixel data is assigned to the position of the photosensitive cell located at substantially the center of the eight consecutive lines, e.g., the position 42 in matrix representation.

The G pixel data calculated is fed to one input of the R generator 3606 and one input of the B generator 3608. The results of subtraction 360A and 360B output from the difference generator 3600 are respectively input to the other input of the R generator 3606 and the other input of the B generator 3608. The R generator 3606 and B generator 3608 respectively generate R pixel data and B pixel data by using the following equations:

$$R = (m + G)/2 \quad \text{Eq. (6a)}$$

$$B = (n + G)/2 \quad \text{Eq. (6b)}$$

Figure 38:
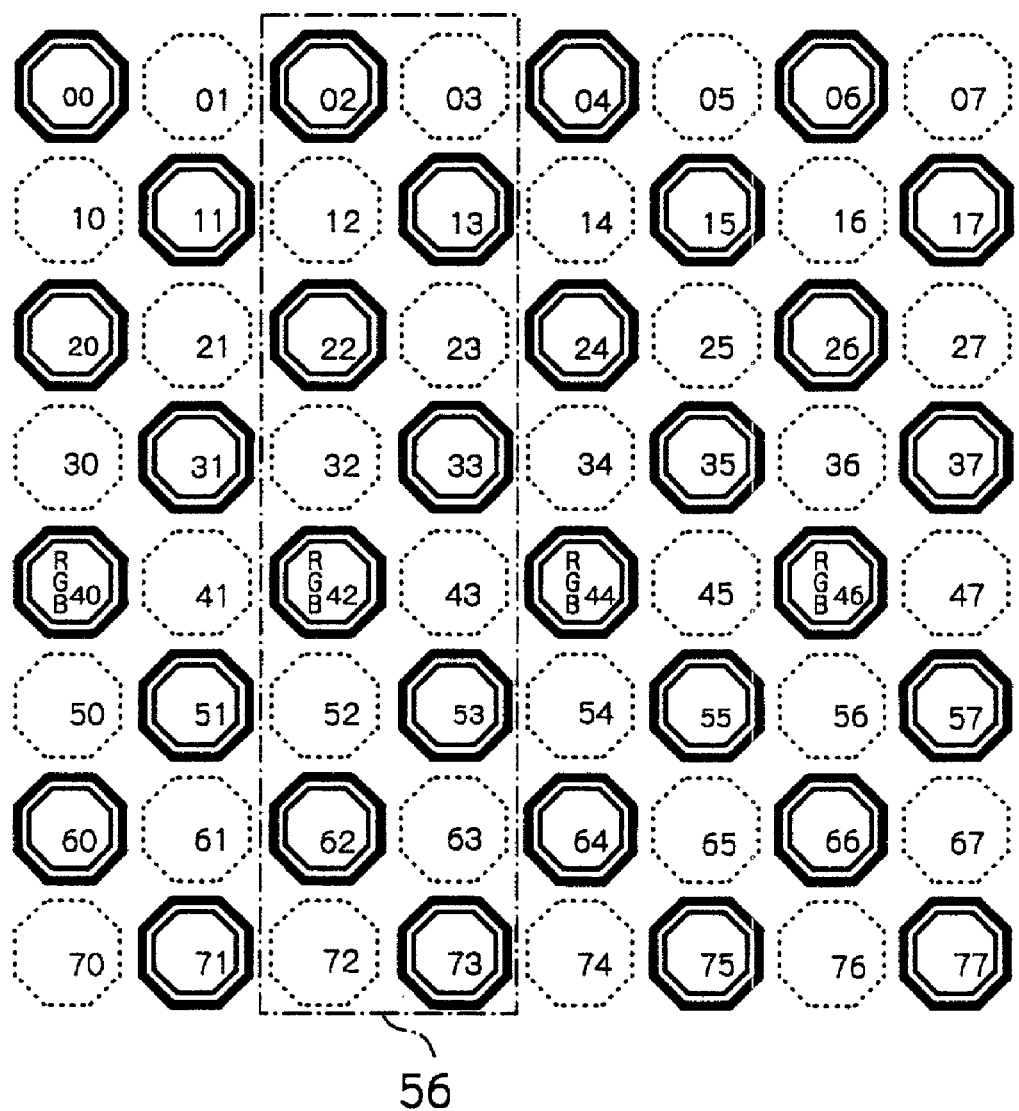
FIG. 38 is a view showing primary color pixel data produced at the end of the subroutine SUB1 together with their positions.

The R and B pixel data produced by the Eqs. (6a) and (6b) are assigned to the same position 42 as the G pixel data, as shown in FIG. 38. In this manner, primary color pixel data R, G and B are produced.

The procedure described above produces a group of pixel data R, G and B from eight pixel data lying in the unit region 56. In this sense, the procedure is equivalent to thinning out the pixel data to one-eighth. The primary color pixel data R, G and B are fed to the chrominance matrix 364b and either one of the signal processing section 36 and system controller 18. When the substep SS14 is repeated over the entire picture or part of the picture, the subroutine SUB1 ends (RETURN).

The calculations for automatic control (subroutine SUB2) will be briefly described with reference to FIG. 39. While automatic control available with the illustrative embodiment includes AF, AE and AWB, the following description will concentrate on AF and AE. The automatic control is assigned to the system controller 18. The system controller 18 performs calculations with the primary color pixel data output in the subroutine SUB1 so as to control the various sections of the camera 10.

Figure 39:
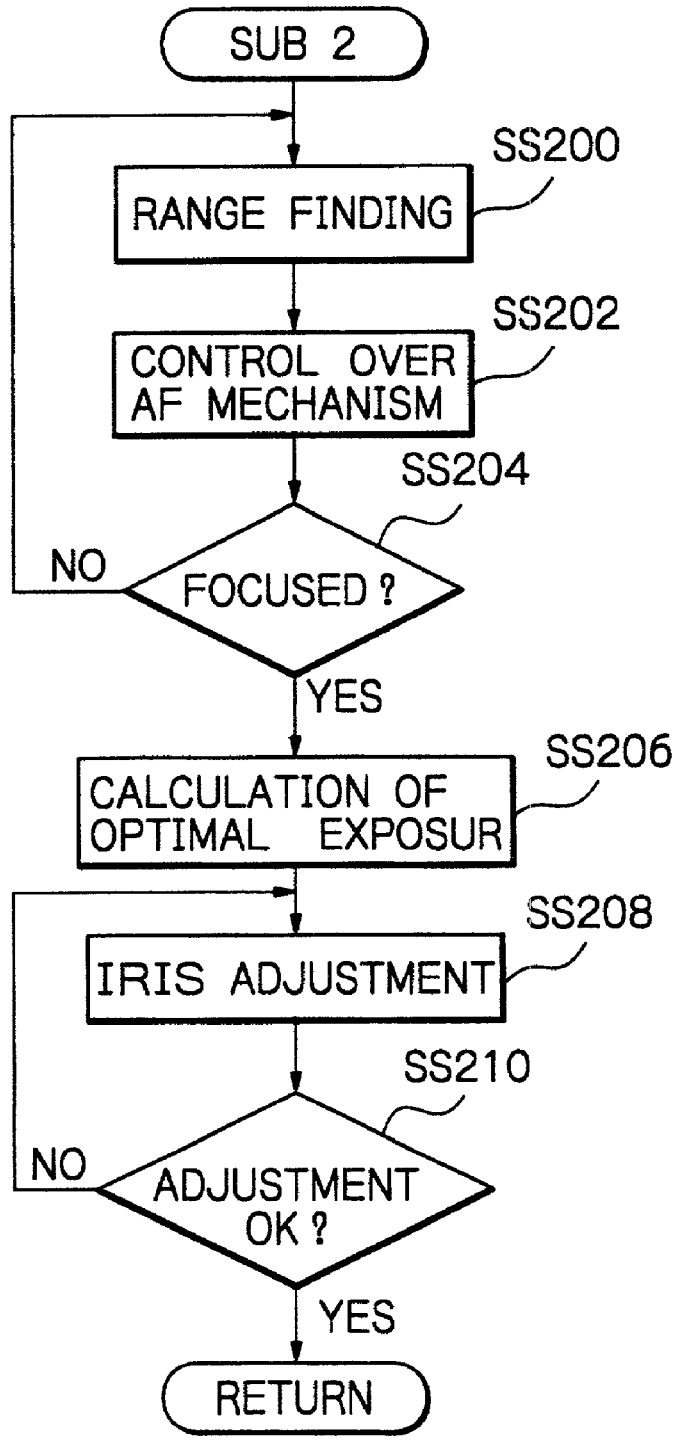
FIG. 39 is a flowchart showing a subroutine SUB2 included in the flowchart of FIG. 33 in detail.

As shown in FIG. 39, the system controller 18 measures the range between the object and the camera 10 on the basis of the image data fed thereto (substep SS200). The system controller 18 then generates a control signal 18a in accordance with the measured range and feeds it to the AF control mechanism (substep SS202). In response, the AF control mechanism automatically adjusts the focus of the lens system 12. At this instant, second photometry is effected at the position to which the lens system 12 is moved, although not shown in FIG. 39.

The system controller 18 determines, based on the result of the second photometry, whether or not the lens system 12 has focused an optical image on the sensor array (substep SS204). If the answer of the substep SS204 is NO, the system controller 18 returns to the range finding substep SS200. If the answer of the substep SS204 is YES, the system controller 18 performs AE photometry control.

Specifically, by using the primary color pixel data derived from the AF (range finding) control, the system controller 18 calculates an optimal exposure value and an optimal shutter speed (substep SS206). For the calculation, the system controller 18 may use a program diagram by way of example. The system controller 18 then generates control signals 18a corresponding to the calculated exposure value and shutter speed and feeds them to the driver 24 via the system bus 16. The driver 24 generates drive signals 24a in accordance with the control signals 18a and delivers them to the iris control mechanism 26 (substep SS208).

The iris control mechanism 26 executes adjustment in accordance with the drive signals 24a. After the adjustment, the system controller 18 determines whether or not the iris diaphragm has been brought to a position corresponding to the calculated exposure value (substep SS210). Assume that the adjustment of the iris diaphragm is not adequate or that the brightness of the scene varies during photometry by way of example (NO, substep SS210). Then, the procedure returns to the step SS208 or the step SS206. In FIG. 39, the procedure returns to the step SS208 on the assumption that the adjustment of the iris diaphragm is not adequate. If the answer of the substep SS210 is YES, the subroutine SUB2 ends (RETURN).

Figure 40:
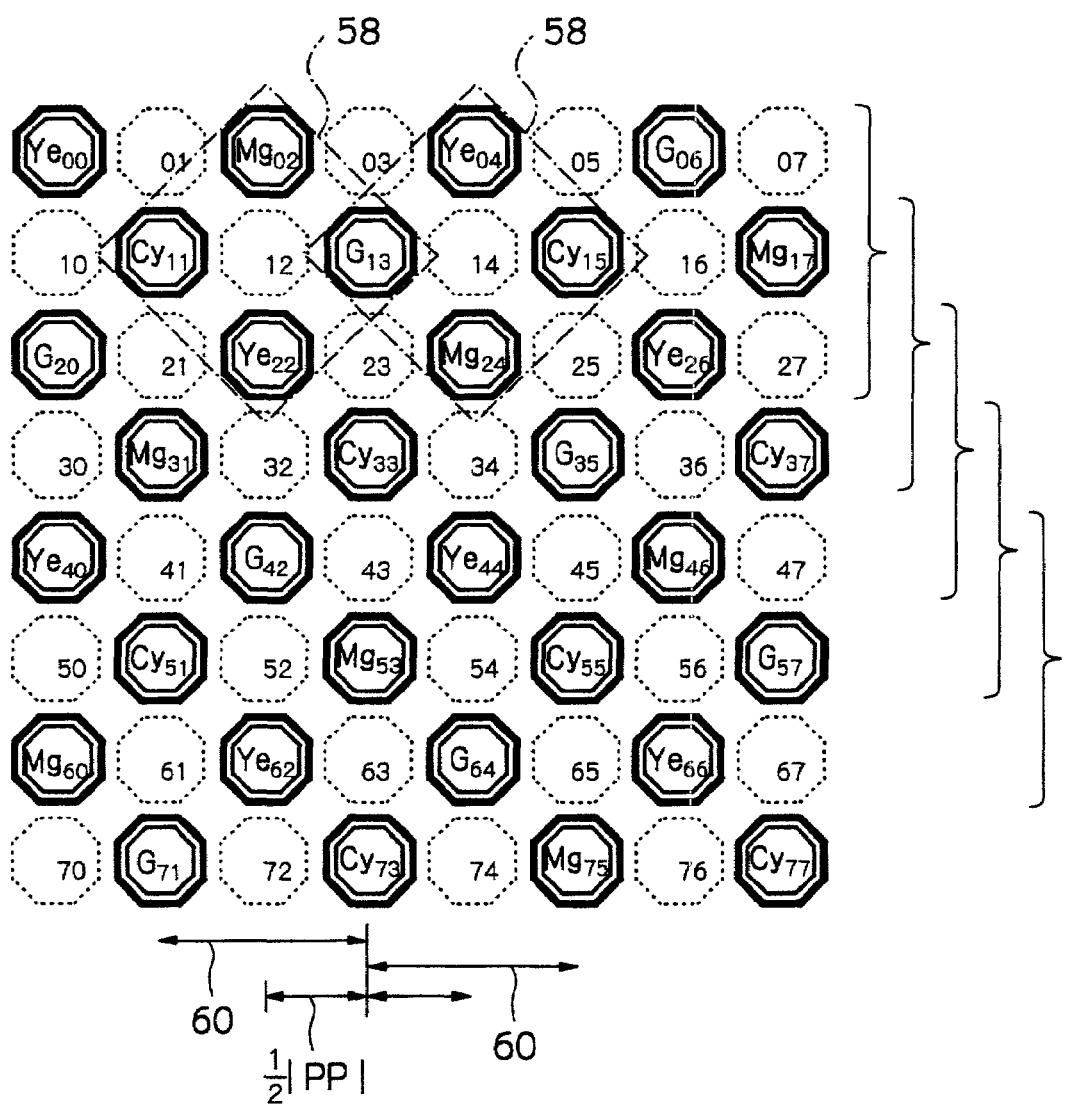
FIG. 40 is a view demonstrating how pixel data are read out by an all pixel reading scheme in the flowchart of FIG. 33 and a unit region of pixel data to be used in a subroutine SUB3 also shown in FIG. 33.

How the camera 10 records a still picture by reading out all the pixels will be described hereinafter. Signal charges are read out of the photodiodes PD of the image sensor 30 without being mixed in color. The signal charges are then subjected to preprocessing and analog-to-digital conversion to be thereby converted to digital image data. The digital image data are written to a non-destructive memory. As a result, as shown in FIG. 40, the image data output from the photodiodes PD via the color filter segments, which include complementary colors, are written to the non-destructive memory.

The pixel data are read out of the non-destructive memory under the control of the system controller 18. Specifically, as shown in FIG. 40, pixel data of four colors Cy, Ye, Mg and G assigned to the filter segments of the color filter CF and lying in a tetragon 58 rotated by 45° are read out together as a unit. The tetragon 58, which contains three lines, is sequentially shifted in the horizontal direction by two lines, i.e., over a unit width 60. Subsequently, pixel data of four colors Cy, Ye, Mg and G are read out the next three consecutive lines, which are contained in a tetragon having a photodiode PD positioned one line below at its top. More specifically, four pixel data shifted from the overlying pixel data by one-half of the pixel pitch |PP| over which the two tetragons 58 overlap each other (½|PP|) are read out. In FIG. 40, solid octagons and phantom octagons are representative of actual photosensitive cells and virtual photosensitive cells, respectively.

Figure 41:
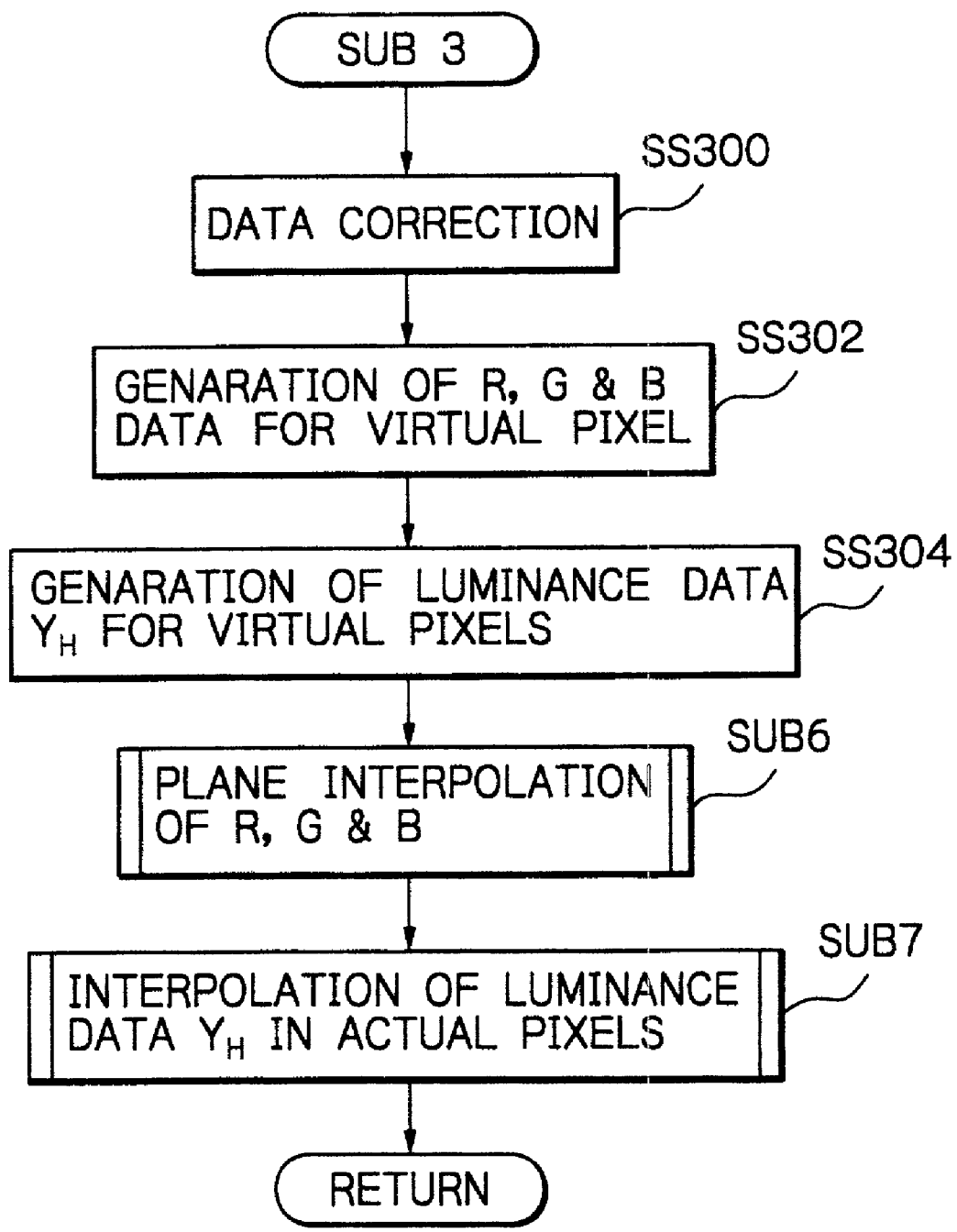
FIG. 41 is a flowchart showing the subroutine SUB3 in detail.

The pixel data read out of the image sensor 30 are input to the signal processing section 36. FIG. 41 shows the subroutine SUB3 in detail that the signal processing section 36 executes on the receipt of the pixel data. As shown, the signal processing section 36 first executes gain control with the pixel data in the same manner as in the previously stated half-stroke shutter release mode and movie mode (substep SS300). In addition, the signal processing section 36 may execute gamma correction and white balance adjustment. The corrected pixel data 36A are input to the interpolator 36b.

Figure 42:
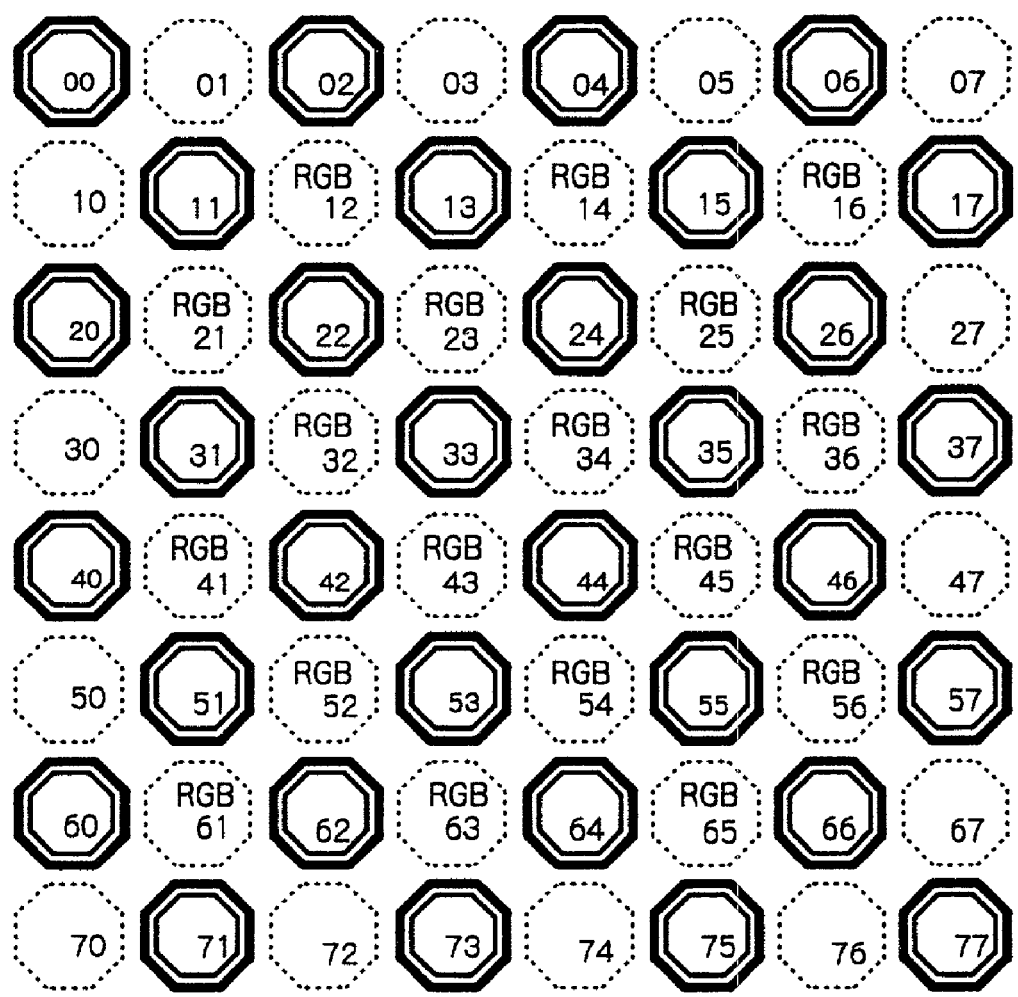
FIG. 42 is a view showing a relation between complementary color pixel data and primary color pixel data derived therefrom in the subroutine SUB3.

The interpolator 36b receives a control signal 18a from the system controller 18 via the system bus branch 16a. The control signal 18a includes an enable signal having a positive level. In the interpolation, the still picture interpolator 362b takes in the pixel data 36A in response to the control signal 18a. The pixel data 36A are input to the virtual pixel interpolator 3620 and luminance data generator 3624. The virtual pixel interpolation 3620 transforms the pixel data 36A to pixel data of primary colors R, G and B (substep SS302). FIG. 42 shows a relation between the position of the individual virtual pixel and the pixel data 36A read out of the photosensitive cells and used for the above transformation. As shown, pixel data of four colors Mg, Ye, G and Cy located at the same distance from a virtual pixel are used for the transformation.

Specifically, the virtual pixel interpolator 3620 calculates pixel data R, G and B by using the pixel data Mg, Ye, G and Cy and preselected twelve matrix coefficients $M_{11}, \sim, M_{44}$:

$$\begin{pmatrix} R \\ G \\ B \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \end{pmatrix} \begin{pmatrix} Mg \\ Ye \\ G \\ Cy \end{pmatrix} \quad \text{Eq. (7)}$$

For example, to produce primary color data $R_{14}$, $G_{14}$ and $B_{14}$ for a virtual pixel 14, use is made of pixel data $Mg_{24}$, $Ye_{04}$, $G_{13}$ and $Cy_{15}$ derived from the actual photosensitive cells. By using such pixel data, it is possible to interpolate primary color pixel data in the virtual pixels in a checker pattern (see FIG. 42).

The luminance data generator 3624 generates luminance data $Y_H$ for the virtual pixels on the basis of the input pixel data 36A (substep SS304). The generator 3624 adds the pixel data of actual photosensitive cells Mg, Ye, G and Cy and uses the resulting sum as luminance data $Y_H$. The luminance data $Y_H$ is therefore expressed as:

$$Y_H = h+i+j+k = Mg+Cy+Ye+G = 2R+3G+2B \quad \text{Eq. (8)}$$

While the Eq. (8) is similar to the Eq. (4), the former is different from the latter as to the position of pixel data to be used. Luminance data $Y_{H14}$, for example, is generated on the basis of the pixel data $Mg_{24}$, $Ye_{04}$, $G_{13}$ and $Cy_{15}$. In this manner, luminance data $Y_H$ is generated by use of pixel data.

Figure 44:
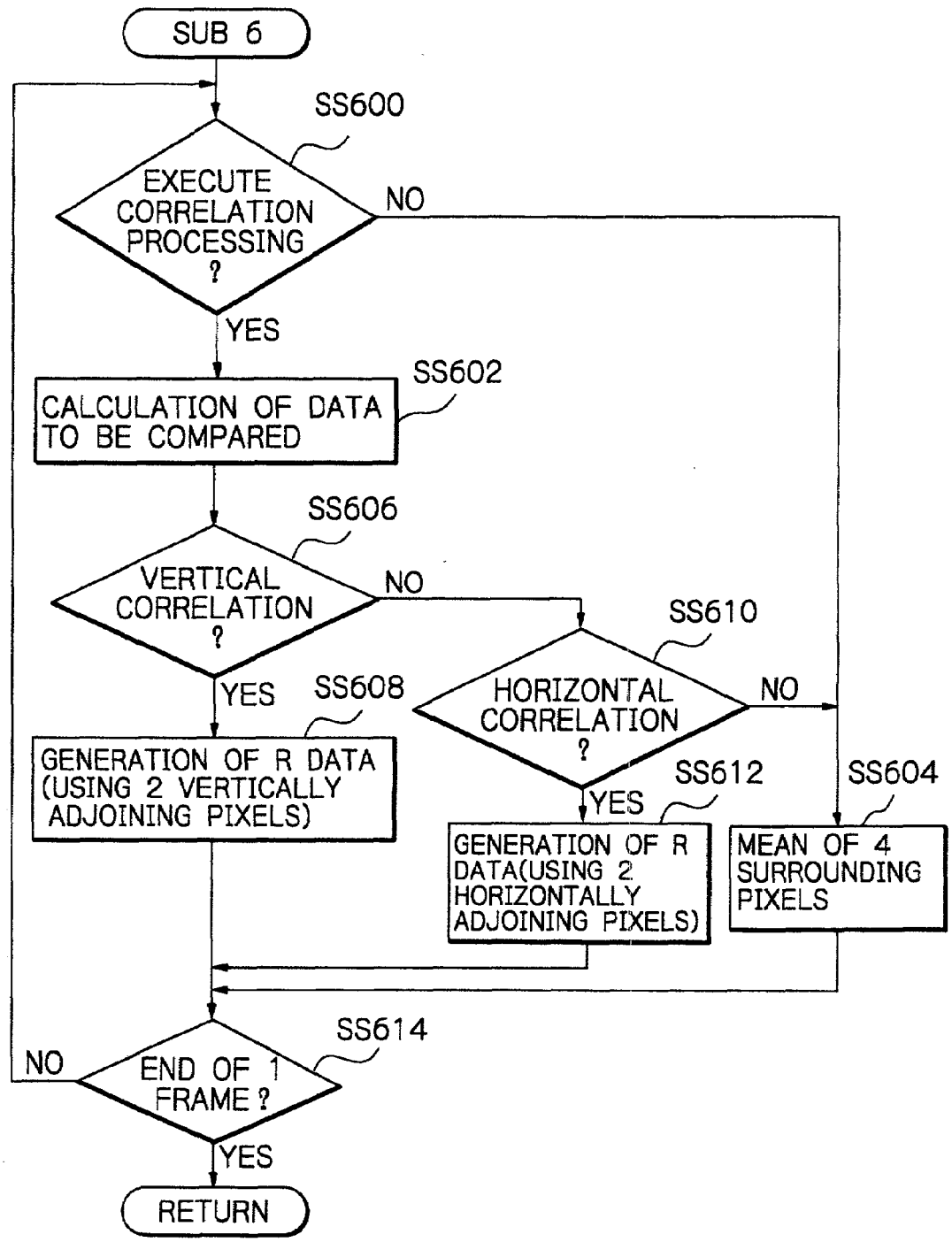
FIG. 44 is a flowchart showing a subroutine SUB6 included in the flowchart of FIG. 41 in detail.

After the generation of the primary colors R, G and B and luminance data $Y_H$, primary color pixel data R, G and B are calculated by interpolation for the actual photosensitive cells (subroutine SUB6). FIG. 44 shows the subroutine SUB6 in detail. The subroutine SUB6 will be described with reference also made to FIGS. 42 and 45.

As shown in FIG. 42, the pixel data R, G and B having been generated are arranged in a checker pattern. Because the primary colors R, G and B have been generated at the same positions as each other, the following procedure will concentrate on the color R only. In the illustrative embodiment, for the interpolation of pixel data R, the pixel data R of the virtual pixels calculated are used, and adaptive processing is effected in accordance with a correlation between the pixel data R.

As shown in FIG. 44, the subroutine SUB6 begins with a substep SS600 for determining whether or not to execute correlation processing. If the answer of the substep SS600 is YES, a substep SS602 is executed; if otherwise (NO, substep SS600), a substep SS604 is executed.

In the substep SS602, data to be compared for vertical and horizontal correlation processing are calculated. At this instant, as shown in FIG. 42, the pixel data R have already been generated for the virtual pixels of the image sensor 30. Again, suffixes shown in FIG. 42 are indicative of the positions of the photosensitive cells in matrix representation; solid lines and phantom lines are indicative of the actual photosensitive cells or pixels and virtual photosensitive cells or pixels, respectively.

Basically, each actual photosensitive cell whose pixel data R should be determined is located at the center of the unit region for calculation. No pixel data R are available for the actual photosensitive cell in the oblique directions, so that a correlation is determined only in the vertical and horizontal directions.

To determine a correlation, data to be compared with a preselected reference value are calculated. The data to be compared are of the same color as the pixel data to be generated, i.e., R. For example, assume that pixel data to be generated is $R_{33}$. Then, the pixel data $R_{23}$, $R_{43}$, $R_{32}$ and $R_{34}$ around the pixel data $R_{33}$ are used to calculate vertical data $ARR_V$ and horizontal data $ARR_H$ to be compared:

$$ARR_V = |R_{23} - R_{43}| \quad \text{Eq. (9a)}$$

$$ARR_H = |R_{32} - R_{34}| \quad \text{Eq. (9b)}$$

Subsequently, correlation values ($ARR_H - ARR_V$) and ($ARR_V - ARR_H$) are produced. At this time, the correlation values each are compared with a particular preselected reference value $J_R$ so as to determine whether or not a correlation exists (substep SS606). Specifically, in the substep SS606, whether or not the pixel data $R_{23}$ and $R_{43}$ adjoining the pixel data $R_{33}$ to be interpolated in the vertical direction are correlated to each other (vertical correlation) is determined. Assume that the difference between the two data $ARR_H$ and $ARR_V$, i.e., ($ARR_H - ARR_V$) is greater than a reference value $J_{RV}$ assigned to the vertical direction (YES, substep SS606). Then, a vertical correlation is determined to be present. If the difference ($ARR_H - ARR_V$) is smaller than the reference value $J_{RV}$ (NO, substep SS606), a vertical correlation is determined to be absent.

The presence of a vertical correlation, as determined in the substep SS606, means that the pixel data $R_{23}$ and $R_{43}$ have values close to each other. The pixel data $R_{23}$ and $R_{43}$ are therefore used in a substep SS608 in order to calculate the pixel data $R_{33}$:

$$R_{33} = (R_{23} + R_{43})/2 \quad \text{Eq. (10)}$$

If the vertical correlation is absent (NO, substep SS606), whether or not the pixel data $R_{32}$ and $R_{34}$ adjoining the pixel data $R_{33}$ to be generated in the horizontal direction are correlated to each other (horizontal correlation) is determined (substep SS610). Specifically, assume that the difference between the vertical data $ARR_V$ and the horizontal data $ARR_H$ to be compared, i.e., ($ARR_V$–$ARR_H$) is greater than a preselected reference value $J_{Rh}$ assigned to the horizontal direction. Then, a horizontal correlation is determined to be present (YES, substep SS610). If the difference ($ARR_V$–$ARR_H$) is smaller than the reference value $J_{Rh}$ (NO, substep SS610), a horizontal correlation is determined to be absent.

When a horizontal correlation exists, the pixel data $R_{32}$ and $R_{34}$ are used in a substep SS612 in order to calculate the pixel data $R_{33}$:

$$R_{33} = (R_{32} + R_{34})/2 \quad \text{Eq. (11)}$$

On the other hand, if the answer of the substep SS600 is NO, the four pixel data $R_{23}$, $R_{32}$, $R_{34}$ and $R_{43}$ located at the same distance from the photosensitive cell $R_{33}$ are used to calculate the pixel data $R_{33}$ (step SS604). For this calculation, use is made of an equation:

$$R_{33} = (R_{23} + R_{43} + R_{32} + R_{34})/4 \quad \text{Eq. (12)}$$

Figure 45:
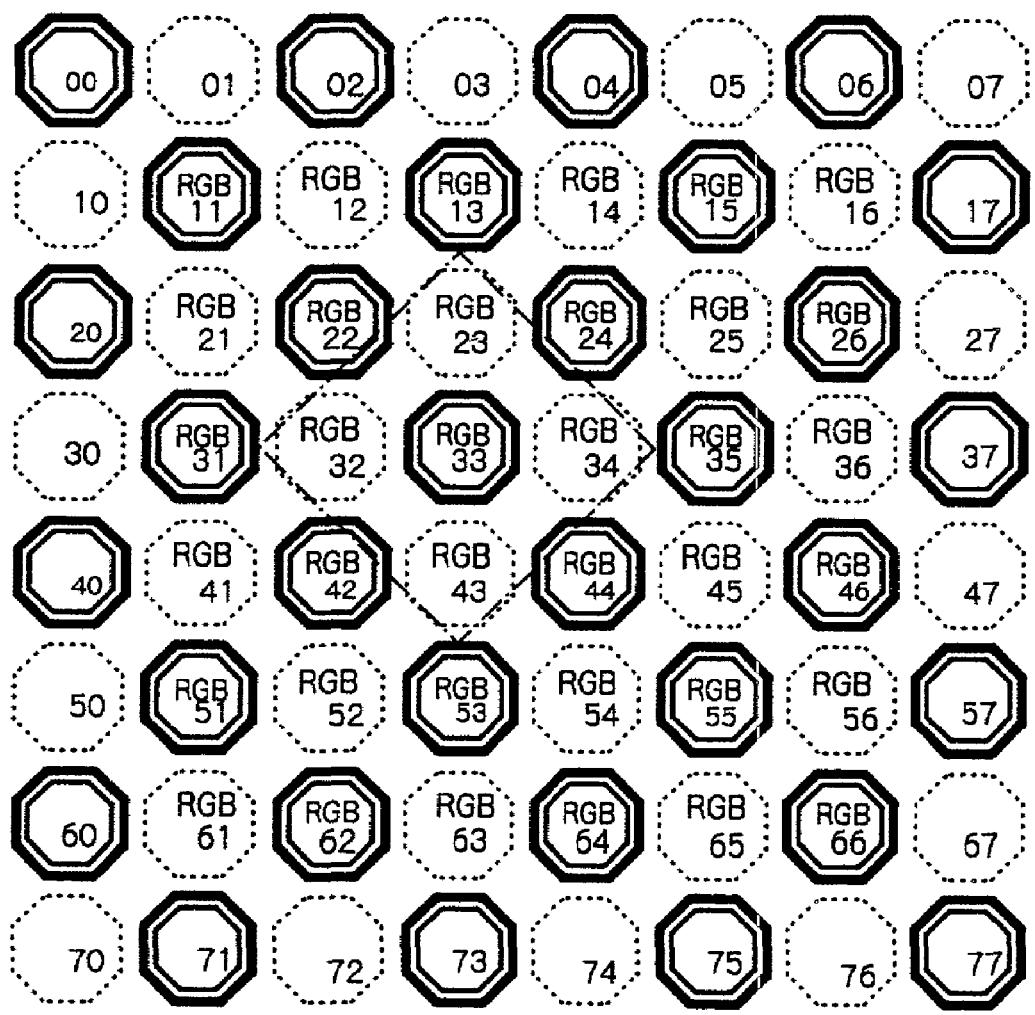
FIG. 45 is a view showing the positions of primary color pixel data newly produced by primary color interpolation that uses the pixel data of FIG. 42.

After any one of the substeps SS608, SS610 and SS604, whether or not interpolation has completed over the entire still picture, e.g., one frame of pixel data (substep SS614). If the answer of the substep SS614 is NO, the procedure returns to the substep SS600 so as to interpolate pixel data R in a plane, as shown in FIG. 45. If the answer of the substep SS614 is YES, the subroutine SUB6 ends (RETURN).

The subroutine SUB6 may, of course, be applied to the other primary colors B and G. Specifically, vertically adjoining data and horizontally adjoining data each are compared with a particular reference value in order to effect interpolation. The resulting primary color data 362B are output.

Figure 43:
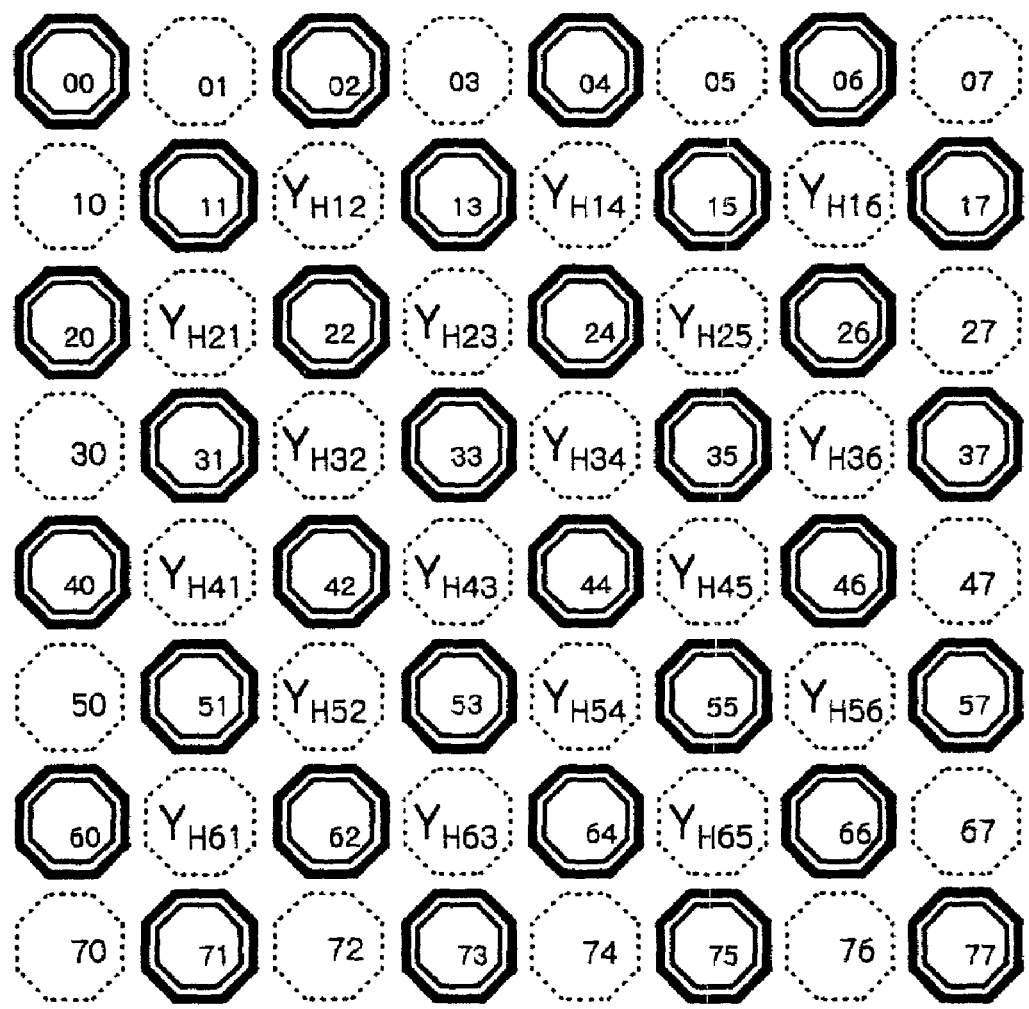
FIG. 43 is a view showing a relation between the complementary color pixel data and luminance data derived therefrom in the subroutine SUB3.
Figure 46:
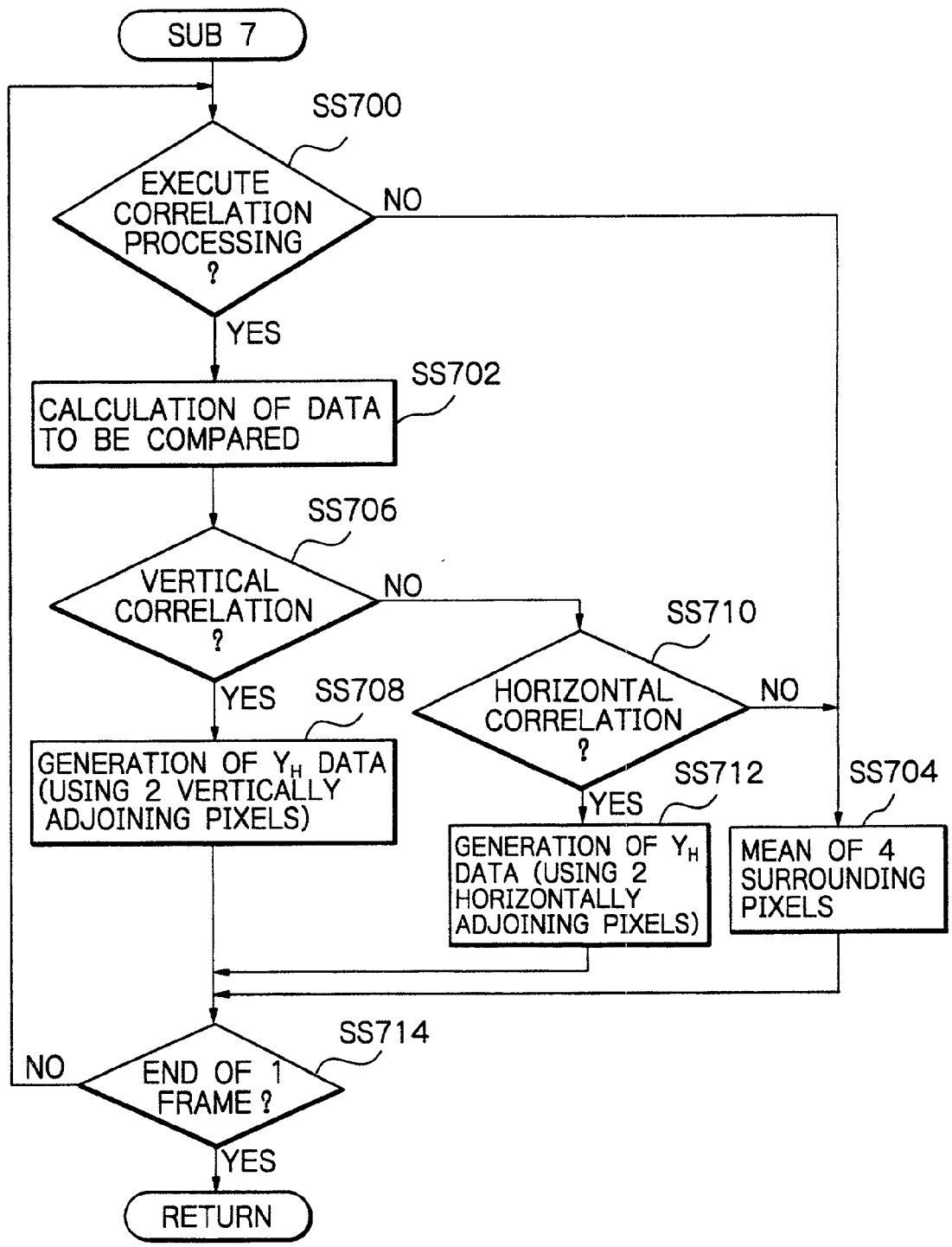
FIG. 46 is a flowchart showing a subroutine SUB7 included in the flowchart of FIG. 41 in detail.

FIG. 46 demonstrates how luminance data $Y_H$ are interpolated (subroutine SUB7). By comparing FIGS. 43 and 42, it will be seen that the luminance data $Y_H$ and primary color pixel data R, G and B generated have the same positional relation as each other. Luminance data $Y_H$ can therefore be interpolated by substantially the same procedure as the pixel data R, G and B (substeps SS700 through SS714). For example, assume that luminance data should be generated for the pixel $Y_{33}$. Then, luminance data $YH_{23}$, $YH_{43}$, $YH_{32}$ and $YH_{34}$ around the pixel $Y_{33}$ are used in the substep SS702 in order to produce vertical data $AYR_V$ and horizontal data $AYR_H$ to be compared:

$$AYR_V = |Y_{H23} - Y_{H43}| \quad \text{Eq. (13a)}$$

$$AYR_H = |Y_{H32} - Y_{H34}| \quad \text{Eq. (13b)}$$

If a vertical correlation exists, the luminance data $Y_{H23}$ and $Y_{H43}$ are used to calculate luminance data $Y_{H33}$:

$$Y_{H33} = (Y_{H23} + Y_{H43})/2 \quad \text{Eq. (14)}$$

If a horizontal correlation exists, the luminance data $Y_{H32}$ and $Y_{H34}$ are used to calculate luminance data $Y_{H33}$:

$$Y_{H33} = (Y_{H32} + Y_{H34})/2 \quad \text{Eq. (15)}$$

Further, if neither a vertical correlation nor a horizontal correlation exists, the four luminance data $Y_{H23}$, $Y_{H43}$, $Y_{H32}$ and $Y_{H34}$ are used to calculate luminance data $Y_{H33}$:

$$Y_{H33} = (Y_{H23} + Y_{H43} + Y_{H32} + Y_{H34})/4 \quad \text{Eq. (16)}$$

Figure 47:
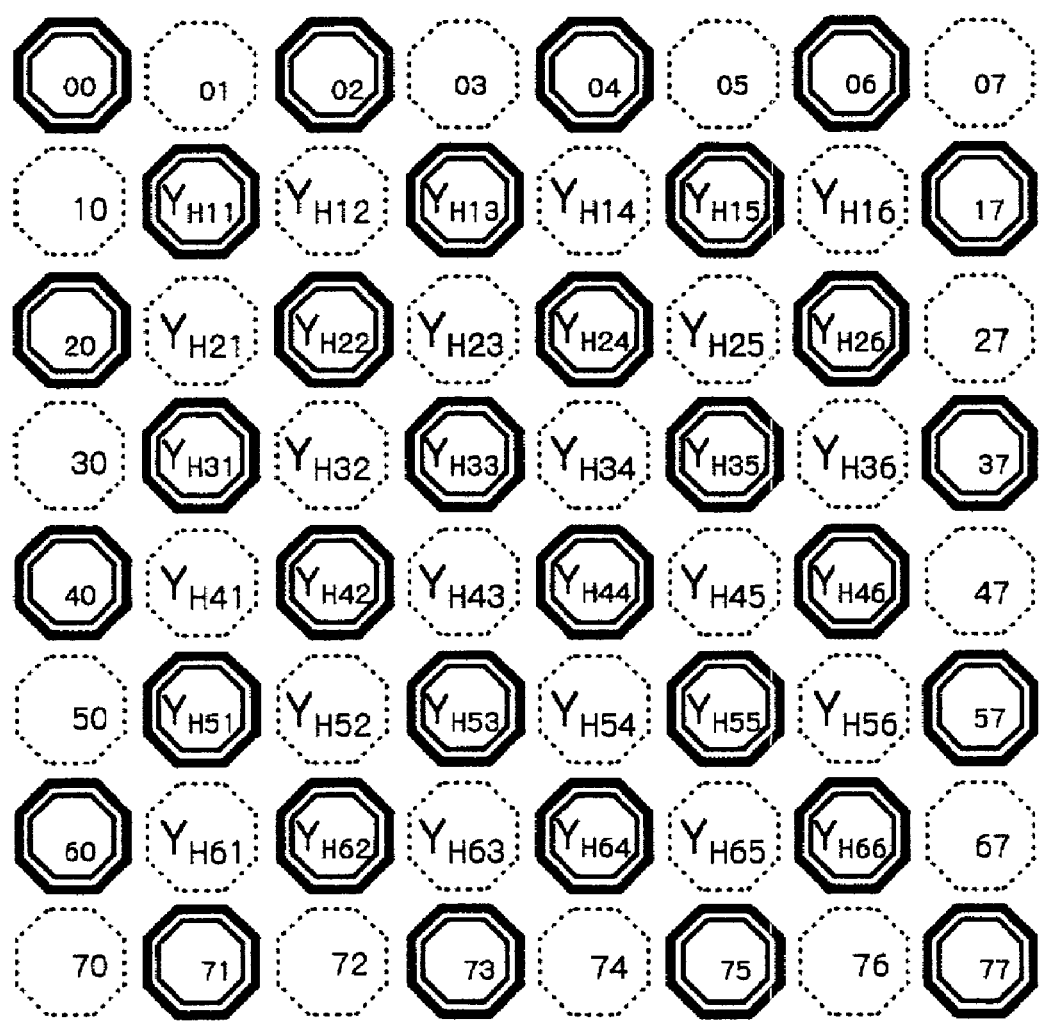
FIG. 47 is a view showing the positions of high frequency luminance data newly produced by plane interpolation that uses the pixel data of FIG. 43.

When the above interpolation completes throughout a single frame, the subroutine SUB7 ends (RETURN). As a result, luminance data $Y_H$ are interpolated in a plane, as shown in FIG. 47. The luminance data interpolator 3626 produces such luminance data $Y_H$ as its output 362D.

Figure 48:
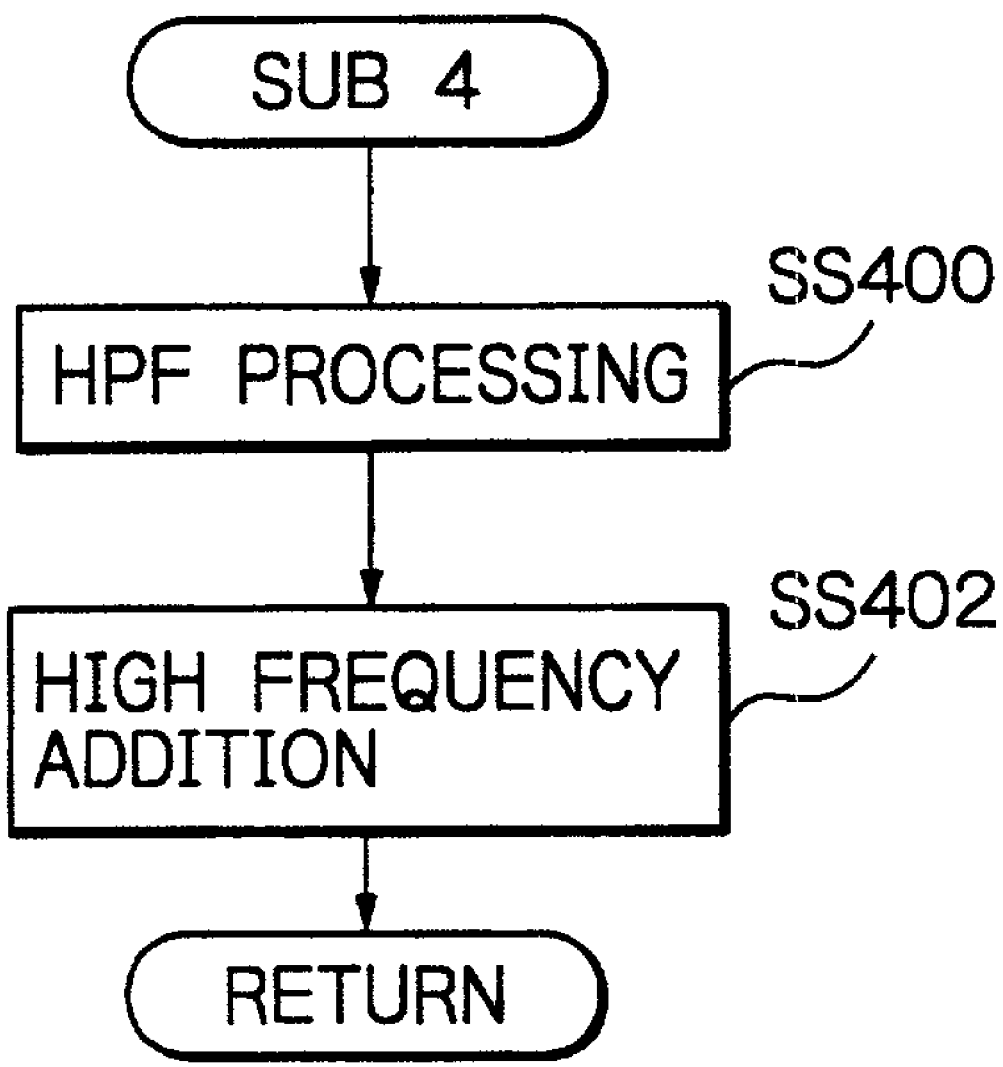
FIG. 48 is a flowchart showing a subroutine SUB4 included in the flowchart of FIG. 33 in detail.

Reference will be made to FIG. 48 for describing the subroutine SUB4 more specifically. As shown, the luminance data $Y_H$ arranged in a plane are passed through the high-pass filter 3628, FIG. 6, (substep SS400). As a result, only luminance data $Y_h$ lying in a high frequency band are output from the HPF 3628 (see FIG. 6).

Figure 49:
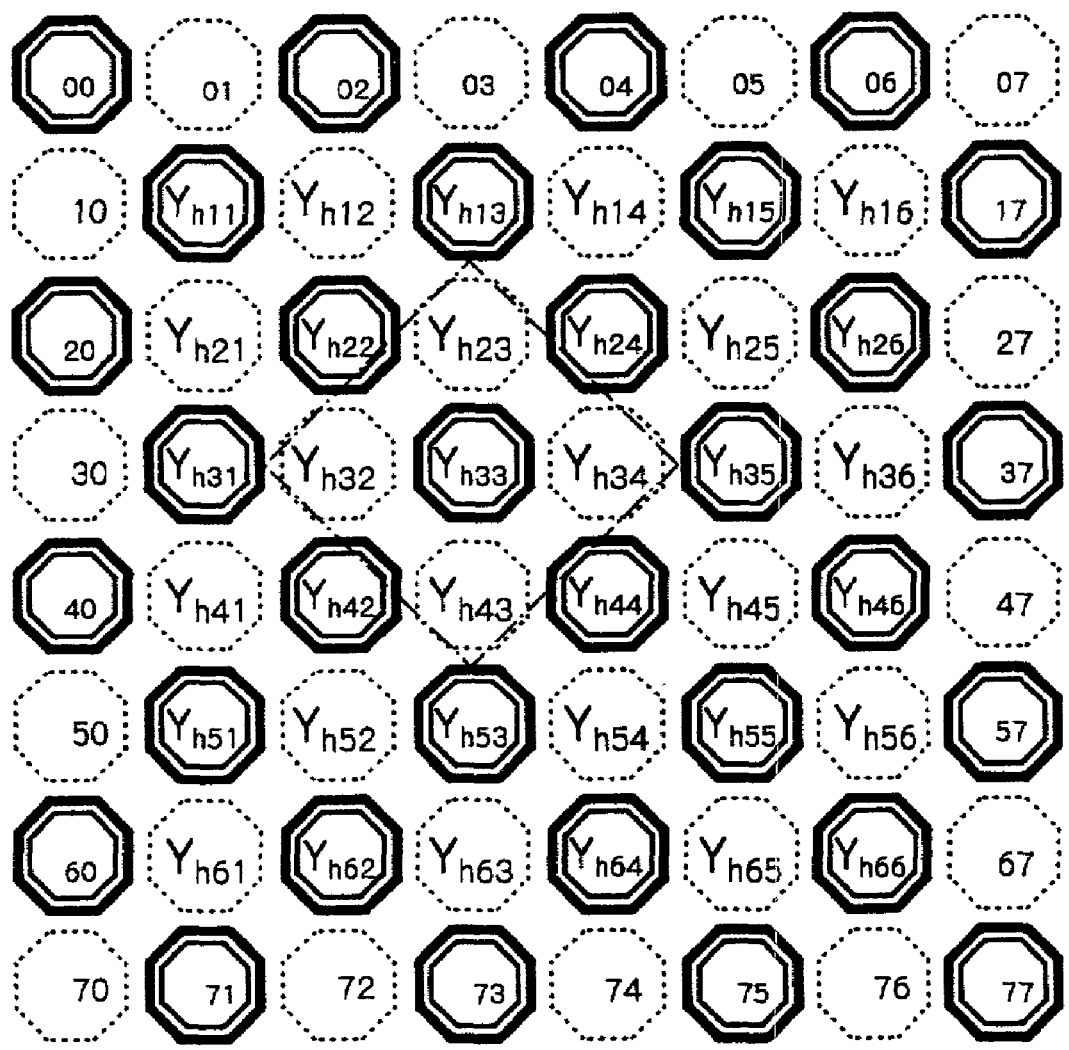
FIG. 49 is a view showing a positional relation between luminance data produced in the subroutine SUB4.

The luminance data $Y_h$ (362E) are added to the pixel data 362B output from the plane interpolation 3622 (substep SS402). Specifically, the adders 3630, 3632 and 3634, FIG. 6, each add the pixel data 362B of a particular color and the luminance data $Y_h$ (see FIG. 49). The subroutine SUB4 is, of course, repeated until addition completes throughout a single frame (RETURN), although not shown specifically in FIG. 48. Consequently, the primary color pixel data 362F are provided with high frequency components.

Figure 50:
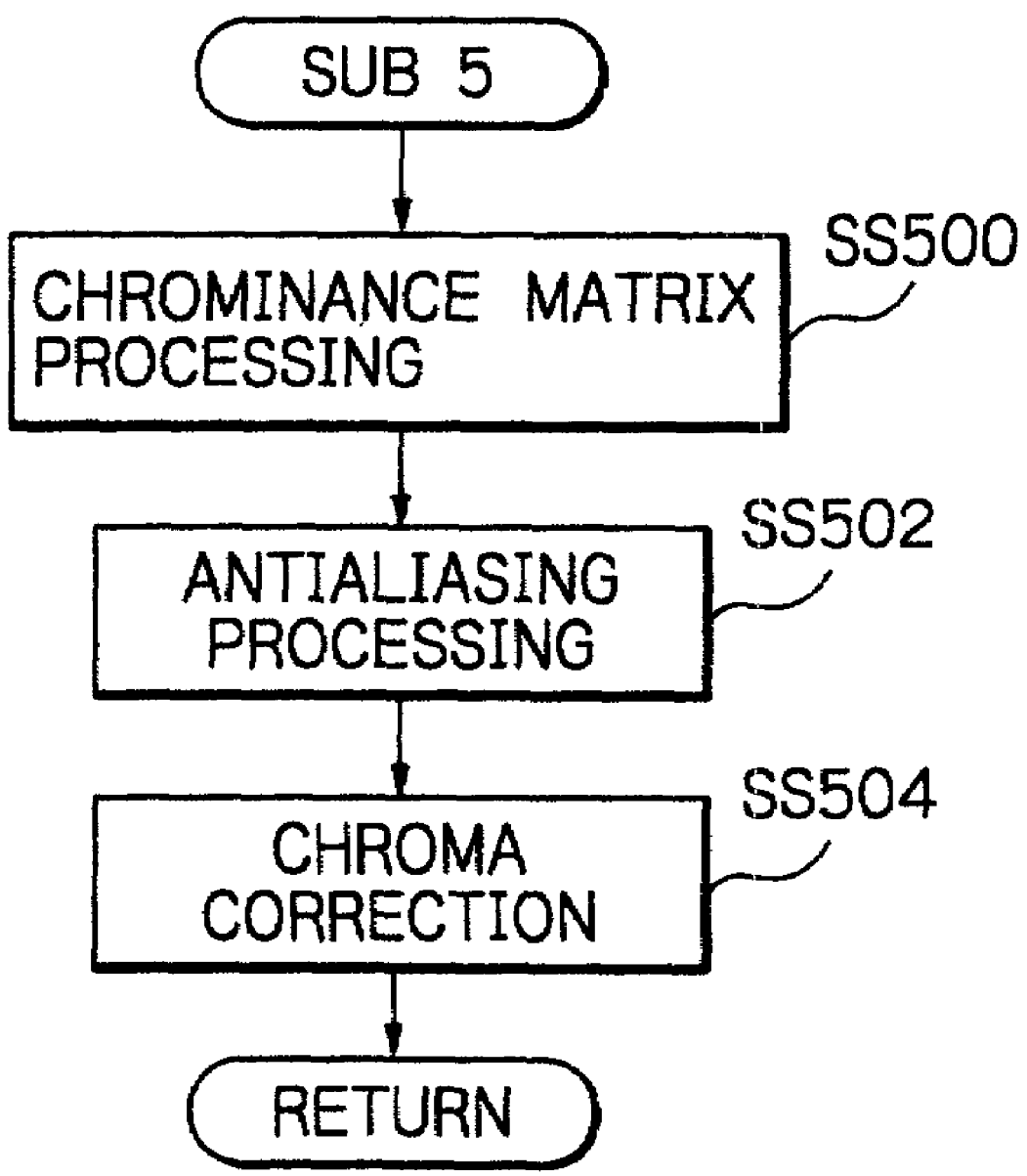
FIG. 50 is a flowchart showing a subroutine SUB5 included in the flowchart of FIG. 33 in detail.

The subroutine SUB5 following the subroutine SUB4 will be described more specifically with reference to FIG. 50. As shown, the primary color pixel data containing high frequency components arranged in a plane are used to generate luminance data Y and two kinds of chrominance data (R-Y) and (B-Y) (substep SS500). For chrominance matrix processing to be executed in the substep SS500, use is made of conventional matrix coefficients arranged in a three row, three column matrix. The luminance data Y and chrominance data (R-Y) and (B-Y) are input to the antialiasing filter 364c.

The antialiasing filter 364c passes each of the luminance data Y and chrominance data (R-Y) and (B-Y) through a particular low-pass filter in order to obviate aliasing distortion (substep SS502). Each low-pass filter passes the associated data up to a particular preselected high frequency. As a result, the luminance data Y (362J, FIG. 5) and chrominance data (R-Y) (362K, FIG. 5) and (B-Y) (362L, FIG. 5) are output.

A Y process enhances the contour of the luminance data 362J although not shown specifically. Also, gain adjustment is executed with the chrominance data 362K and 362L although not shown specifically either. Such a procedure corrects the chroma of the individual data (substep SS504). The signal processing 36 outputs the resulting luminance data Y and chrominance data (R-Y) and (B-Y) (signal 362M, FIG. 5).

In the illustrative embodiment, filter segments of four complementary colors are arranged in a single pattern. Pixel data derived from the filter segments are used to generate primary color pixel data to be assigned to virtual pixels by chrominance matrix processing. Alternatively, primary color pixel data may, of course, be generated by chrominance matrix processing by use of filter segments of any other colors arranged in any other pattern. The signal processing using pixel data derived from complementary colors, as stated above, enhances the efficient use of light and therefore sensitivity. In addition, interpolation and high frequency processing in combination enhance the horizontal and vertical resolution of a picture.

An alternative embodiment of the image pickup apparatus in accordance with the present invention will be described hereinafter. Structural elements identical with the structural elements of the previous embodiment are designated by identical reference numerals and will not be described specifically in order to avoid redundancy. In this embodiment, too, the still picture interpolator 362b of the signal processing section 36 generates primary color pixel data by using complementary pixel data and interpolates primary color pixel data in the positions of the actual photosensitive cells. In addition, the interpolator 362b generates luminance data and interpolates them. The illustrative embodiment to be described differs from the previous embodiment as to the high frequency processing technique.

Figure 51:
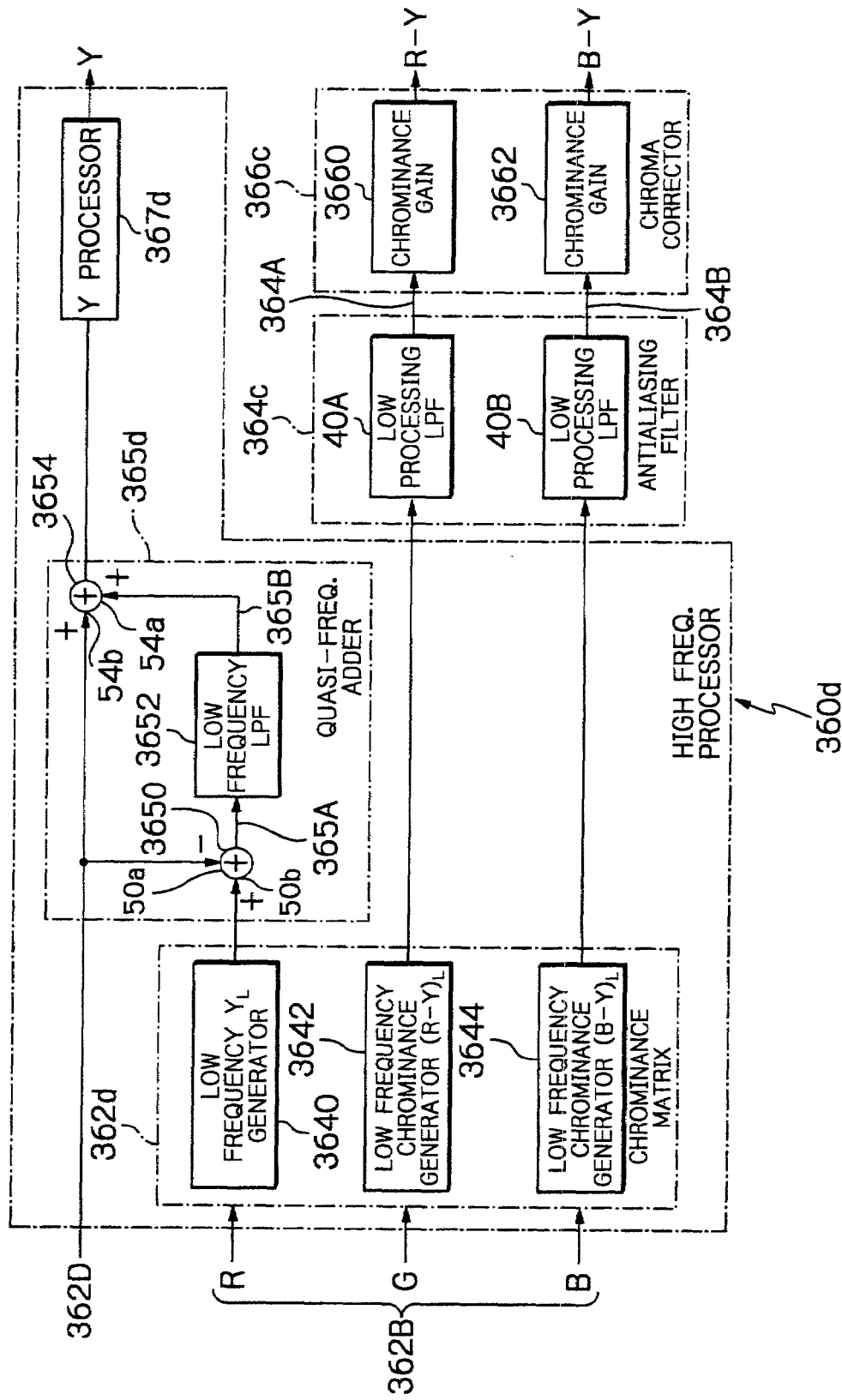
FIG. 51 is a schematic block diagram showing a high frequency processing section representative of an alternative embodiment of the present invention.

As shown in FIG. 51, the illustrative embodiment includes a high frequency processing section 360d made up of a chrominance matrix circuit 362d, a quasi-frequency adding circuit 365d, and a Y (luminance) processor 367d. The chrominance matrix circuit 362d has a component-by-component generating function. The Y processor 367d prevents frequencies from overlapping each other.

As for the chrominance matrix circuit 362d, the component-by-component generating function refers to calculations to be executed with each signal component and each frequency band on the basis of the primary color pixel data generated in a plane. This function enhances accurate color reproduction and high horizontal and/or vertical resolution. For this purpose, the chrominance matrix circuit 362d includes, e.g., a low frequency $Y_L$ generator 3640 and low frequency chrominance generators 3642 and 3644.

A component signal ($Y_L$) output from the low frequency $Y_L$ generator 3640 and having priority given to color reproducibility is lower in frequency than the component signal ($Y_H$) having priority given to resolution. By using, e.g., a $Y_h \cdot Y_{low}$ generation method, the low frequency $Y_L$ generator 3640 produces data $Y_h$ and $Y_{low}$ from the plane primary color pixel data R, G and B pixel by pixel. The low frequency chrominance generators 3642 and 3644 perform calculations with the chrominance signals $(R-Y)_L$ and $(B-Y)_L$, respectively. Such calculations will be described in detail later.

The low frequency chrominance generators 3642 and 3644 respectively deliver chrominance signals or data to low frequency LPFs (Low-Pass Filters) 40A and 40B, which are included in the antialiasing filter 364c. The low frequency LPFs 40A and 40B respectively feed chrominance signals 364A and 364B free from aliasing distortion to chrominance gains 3660 and 3662, which are included in the chroma correction 366c. The chrominance gains 3660 and 3662 respectively correct the gains of the chrominance signals 364A and 364B and output the resulting signals as chrominance signals (R-Y) and (B-Y)

Figure 52:
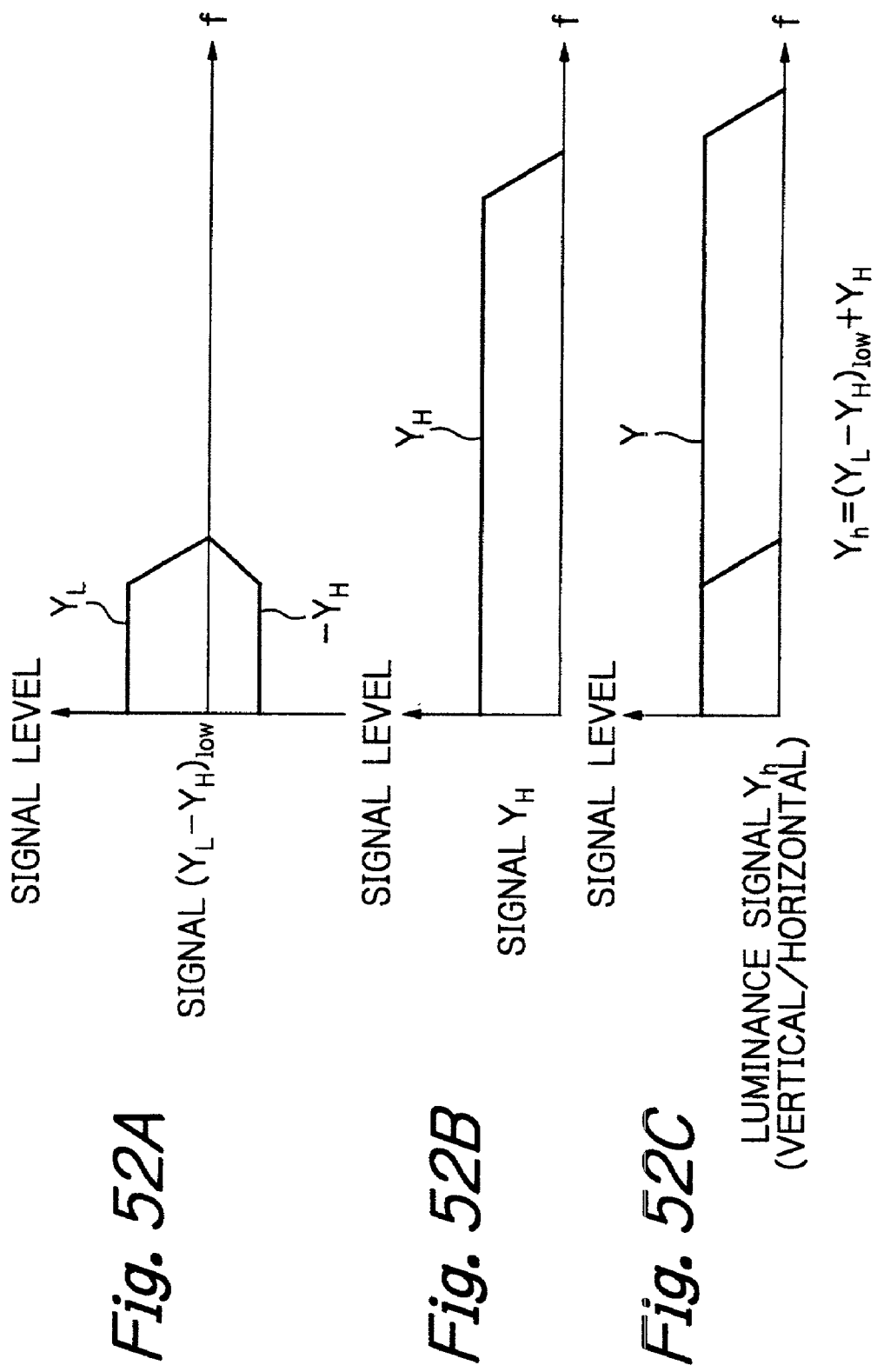
FIGS. 52A, 52B and 52C are charts each showing the frequency allocation of a particular signal appearing in the alternative embodiment.

The quasi-frequency adding circuit 365d includes adders 3650 and 3654 and a low frequency LPF 3652. The luminance data $Y_L$ output from the low frequency $Y_L$ generator 3640 is input to one input 50a of the adder 3650. The luminance data $Y_H$ from the output 362D of the luminance data interpolator 3626 is input to the other input 50b of the adder 3650. The adder 3650 therefore outputs a signal 365A representative of $(Y_L-Y_H)$. The low frequency LPF 3652 subjects the signal 365A to an antialiasing measure. FIG. 52A shows a signal $(Y_L-Y_H)_{low}$ with respect to frequency allocation; the suffix "low" shows that the signal has passed through the LPF 3652. The LPF 3652 feeds the resulting luminance data 365B to one input 54a of the adder 3654. The luminance data 362D is fed to the other input 54b of the adder 3654 also. FIG. 52B shows a signal YH representative of the luminance data 362D. The adder 3654 adds the signals 365B and 362D with respect to frequency to thereby output a luminance signal Yh, i.e., (YL−YH)low+YH. FIG. 52C shows the luminance signal Yh.

As stated above, the quasi-frequency adding circuit 365d adds the component signal ($Y_L$) output from the low frequency $Y_L$ generation 3640 and the luminance signal $Y_h$ in a quasi-frequency fashion. The circuit 365c therefore successfully broadens the frequency band of the luminance signal.

As for the Y processing 367d, assume that two component signals attaching importance to the horizontal resolution and vertical resolution, respectively, are partly identical in frequency band. Then, the Y processor 367d limits the identical frequency band of either one of the horizontal and vertical component signals contained in the luminance signal ($Y_L - Y_H)_{low}+Y_H$. The Y processor 367d then adds the band-limited component signal and the other component signal, thereby obviating false colors ascribable to the overlap of frequency bands.

For the above function, the Y processor 367d includes a selector, a switch, a filter and an adder although not shown specifically. The selector switches the output of the quasi-frequency adding circuit 365d in accordance with the direction or directions to which importance is attached, i.e., one or both of the horizontal and vertical directions. The switching operation controlled by the system controller 18. The importance attached to one or both of the two directions may be neglected if the plane primary color pixel data are generated in consideration of the direction of correlation. Therefore, in the illustrative embodiment, the Y processor 367d gives priority to contour enhancement.

More specifically, assume that the Y processor 367d executes the above function, and that importance is attached to both of the horizontal and vertical directions. Then, the selector transfers a signal selected via one terminal to the switch. The switch operates in accordance with one of signals fed thereto which gives priority to vertical/horizontal resolution. For example, the switch delivers a signal having importance attached to vertical resolution to the filter via the other terminal thereof. The filter limits the frequency band of, e.g., the signal giving priority to vertical resolution and also included in the signal giving priority to horizontal resolution. The filter is implemented as a high-pass filter. The adder adds the output of the filter and the signal output from one terminal of the switch, e.g. a signal with importance attached to horizontal resolution.

Assume that importance is attached to only one of horizontal resolution and vertical resolution. Then, the switch selects the other terminal under the control of the system controller 18, which includes a CPU. As a result, a signal is output from the Y processor 367d via the above terminal of the switch, bypassing the filter and adder. Of course, the switch is also controlled by the horizontal/vertical switching signal output from the system controller 18.

By the above-described luminance processing, the Y processor 367d transforms the luminance signal $(Y_L-Y_H)_{low}+Y_H$ to the luminance signal (Y), which is free from errors despite the combination of the horizontal and vertical signals. In addition, the Y processor 367d adjusts aperture for enhancing contour.

A procedure for generating low frequency $Y_L$ luminance data will be described hereinafter. The calculations of the previous embodiment depend on the arrangement of color filter segments. By contrast, in the illustrative embodiment, primary color pixel data have already been calculated by the chrominance matrix processing. Further, pixel data for the actual pixels (photosensitive devices) have already been generated by interpolation based on the above primary color pixel data. The plane primary color pixel data are used to generate low frequency $Y_L$ data corresponding in position thereto. Therefore, for pixel data located at a position (2,0) by way of example, low frequency data $Y_L$ with importance attached to color reproducibility is generated by:

$$Y_{low20}=0.3*R_{20}+0.59*G_{20}+0.11*B_{20} \quad \text{Eq. (17)}$$

The low frequency data $Y_L$ so generated is written to, e.g., a memory. If desired, the low frequency data $Y_L$ may be calculated as the mean value of two pixel data having importance attached to the horizontal/vertical resolution, as described in relation to the previous embodiment. Even the above-described procedure successfully realizes a high sensitivity, high resolution picture. With the luminance data $Y_{low}$, it is possible to produce chrominance data $(R-Y)_L$ and $(B-Y)_L$ also.

Figure 53:
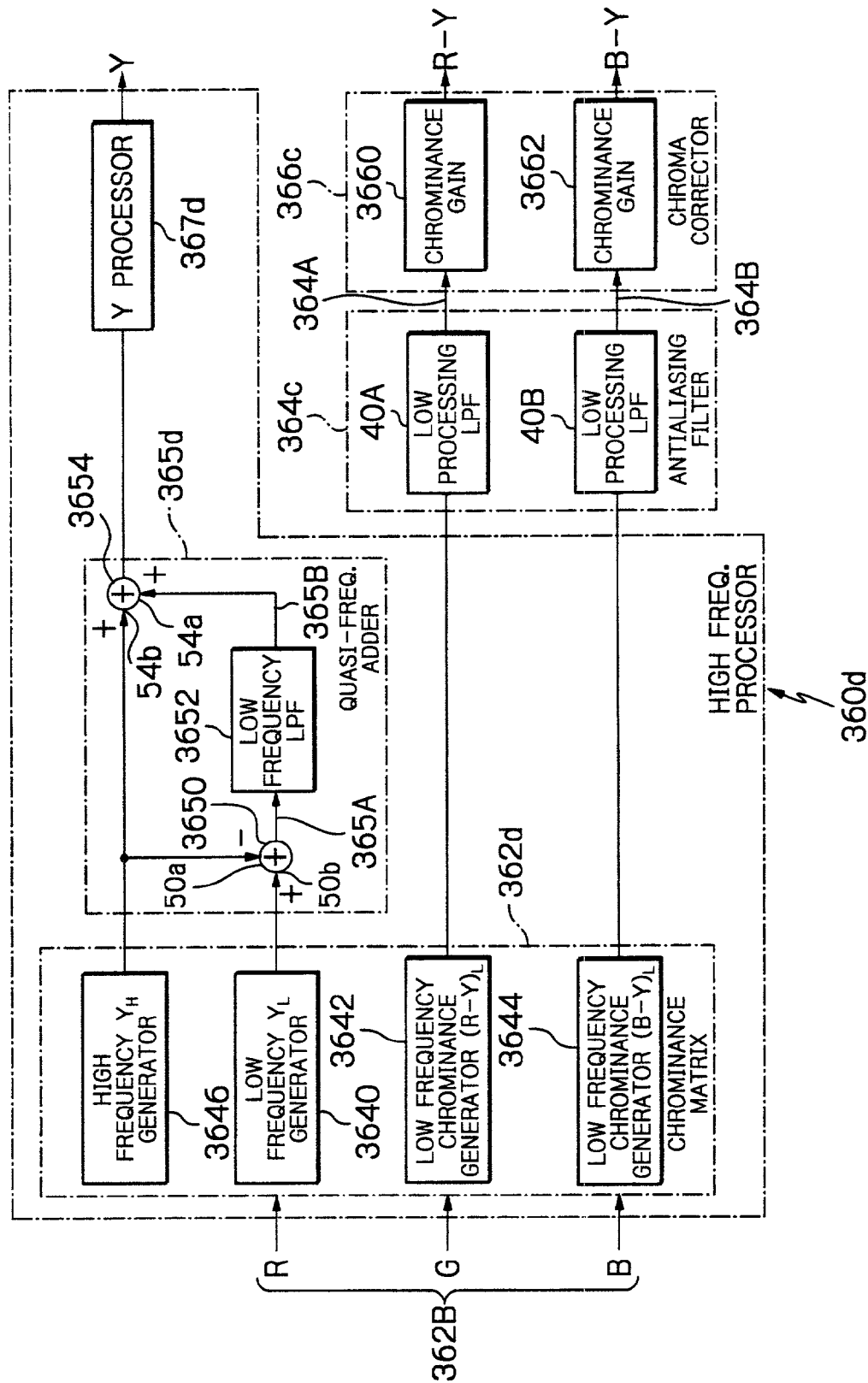
FIG. 53 is a schematic block diagram showing a modification of the alternative embodiment.

The circuitry shown in FIG. 51 may be modified, as shown in FIG. 53. As shown, the chrominance matrix circuit 362d additionally includes a high frequency $Y_H$ generation 3646 implemented by a digital high-pass filter, which passes only high frequency components. Among the primary color pixel data 362B, the pixel data G, for example, close to luminance data are input to the high frequency $Y_H$ generator 3646. The generator 3646 handles the pixel data G as the high frequency $Y_H$ luminance data and outputs the resulting data. The pixel data input to the generator 3646 may be replaced with the pixels output from the image sensor 30 in a checker pattern or primary color data generated for the virtual pixels, if desired. Because such alternative input to the generator 3646 is not subjected to pixel interpolation, the generator 3646 should preferably execute interpolation by taking account of horizontal/vertical resolution as in the previous embodiment.

Figure 54A:
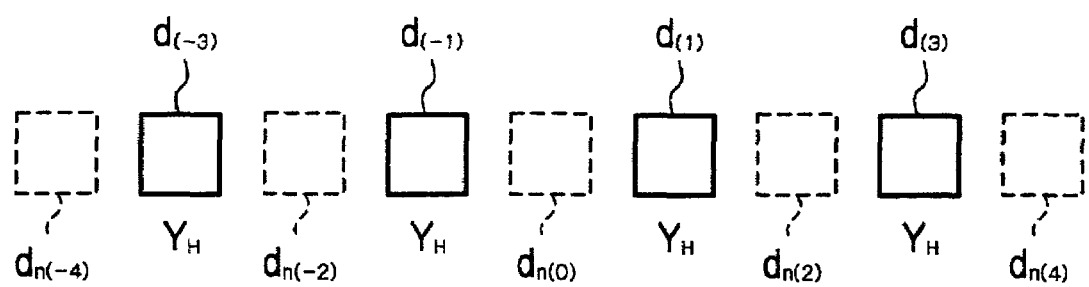
FIGS. 54A and 54B are views representative of a relation between luminance data to be interpolated by low-pass filter processing.

Further, the above interpolation may be effected on the basis of the luminance data $Y_H$ output in a checker pattern. In such a case, luminance data $Y_H$ are generated at the positions of virtual pixels and interpolated in the positions of the actual photosensitive cells, as in the illustrative embodiment. Specifically, FIG. 54A shows solid pixels, or positions of virtual pixels, $d_{(-3)}$, $d_{(-1)}$, $d_{(1)}$ and $d_{(3)}$ calculated and corresponding to a primary color, and phantom pixels representative of the actual photosensitive cells. For instance, the luminance data interpolator 3626 interpolates with luminance data in the positions of the photosensitive cells between four virtual pixels. Considering correspondence between the photosensitive cells and the virtual pixels, pixels $d_{n(-4)}$, $d_{n(-2)}$, $d_{n(0)}$, $d_{n(2)}$ and $d_{n(4)}$ corresponding to the photosensitive cells are dealt with as void pixels, i.e., (logical) ZEROs are set in such pixels beforehand. For example, luminance data $Y_{H(0)}$ to be interpolated in the pixel $d_{n(0)}$ in the horizontal direction and containing a high frequency component is produced by:

$$Y_{H(0)} = k_0 \times d_{n(0)} + k_1 \times (d_{(1)} + d_{(-1)}) + k_2 \times \\ (d_{n(-2)} + d_{n(2)}) + k_3 \times (d_{(-3)} + d_{(3)}) + \\ k_4(d_{n(-4)} + d_{n(4)}) + \ldots + \\ k_n(dn(-n) + dn(n)) \quad \text{Eq. (18)}$$

where $k_0$ to $k_n$ denote the tap coefficients of the digital filter.

Figure 54B:
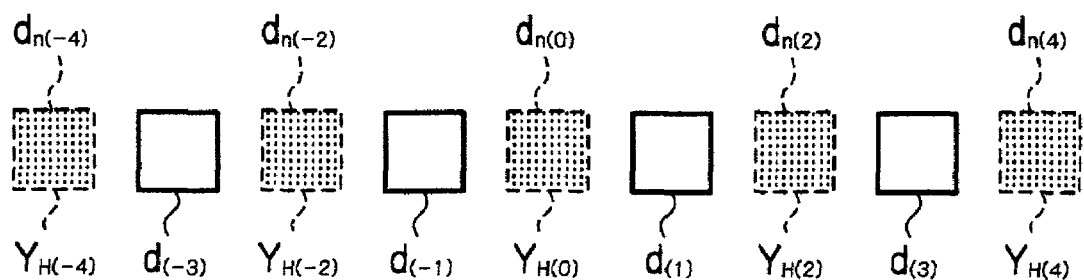

In this case, however, the number of coefficients is doubled because of ZEROs alternating with luminance data, as shown in FIG. 54A. This relation also applies to the other pixels $d_{n(-4)}$, $d_{n(-2)}$, $d_{n(2)}$ and $d_{n(4)}$ in which luminance data are to be interpolated. The interpolation gives luminance data $Y_{H(-4)}$, $Y_{H(-2)}$, $Y_{H(2)}$ and $Y_{H(4)}$ containing high frequency components, as shown in FIG. 54B.

In the vertical direction, too, the luminance data interpolator 3626 executes LPF processing by use of a digital filter. At this instant, pixel data have already been densely interpolated in the actual photosensitive cells by horizontal interpolation, so that the digital filter needs only the conventional number of tap coefficients.

The illustrative embodiments shown and described are successful to enhance the efficient use of light by using complementary colors for thereby further increasing the sensitivity of the individual photosensitive cell. Therefore, despite the pixel-shifted arrangement, the illustrative embodiments easily realize a high resolution, still picture while operating in accordance with the mixed pixel read mode or the all pixel read mode.

In summary, it will be seen that the present invention provides a solid-state image pickup apparatus and a signal processing method therefor capable of enhancing the efficient use of incident light and therefore the sensitivity of the individual photosensitive cell, and readily implementing a high resolution, still picture.

The entire disclosure of Japanese patent application No. 2000-76353 filed on Mar. 14, 2000, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus for separating incident light into colors at positions corresponding to apertures formed in a screening member, which screens the incident light, converting resulting color-separated light to electric signals, and processing said electric signals to thereby output broadband signals, said apparatus comprising:

an image pickup section comprising:
a color filter comprising color filter segments for separating light incident via the apertures into a plurality of colors each having a particular spectral characteristic, wherein said color filter segments include color filter segments having complementary color spectral characteristics;
an image sensing section comprising photosensitive cells for converting the light transmitted through said color filter segments to electric signals, wherein nearby ones of said photosensitive cells are shifted from each other in at least one of a vertical and a horizontal direction in a bidimensional arrangement;
electrodes arranged in such a manner as to skirt round the apertures for producing signals from said photosensitive cells; and
first transfer registers each formed meandering round the apertures of said photosensitive cells and sequentially transferring the signals input via said electrodes from said photosensitive cells in a vertical direction and a second transfer register formed substantially orthogonal to said first transfer registers and transferring the signals input via said first transfer registers;
an operation commanding circuit for outputting a timing and any one of a plurality of modes for reading the signals out of said image pickup section;
a digitizing circuit for converting the signals read out of said image pickup section to digital data, wherein said digital data are arranged in a plane that contains said photosensitive cells and virtual pixels derived from a shifted arrangement of said photosensitive cells; and a signal processing circuit for interpolating, in a first mode designated by said operation commanding circuit, pixel data in positions of said virtual pixels or positions of said photosensitive cells and generating three primary color data on the basis of a plurality of pixel data, which are produced by mixing pixel data, and interpolating in a second mode designated by said operation commanding circuit, three primary color image data in the positions of said virtual pixels on the basis of all pixel data sequentially read out of said photosensitive cells, generating three primary color pixel data at the positions of said photosensitive cells on the basis of said pixel data given to said virtual pixels, and broadening a frequency band of said three primary color image data.

2. The apparatus in accordance with claim 1, wherein assuming that a distance between nearby ones of said photosensitive cells each corresponding to one of the apertures is represented by a pixel pitch, said apertures have a tetragonal or a polygonal shape and are arranged bidimensionally by being shifted from each other by one-half of the pixel pitch in the vertical direction column by column or in the horizontal direction row by row or have a 45°-rotated tetragonal or a polygonal shape and are arranged bidimensionally.

3. The apparatus in accordance with claim 2, wherein said color filter segments use a plurality of colors selected from cyan (Cy), magenta (Mg), yellow (Ye), white (W) and green (G) derived from subtractive mixture, wherein a first color is arranged in a tetragonal lattice pattern with the nearby photosensitive cells being shifted from each other by one-half of the pixel pitch, and wherein a second and a third color are arranged in either one of a checker pattern and a full-checker pattern while being shifted from said tetragonal lattice pattern by one-half of the pixel pitch.

4. The apparatus in accordance with claim 2, wherein said color filter segments use a plurality of colors selected from Cy, Mg, Ye, W and G derived from subtractive mixture, wherein a first color is arranged in a tetragonal lattice pattern with the nearby photosensitive cells being shifted from each other by one-half of the pixel pitch, and wherein a second and a third color are arranged in stripe patterns alternating with each other in the horizontal direction, while being shifted from said tetragonal lattice pattern by one-half of the pixel pitch.

5. The apparatus in accordance with claim 1, wherein said color filter segments use a plurality of colors selected from Cy, Mg, Ye, W and G derived from subtractive mixture, wherein a first tetragonal lattice implemented by four of said colors contains first color positioned at one pair of diagonally opposite corners, a second and a third color respectively positioned at the other pair of diagonally opposite corners, and a fourth color positioned at a center, and wherein a second tetragonal lattice, which is shifted from said first tetragonal lattice by one-half of the pixel pitch in the horizontal and vertical directions, contains said second and third colors at one pair of diagonally opposite corners and said fourth color at the other pair of diagonally opposite corners in a full-checker pattern.

6. The apparatus in accordance with claim 2, wherein said color filter segments use a plurality of colors selected from Cy, Mg, Ye, W and G derived from subtractive mixture, wherein a first tetragonal lattice implemented by four of said colors contains a first color positioned at one pair of diagonally opposite corners, a second color positioned at the other pair of diagonally opposite corners, and a third color positioned at a center, wherein a second tetragonal lattice, which is shifted from said first tetragonal lattice by one-half of the pixel pitch in the horizontal and vertical directions, contains a same color positioned at one pair of diagonally opposite corners and a same color positioned at the other pair of diagonally opposite corners in a checker pattern, and wherein said first and second tetragonal lattices partly overlap each other.

7. The apparatus in accordance with claim 2, wherein said color filter segments use a plurality of colors selected from Cy, Mg, Ye, W and U derived from subtractive mixture, wherein a first tetragonal lattice implemented by four of said colors contains a first color positioned at one pair of diagonally opposite corners, a second and a third color respectively positioned at the other pair of diagonally opposite corners, and a fourth color positioned at a center, wherein a second tetragonal lattice, which is shifted from said first tetragonal lattice by one-half of the pixel pitch in the horizontal and vertical directions, contains a same color positioned at one pair of diagonally opposite corners, and a color different from three colors positioned at vertexes of a triangle, which is formed in a shifted direction of said first tetragonal lattice, in a full-checker pattern, and wherein said first and second tetragonal lattices overlap each other.

8. The apparatus in accordance with claim 3, wherein said image pickup section performs, in the fist mode, interlace scanning to thereby read out signal charges of a same field while mixing pixels or sequentially reads out, in the second mode, all signal pixels.

9. The apparatus in accordance with claim 4, wherein said image pickup section performs, in the fist mode, interlace scanning to thereby read out signal charges of a same filed while mixing pixels or sequentially reads out, in the second mode, all signal pixels.

10. The apparatus in accordance with claim 5, wherein said image pickup section performs, in the fist mode, interlace scanning to thereby read out signal charges of a same filed while mixing pixels or sequentially reads out, in the second mode, all signal pixels.

11. The apparatus in accordance with claim 6, wherein said image pickup section performs, in the fist mode, interlace scanning to thereby read out signal charges of a same filed while mixing pixels or sequentially reads out, in the second mode, all signal pixels.

12. The apparatus in accordance with claim 7, wherein said image pickup section performs, in the fist mode, interlace scanning to thereby read out signal charges of a same filed while mixing pixels or sequentially reads out, in the second mode, all signal charges.

13. The apparatus in accordance with claim 8, wherein said signal processing circuit comprises:
 a correcting circuit for correcting pixel data fed from said photosensitive cells;
 an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data;
 a high frequency circuit for raising a frequency band of the pixel data output from said interpolating circuit to a higher frequency band;

a matrix circuit for generating luminance data and chrominance data by using pixel data output from said high frequency circuit;

a first filter circuit for removing aliasing distortion from the luminance data and the chrominance data; and a chroma adjusting circuit for executing gain adjustment with each of the luminance data and the chrominance data.

14. The apparatus in accordance with claim 9, wherein said signal processing circuit comprises:

a correcting circuit for correcting pixel data fed from said photosensitive cells;

an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data;

a high frequency circuit for raising a frequency band of the pixel data output from said interpolating circuit to a higher frequency band;

a matrix circuit for generating luminance data and chrominance data by using pixel data output from said high frequency circuit;

a first filter circuit for removing aliasing distortion from the luminance data and the chrominance data; and a chroma adjusting circuit for executing gain adjustment with each of the luminance data and the chrominance data.

15. The apparatus in accordance with claim 10, wherein said signal processing circuit comprises:

a correcting circuit for correcting pixel data fed from said photosensitive cells;

an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data;

a high frequency circuit for raising a frequency band of the pixel data output from said interpolating circuit to a higher frequency band;

a matrix circuit for generating luminance data and chrominance data by using pixel data output from said high frequency circuit;

a first filter circuit for removing aliasing distortion from the luminance data and the chrominance data; and a chroma adjusting circuit for executing gain adjustment with each of the luminance data and the chrominance data.

16. The apparatus in accordance with claim 11, wherein said signal processing circuit comprises:

a correcting circuit for correcting pixel data fed from said photosensitive cells;

an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data;

a high frequency circuit for raising a frequency band of the pixel data output from said interpolating circuit to a higher frequency band;

a matrix circuit for generating luminance data and chrominance data by using pixel data output from said high frequency circuit;

a first filter circuit for removing aliasing distortion from the luminance data and the chrominance data; and a chroma adjusting circuit for executing gain adjustment with each of the luminance data and the chrominance data.

17. The apparatus in accordance with claim 12, wherein said signal processing circuit comprises:

a correcting circuit for correcting pixel data fed from said photosensitive cells;

an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data;

a high frequency circuit for raising a frequency band of the pixel data output from said interpolating circuit to a higher frequency band;

a matrix circuit for generating luminance data and chrominance data by using pixel data output from said high frequency circuit;

a first filter circuit for removing aliasing distortion from the luminance data and the chrominance data; and a chroma adjusting circuit for executing gain adjustment with each of the luminance data and the chrominance data.

18. The apparatus in accordance with claim 13, wherein said interpolating circuit comprises:

a primary color generating circuit for generating, in the first mode, primary color pixel data at the position of said virtual pixels or said photosensitive cells on the basis of pixel data of colors, which include the complementary colors, surrounding said virtual pixels or said photosensitive cells; and a still picture data calculating circuit for generating, in the second mode, primary color pixel data at the positions of said virtual pixels on the basis of actual pixel data of colors including the complementary colors, calculating the primary color data at the positions of said photosensitive cells by using calculated pixel data, generating luminance data at the positions of said virtual pixels, and calculating luminance data at the positions of said photosensitive cells by using calculated luminance data.

19. The apparatus in accordance with claim 14, wherein said interpolating circuit comprises:

a primary color generating circuit for generating, in the first mode, primary color pixel data at the position of said virtual pixels or said photosensitive cells on the basis of pixel data of colors, which include the complementary colors, surrounding said virtual pixels or said photosensitive cells; and a still picture data calculating circuit for generating, in the second mode, primary color pixel data at the positions of said virtual pixels on the basis of actual pixel data of colors including the complementary colors, calculating the primary color data at the positions of said photosensitive cells by using calculated pixel data, generating luminance data at the positions of said virtual pixels, and calculating luminance data at the positions of said photosensitive cells by using calculated luminance data.

20. The apparatus in accordance with claim 15, wherein said interpolating circuit comprises:

a primary color generating circuit for generating, in the first mode, primary color pixel data at the position of said virtual pixels or said photosensitive cells on the basis of pixel data of colors, which include the complementary colors, surrounding said virtual pixels or said photosensitive cells; and a still picture data calculating circuit for generating, in the second mode, primary color pixel data at the positions of said virtual pixels on the basis of actual pixel data of colors including the complementary colors, calculating the primary color data at the positions of said photosensitive cells by using calculated pixel data, generating luminance data at the positions of said virtual pixels, and calculating luminance data at the positions of said photosensitive cells by using calculated luminance data.

21. The apparatus in accordance with claim 16, wherein said interpolating circuit comprises:

a primary color generating circuit for generating, in the first mode, primary color pixel data at the position of said virtual pixels or said photosensitive cells on the basis of pixel data of colors, which include the complementary colors, surrounding said virtual pixels or said photosensitive cells; and a still picture data calculating circuit for generating, in the second mode, primary color pixel data at the positions of said virtual pixels on the basis of actual pixel data of colors including the complementary colors, calculating the primary color data at the positions of said photosensitive cells by using calculated pixel data, generating luminance data at the positions of said virtual pixels, and calculating luminance data at the positions of said photosensitive cells by using calculated luminance data.

22. The apparatus in accordance with claim 17, wherein said interpolating circuit comprises:

a primary color generating circuit for generating, in the first mode, primary color pixel data at the position of said virtual pixels or said photosensitive cells on the basis of pixel data of colors, which include the complementary colors, surrounding said virtual pixels or said photosensitive cells; and a still picture data calculating circuit for generating, in the second mode, primary color pixel data at the positions of said virtual pixels on the basis of actual pixel data of colors including the complementary colors, calculating the primary color data at the positions of said photosensitive cells by using calculated pixel data, generating luminance data at the positions of said virtual pixels, and calculating luminance data at the positions of said photosensitive cells by using calculated luminance data.

23. The apparatus in accordance with claim 18, wherein said still picture data calculating circuit comprises:

a primary color generating circuit for simultaneously generating three primary color pixel data at the position of each virtual pixel;

a primary color generating and interpolating circuit for calculating and interpolating, by using the three primary color pixel data, the primary color data at the position of each photosensitive cell surrounded by said three primary color pixel data, and outputting plane pixel data color by color;

a luminance data generating circuit for generating luminance data at the position of said virtual pixel on the basis of the surrounding pixel data of colors, which include complementary colors; and a luminance generating and interpolating circuit for interpolating luminance data at the position of said photosensitive cell surrounded by the luminance data, and outputting plane luminance data.

24. The apparatus in accordance with claim 19, wherein said still picture data calculating circuit comprises:

a primary color generating circuit for simultaneously generating three primary color pixel data at the position of each virtual pixel;

a primary color generating and interpolating circuit for calculating and interpolating, by using the three primary color pixel data, the primary color data at the position of each photosensitive cell surrounded by said three primary color pixel data, and outputting plane pixel data color by color;

a luminance data generating circuit for generating luminance data at the position of said virtual pixel on the basis of the surrounding pixel data of colors, which include complementary colors; and a luminance generating and interpolating circuit for interpolating luminance data at the position of said photosensitive cell surrounded by the luminance data, and outputting plane luminance data.

25. The apparatus in accordance with claim 20, wherein said still picture data calculating circuit comprises:

a primary color generating circuit for simultaneously generating three primary color pixel data at the position of each virtual pixel;

a primary color generating and interpolating circuit for calculating and interpolating, by using the three primary color pixel data, the primary color data at the position of each photosensitive cell surrounded by said three primary color pixel data, and outputting plane pixel data color by color;

a luminance data generating circuit for generating luminance data at the position of said virtual pixel on the basis of the surrounding pixel data of colors, which include complementary colors; and a luminance generating and interpolating circuit for interpolating luminance data at the position of said photosensitive cell surrounded by the luminance data, and outputting plane luminance data.

26. The apparatus in accordance with claim 21, wherein said still picture data calculating circuit comprises:

a primary color generating circuit for simultaneously generating three primary color pixel data at the position of each virtual pixel;

a primary color generating and interpolating circuit for calculating and interpolating, by using the three primary color pixel data, the primary color data at the position of each photosensitive cell surrounded by said three primary color pixel data, and outputting plane pixel data color by color;
a luminance data generating circuit for generating luminance data at the position of said virtual pixel on the basis of the surrounding pixel data of colors, which include complementary colors; and
a luminance generating and interpolating circuit for interpolating luminance data at the position of said photosensitive cell surrounded by the luminance data, and outputting plane luminance data.

27. The apparatus in accordance with claim 22, wherein said still picture data calculating circuit comprises:
a primary color generating circuit for simultaneously generating three primary color pixel data at the position of each virtual pixel;
a primary color generating and interpolating circuit for calculating and interpolating, by using the three primary color pixel data, the primary color data at the position of each photosensitive cell surrounded by said three primary color pixel data, and outputting plane pixel data color by color;
a luminance data generating circuit for generating luminance data at the position of said virtual pixel on the basis of the surrounding pixel data of colors, which include complementary colors; and
a luminance generating and interpolating circuit for interpolating luminance data at the position of said photosensitive cell surrounded by the luminance data, and outputting plane luminance data.

28. The apparatus in accordance with claim 23, wherein said primary color generating and interpolating circuit comprises:
a red (R) plane interpolating circuit for generating R pixel data on the basis of pixel data around said R pixel data while taking account of a correlation between said R pixel data and said pixel data around said R pixel data;
a G plane interpolating circuit for generating G pixel data on the basis of pixel data around said G pixel data while taking account of a correlation between said G pixel data and said pixel data around said G pixel data; and
a blue (B) plane interpolating circuit for generating B pixel data on the basis of pixel data around said B pixel data while taking account of a correlation between said B pixel data and said pixel data around said B pixel data.

29. The apparatus in accordance with claim 24, wherein said primary color generating and interpolating circuit comprises:
a red (R) plane interpolating circuit for generating R pixel data on the basis of pixel data around said R pixel data while taking account of a correlation between said R pixel data and said pixel data around said R pixel data;
a G plane interpolating circuit for generating G pixel data on the basis of pixel data around said G pixel data while taking account of a correlation between said G pixel data and said pixel data around said G pixel data; and
a blue (B) plane interpolating circuit for generating B pixel data on the basis of pixel data around said B pixel data while taking account of a correlation between said B pixel data and said pixel data around said B pixel data.

30. The apparatus in accordance with claim 25, wherein said primary color generating and interpolating circuit comprises:
a red (R) plane interpolating circuit for generating R pixel data on the basis of pixel data around said R pixel data while taking account of a correlation between said R pixel data and said pixel data around said R pixel data;
a G plane interpolating circuit for generating G pixel data on the basis of pixel data around said G pixel data while taking account of a correlation between said G pixel data and said pixel data around said G pixel data; and
a blue (B) plane interpolating circuit for generating B pixel data on the basis of pixel data around said B pixel data while taking account of a correlation between said B pixel data and said pixel data around said B pixel data.

31. The apparatus in accordance with claim 26, wherein said primary color generating and interpolating circuit comprises:
a red (R) plane interpolating circuit for generating R pixel data on the basis of pixel data around said R pixel data while taking account of a correlation between said R pixel data and said pixel data around said R pixel data;
a G plane interpolating circuit for generating G pixel data on the basis of pixel data around said G pixel data while taking account of a correlation between said G pixel data and said pixel data around said G pixel data; and
a blue (B) plane interpolating circuit for generating B pixel data on the basis of pixel data around said B pixel data while taking account of a correlation between said B pixel data and said pixel data around said B pixel data.

32. The apparatus in accordance with claim 27, wherein said primary color generating and interpolating circuit comprises:
a red (R) plane interpolating circuit for generating R pixel data on the basis of pixel data around said R pixel data while taking account of a correlation between said R pixel data and said pixel data around said R pixel data;
a G plane interpolating circuit for generating G pixel data on the basis of pixel data around said G pixel data while taking account of a correlation between said G pixel data and said pixel data around said G pixel data; and
a blue (B) plane interpolating circuit for generating B pixel data on the basis of pixel data around said B pixel data while taking account of a correlation between said B pixel data and said pixel data around said B pixel data.

33. The apparatus in accordance with claim 23, wherein said luminance data generating circuit comprises a sum calculating circuit for calculating a sum of four-color pixel data of said photosensitive cells that surround the virtual pixel being observed.

34. The apparatus in accordance with claim 24, wherein said luminance data generating circuit comprises a sum calculating circuit for calculating a sum of four-color pixel data of said photosensitive cells that surround the virtual pixel being observed.

35. The apparatus in accordance with claim 25, wherein said luminance data generating circuit comprises a sum calculating circuit for calculating a sum of four-color pixel data of said photosensitive cells that surround the virtual pixel being observed.

36. The apparatus in accordance with claim 26, wherein said luminance data generating circuit comprises a sum calculating circuit for calculating a sum of four-color pixel data of said photosensitive cells that surround the virtual pixel being observed.

37. The apparatus in accordance with claim 27, wherein said luminance data generating circuit comprises a sum calculating circuit for calculating a sum of four-color pixel data of said photosensitive cells that surround the virtual pixel being observed.

38. The apparatus in accordance with claim 23, wherein said luminance generating and interpolating circuit interpolates luminance data in the position of the photosensitive cell, which is being observed, by using luminance data around said photosensitive cell while taking account of a correlation between said luminance data.

39. The apparatus in accordance with claim 24, wherein said luminance generating and interpolating circuit interpolates luminance data in the position of the photosensitive cell, which is being observed, by using luminance data around said photosensitive cell while taking account of a correlation between said luminance data.

40. The apparatus in accordance with claim 25, wherein said luminance generating and interpolating circuit interpolates luminance data in the position of the photosensitive cell, which is being observed, by using luminance data around said photosensitive cell while taking account of a correlation between said luminance data.

41. The apparatus in accordance with claim 26, wherein said luminance generating and interpolating circuit interpolates luminance data in the position of the photosensitive cell, which is being observed, by using luminance data around said photosensitive cell while taking account of a correlation between said luminance data.

42. The apparatus in accordance with claim 27, wherein said luminance generating and interpolating circuit interpolates luminance data in the position of the photosensitive cell, which is being observed, by using luminance data around said photosensitive cell while taking account of a correlation between said luminance data.

43. The apparatus in accordance with claim 13, wherein said high frequency circuit comprises:
  a high-pass filter circuit for passing high frequency components of the luminance data to thereby output high frequency luminance data; and
  a first adding circuit for adding color-by-color plane pixel data fed from said primary color generating and interpolating circuit and the high frequency luminance data.

44. The apparatus in accordance with claim 14, wherein said high frequency circuit comprises:
  a high-pass filter circuit for passing high frequency components of the luminance data to thereby output high frequency luminance data; and
  a first adding circuit for adding color-by-color plane pixel data fed from said primary color generating and interpolating circuit and the high frequency luminance data.

45. The apparatus in accordance with claim 15, wherein said high frequency circuit comprises:
  a high-pass filter circuit for passing high frequency components of the luminance data to thereby output high frequency luminance data; and
  a first adding circuit for adding color-by-color plane pixel data fed from said primary color generating and interpolating circuit and the high frequency luminance data.

46. The apparatus in accordance with claim 16, wherein said high frequency circuit comprises:
  a high-pass filter circuit for passing high frequency components of the luminance data to thereby output high frequency luminance data; and
  a first adding circuit for adding color-by-color plane pixel data fed from said primary color generating and interpolating circuit and the high frequency luminance data.

47. The apparatus in accordance with claim 17, wherein said high frequency circuit comprises:
  a high-pass filter circuit for passing high frequency components of the luminance data to thereby output high frequency luminance data; and
  a first adding circuit for adding color-by-color plane pixel data fed from said primary color generating and interpolating circuit and the high frequency luminance data.

48. The apparatus in accordance with claim 8, wherein said signal processing circuit comprises:
  a correcting circuit for correcting pixel data fed from said photosensitive cells;
  an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data; and
  a broadband circuit for interpolating data in said virtual pixels by using said photosensitive cells, generating pixel data at the positions of said photosensitive cells on the basis of said data, and broadening a frequency band of said data interpolated and said data generated;
  said broadband circuit comprising:
  a band-by-band data generating circuit for calculating, based on the pixel data output from said interpolating circuit and assigned to said virtual pixels, luminance data and chrominance data relating to the pixel data assigned to said photosensitive cells in accordance with a frequency band;
  a quasi-frequency adding circuit for adding, with respect to frequency, a component signal output from said band-by-band data generating circuit and giving priority to color reproducibility and a component signal also output from said band-by-band data generating circuit, but giving priority to resolution; and
  an overlap preventing circuit for preventing, when said component signal giving priority to color reproducibility and said component signal giving priority to resolution contain a same frequency band, said same frequency band from overlapping.

49. The apparatus in accordance with claim 9, wherein said signal processing circuit comprises:
  a correcting circuit for correcting pixel data fed from said photosensitive cells;
  an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data; and
  a broadband circuit for interpolating data in said virtual pixels by using said photosensitive cells, generating pixel data at the positions of said photosensitive cells on the basis of said data, and broadening a frequency band of said data interpolated and said data generated;
  said broadband circuit comprising:
  a band-by-band data generating circuit for calculating, based on the pixel data output from said interpolating circuit and assigned to said virtual pixels, luminance data and chrominance data relating to the pixel data assigned to said photosensitive cells in accordance with a frequency band;

a quasi-frequency adding circuit for adding, with respect to frequency, a component signal output from said band-by-band data generating circuit and giving priority to color reproducibility and a component signal also output from said band-by-band data generating circuit, but giving priority to resolution; and an overlap preventing circuit for preventing, when said component signal giving priority to color reproducibility and said component signal giving priority to resolution contain a same frequency band, said same frequency band from overlapping.

50. The apparatus in accordance with claim 10, wherein said signal processing circuit comprises:

a correcting circuit for correcting pixel data fed from said photosensitive cells;

an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data; and a broadband circuit for interpolating data in said virtual pixels by using said photosensitive cells, generating pixel data at the positions of said photosensitive cells on the basis of said data, and broadening a frequency band of said data interpolated and said data generated;

said broadband circuit comprising:

a band-by-band data generating circuit for calculating, based on the pixel data output from said interpolating circuit and assigned to said virtual pixels, luminance data and chrominance data relating to the pixel data assigned to said photosensitive cells in accordance with a frequency band;

a quasi-frequency adding circuit for adding, with respect to frequency, a component signal output from said band-by-band data generating circuit and giving priority to color reproducibility and a component signal also output from said band-by-band data generating circuit, but giving priority to resolution; and an overlap preventing circuit for preventing, when said component signal giving priority to color reproducibility and said component signal giving priority to resolution contain a same frequency band, said same frequency band from overlapping.

51. The apparatus in accordance with claim 11, wherein said signal processing circuit comprises:

a correcting circuit for correcting pixel data fed from said photosensitive cells;

an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data; and a broadband circuit for interpolating data in said virtual pixels by using said photosensitive cells, generating pixel data at the positions of said photosensitive cells on the basis of said data, and broadening a frequency band of said data interpolated and said data generated;

said broadband circuit comprising:

a band-by-band data generating circuit for calculating, based on the pixel data output from said interpolating circuit and assigned to said virtual pixels, luminance data and chrominance data relating to the pixel data assigned to said photosensitive cells in accordance with a frequency band;

a quasi-frequency adding circuit for adding, with respect to frequency, a component signal output from said band-by-band data generating circuit and giving priority to color reproducibility and a component signal also output from said band-by-band data generating circuit, but giving priority to resolution; and an overlap preventing circuit for preventing, when said component signal giving priority to color reproducibility and said component signal giving priority to resolution contain a same frequency band, said same frequency band from overlapping.

52. The apparatus in accordance with claim 12, wherein said signal processing circuit comprises:

a correcting circuit for correcting pixel data fed from said photosensitive cells;

an interpolating circuit for generating, in the first mode, primary color pixel data at the positions of said virtual pixels or the positions of said photosensitive cells or calculating, in the second mode, primary color pixel data at the positions of said virtual pixels, calculating the primary color data at the positions of said photosensitive cells by using calculated primary color pixel data, generating luminance data at the positions of said virtual pixels, and calculating luminance data at the positions of said photosensitive cells by using calculated luminance data; and a broadband circuit for interpolating data in said virtual pixels by using said photosensitive cells, generating pixel data at the positions of said photosensitive cells on the basis of said data, and broadening a frequency band of said data interpolated and said data generated;

said broadband circuit comprising:

a band-by-band data generating circuit for calculating, based on the pixel data output from said interpolating circuit and assigned to said virtual pixels, luminance data and chrominance data relating to the pixel data assigned to said photosensitive cells in accordance with a frequency band;

a quasi-frequency adding circuit for adding, with respect to frequency, a component signal output from said band-by-band data generating circuit and giving priority to color reproducibility and a component signal also output from said band-by-band data generating circuit, but giving priority to resolution; and an overlap preventing circuit for preventing, when said component signal giving priority to color reproducibility and said component signal giving priority to resolution contain a same frequency band, said same frequency band from overlapping.

53. The apparatus in accordance with claim 48, wherein said band-by-band data generating circuit comprises a high frequency, luminance data generating circuit for executing high-pass filtering with the pixel data input to said signal processing circuit either directly or after transforming said pixel data to primary color pixel data.

54. The apparatus in accordance with claim 49, wherein said band-by-band data generating circuit comprises a high frequency, luminance data generating circuit for executing high-pass filtering with the pixel data input to said signal processing circuit either directly or after transforming said pixel data to primary color pixel data.

55. The apparatus in accordance with claim 50, wherein said band-by-band data generating circuit comprises a high frequency, luminance data generating circuit for executing high-pass filtering with the pixel data input to said signal processing circuit either directly or after transforming said pixel data to primary color pixel data.

56. The apparatus in accordance with claim 51, wherein said band-by-band data generating circuit comprises a high frequency, luminance data generating circuit for executing high-pass filtering with the pixel data input to said signal processing circuit either directly or after transforming said pixel data to primary color pixel data.

57. The apparatus in accordance with claim 52, wherein said band-by-band data generating circuit comprises a high frequency, luminance data generating circuit for executing high-pass filtering with the pixel data input to said signal processing circuit either directly or after transforming said pixel data to primary color pixel data.

58. The apparatus in accordance with claim 53, wherein said quasi-adding circuit comprises:
   a second adding circuit for receiving a first component signal up to a frequency band, which gives priority to resolution, from said band-by-band data generating circuit via a subtraction terminal and receiving a second component signal lower in frequency band than said first component signal and giving priority to color reproducibility via an addition terminal;
   a second filter circuit for removing aliasing distortion from said an output of said second adding circuit and said first component signal; and
   a third adding circuit for adding outputs of said second filtering circuit.

59. The apparatus in accordance with claim 54, wherein said quasi-adding circuit comprises:
   a second adding circuit for receiving a first component signal up to a frequency band, which gives priority to resolution, from said band-by-band data generating circuit via a subtraction terminal and receiving a second component signal lower in frequency band than said first component signal and giving priority to color reproducibility via an addition terminal;
   a second filter circuit for removing aliasing distortion from said an output of said second adding circuit and said first component signal; and
   a third adding circuit for adding outputs of said second filtering circuit.

60. The apparatus in accordance with claim 55, wherein said quasi-adding circuit comprises:
   a second adding circuit for receiving a first component signal up to a frequency band, which gives priority to resolution, from said band-by-band data generating circuit via a subtraction terminal and receiving a second component signal lower in frequency band than said first component signal and giving priority to color reproducibility via an addition terminal;
   a second filter circuit for removing aliasing distortion from said an output of said second adding circuit and said first component signal; and
   a third adding circuit for adding outputs of said second filtering circuit.

61. The apparatus in accordance with claim 56, wherein said quasi-adding circuit comprises:
   a second adding circuit for receiving a first component signal up to a frequency band, which gives priority to resolution, from said band-by-band data generating circuit via a subtraction terminal and receiving a second component signal lower in frequency band than said first component signal and giving priority to color reproducibility via an addition terminal;
   a second filter circuit for removing aliasing distortion from said an output of said second adding circuit and said first component signal; and
   a third adding circuit for adding outputs of said second filtering circuit.

62. The apparatus in accordance with claim 57, wherein said quasi-adding circuit comprises:
   a second adding circuit for receiving a first component signal up to a frequency band, which gives priority to resolution, from said band-by-band data generating circuit via a subtraction terminal and receiving a second component signal lower in frequency band than said first component signal and giving priority to color reproducibility via an addition terminal;
   a second filter circuit for removing aliasing distortion from said an output of said second adding circuit and said first component signal; and
   a third adding circuit for adding outputs of said second filtering circuit.

63. The apparatus in accordance with claim 58, wherein said overlap preventing circuit comprises:
   a third filter circuit for limiting a frequency band of one of signals output from said quasi-adding circuit identical with a frequency band of the other signal; and
   an adding circuit for adding an output of said third filter circuit and the other signal containing a same frequency band as the one signal.

64. The apparatus in accordance with claim 59, wherein said overlap preventing circuit comprises:
   a third filter circuit for limiting a frequency band of one of signals output from said quasi-adding circuit identical with a frequency band of the other signal; and
   an adding circuit for adding an output of said third filter circuit and the other signal containing a same frequency band as the one signal.

65. The apparatus in accordance with claim 60, wherein said overlap preventing circuit comprises:
   a third filter circuit for limiting a frequency band of one of signals output from said quasi-adding circuit identical with a frequency band of the other signal; and
   an adding circuit for adding an output of said third filter circuit and the other signal containing a same frequency band as the one signal.

66. The apparatus in accordance with claim 61, wherein said overlap preventing circuit comprises:
   a third filter circuit for limiting a frequency band of one of signals output from said quasi-adding circuit identical with a frequency band of the other signal; and
   an adding circuit for adding an output of said third filter circuit and the other signal containing a same frequency band as the one signal.

67. The apparatus in accordance with claim 62, wherein said overlap preventing circuit comprises:
   a third filter circuit for limiting a frequency band of one of signals output from said quasi-adding circuit identical with a frequency band of the other signal; and an adding circuit for adding an output of said third filter circuit and the other signal containing a same frequency band as the one signal.

68. The apparatus in accordance with claim 63, wherein said primary color generating circuit comprises:
- a difference calculating circuit for calculating a difference between, among pixel data of one field derived from signal charges read out of said image pickup section and mixed by two lines by interlace scanning and pixel data of the other field derived from signal charges read out of said image pickup section and mixed by two lines by interlace scanning, two lines of mixed pixel data belonging to different fields from each other, but spatially adjoining each other;
- a sum producing circuit for producing a sum of the two lines of mixed pixel data;
- a G generating circuit for subtracting the differences from the sum output from said sum producing circuit to thereby generate G pixel data; and
- a RB generating circuit for adding one of the two differences and the G pixel data and adding the other of said two differences and said G pixel data to thereby generate R pixel data and B pixel data.

69. The apparatus in accordance with claim 64, wherein said primary color generating circuit comprises:
- a difference calculating circuit for calculating a difference between, among pixel data of one field derived from signal charges read out of said image pickup section and mixed by two lines by interlace scanning and pixel data of the other field derived from signal charges read out of said image pickup section and mixed by two lines by interlace scanning, two lines of mixed pixel data belonging to different fields from each other, but spatially adjoining each other;
- a sum producing circuit for producing a sum of the two lines of mixed pixel data;
- a G generating circuit for subtracting the differences from the sum output from said sum producing circuit to thereby generate G pixel data; and
- a RB generating circuit for adding one of the two differences and the G pixel data and adding the other of said two differences and said G pixel data to thereby generate R pixel data and B pixel data.

70. The apparatus in accordance with claim 65, wherein said primary color generating circuit comprises:
- a difference calculating circuit for calculating a difference between, among pixel data of one field derived from signal charges read out of said image pickup section and mixed by two lines by interlace scanning and pixel data of the other field derived from signal charges read out of said image pickup section and mixed by two lines by interlace scanning, two lines of mixed pixel data belonging to different fields from each other, but spatially adjoining each other;
- a sum producing circuit for producing a sum of the two lines of mixed pixel data;
- a G generating circuit for subtracting the differences from the sum output from said sum producing circuit to thereby generate G pixel data; and
- a RB generating circuit for adding one of the two differences and the G pixel data and adding the other of said two differences and said G pixel data to thereby generate R pixel data and B pixel data.

71. The apparatus in accordance with claim 66, wherein said primary color generating circuit comprises:
- a difference calculating circuit for calculating a difference between, among pixel data of one field derived from signal charges read out of said image pickup section and mixed by two lines by interlace scanning and pixel data of the other field derived from signal charges read out of said image pickup section and mixed by two lines by interlace scanning, two lines of mixed pixel data belonging to different fields from each other, but spatially adjoining each other;
- a sum producing circuit for producing a sum of the two lines of mixed pixel data;
- a G generating circuit for subtracting the differences from the sum output from said sum producing circuit to thereby generate G pixel data; and
- a RB generating circuit for adding one of the two differences and the G pixel data and adding the other of said two differences and said G pixel data to thereby generate R pixel data and B pixel data.

72. The apparatus in accordance with claim 67, wherein said primary color generating circuit comprises:
- a difference calculating circuit for calculating a difference between, among pixel data of one field derived from signal charges read out of said image pickup section and mixed by two lines by interlace scanning and pixel data of the other field derived from signal charges read out of said image pickup section and mixed by two lines by interlace scanning, two lines of mixed pixel data belonging to different fields from each other, but spatially adjoining each other;
- a sum producing circuit for producing a sum of the two lines of mixed pixel data;
- a G generating circuit for subtracting the differences from the sum output from said sum producing circuit to thereby generate G pixel data; and
- a RB generating circuit for adding one of the two differences and the G pixel data and adding the other of said two differences and said G pixel data to thereby generate R pixel data and B pixel data.

* * * * *